US008713006B2

(12) United States Patent
Fenne et al.

(10) Patent No.: US 8,713,006 B2
(45) Date of Patent: *Apr. 29, 2014

(54) SYSTEM, METHOD, AND SOFTWARE FOR RESEARCHING, ANALYZING AND COMPARING EXPERT WITNESSES

(75) Inventors: Christine Fenne, Mendota Heights, MN (US); Sharon Lazarus, Eagan, MN (US); Joel Hurwitz, Eagan, MN (US)

(73) Assignee: Thomson Reuters Global Resources, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/369,854

(22) Filed: Feb. 9, 2012

(65) Prior Publication Data
US 2012/0143851 A1 Jun. 7, 2012

Related U.S. Application Data

(63) Continuation of application No. 12/319,132, filed on Dec. 31, 2008, now Pat. No. 8,126,886.

(60) Provisional application No. 61/009,692, filed on Dec. 31, 2007.

(51) Int. Cl.
*G06F 17/30* (2006.01)

(52) U.S. Cl.
USPC .......................................... 707/728; 707/731

(58) Field of Classification Search
USPC .................... 707/722, 728, 731–732
See application file for complete search history.

(56) References Cited

U.S. PATENT DOCUMENTS

| 2005/0043961 | A1* | 2/2005 | Torres et al. ....................... 705/1 |
| 2005/0203895 | A1 | 9/2005 | Weild, IV |
| 2005/0203899 | A1* | 9/2005 | Anderson et al. .................. 707/5 |
| 2006/0190490 | A1 | 8/2006 | Ritchey et al. |

OTHER PUBLICATIONS

Maybury, Mark T., "Expert Finding Systems", MITRE Technical Report, Sep. 1, 2006, XP55042897, Retrieved from the Internet: URL: http://wwwsrv2tmp.mitre.org/work/tech_papers/tech_papers_06/06_1115/06_1115.pdf, 61 pages.
Supplementary European Search Report dated Nov. 2, 2012 in Application No. EP 08 87 0364, 2 pages.

* cited by examiner

*Primary Examiner* — Monica Pyo
(74) *Attorney, Agent, or Firm* — Hoffmann & Baron, LLP

(57) ABSTRACT

The present inventors devised, among other things, system, methods, and interfaces for researching, evaluating, and comparing expert witnesses. One exemplary system includes interfaces that facilitate users entering queries regarding experts based on name or subject matter and filtering search results based on damage awards, case types, attorneys, clients and date range. The system also enables side-by-side comparisons of the cumulative litigation history for multiple experts, and provides an expert challenge report that indicates whether an expert has been challenged in past litigation, the result of any challenges, the presiding judges in the any challenges, and the text of the challenged testimony.

7 Claims, 57 Drawing Sheets

Westlaw | Expert | Litigation | Minnesota

Edit Search

Result: 6 Documents

1. PROFILES OF EXPERT WITNESSES RICHARD JONES DETROIT MI Medical & Surgical - Surgery -- General Medical & Surgical - Surgery -- Orthopedics
   (Expert Evaluator Report) (Profile)

2. PROFILES OF EXPERT WITNESSES GEORGE RICHARD JONES; MD DETROIT MI Medical & Surgical - Orthopedics
   (Expert Evaluator Report) (Profile)

3. PROFILES OF EXPERT WITNESSES RICHARD JONES; MD PLANO TX Medical & Surgical - Physicians/General Practitioners
   (Expert Evaluator Report) (Profile)

4. PROFILES OF EXPERT WITNESSES RICHARD JONES; MD BELLINGHAM WA Medical & Surgical - Surgery -- General
   (Expert Evaluator Report) (Profile)

5. PROFILES OF EXPERT WITNESSES RICHARD JONES; MD LAKELAND FL Accident & Injury - Coroner Medical & Surgical - Physicians/General Practitioners
   (Expert Evaluator Report) (Profile)

6. PROFILES OF EXPERT WITNESSES RICHARD D JONES, PHD SAN DIEGO CA Medical & Surgical - Physical Therapy & Rehabilitation
   (Profile)

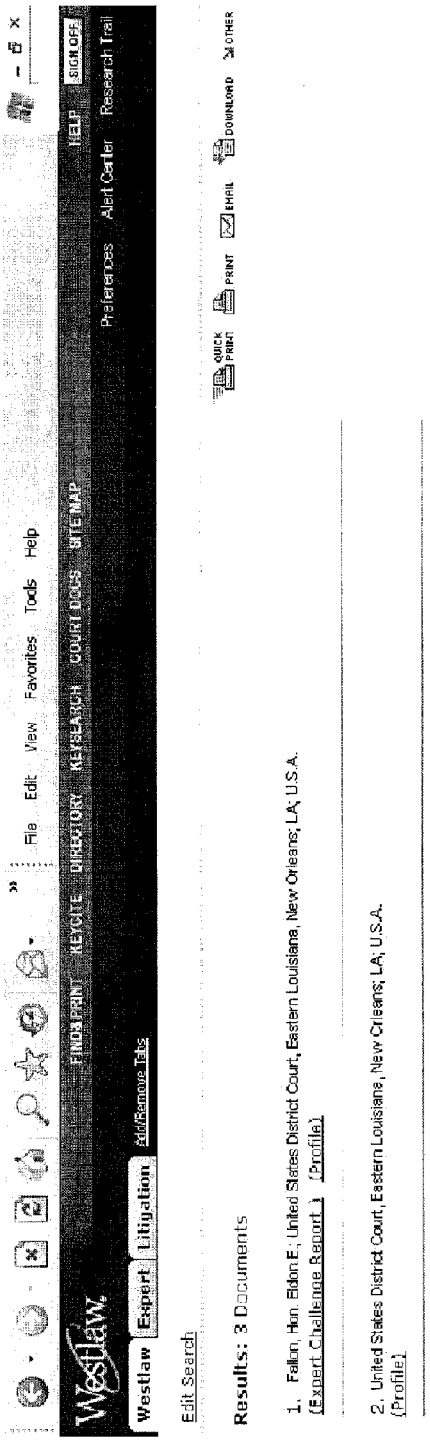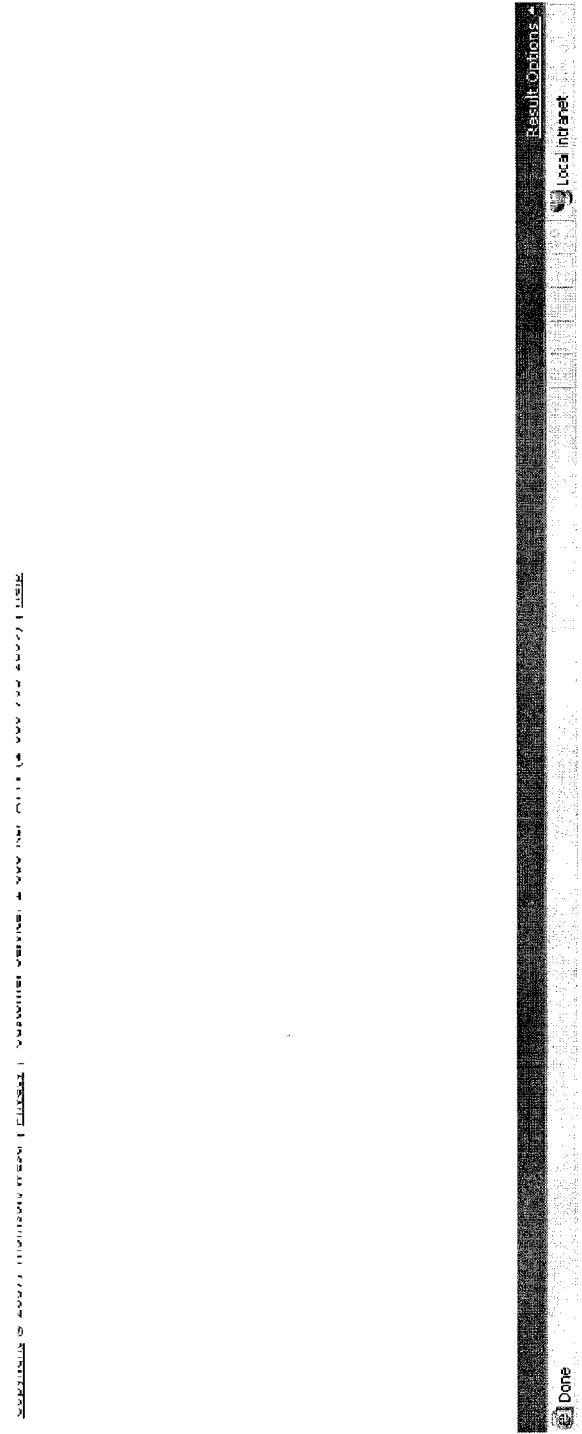
FIG. 12

FIG. 13A

Westlaw | Expert | Litigation | Minnesota | Add/Remove Tabs

Edit Search

*Profiles without check boxes cannot be compared.

Result: 12 Documents

[Compare]  SELECT UP TO THREE (3) TO COMPARE

☐ 1. PROFILES OF EXPERT WITNESS COLIN M BLOOR LA JOLLA CA 92093 Medical & Surgical - Surgery -- General Medical & Surgical - Cardiology & Cardiovascular Surgery Criminal, Fraud and Personal Identity - Pathology ☐ 2. PROFILES OF EXPERT WITNESS FRANK LEO LANZA, MD HOUSTON TX 77074 Medical & Surgical - Gastro/Gastric (Stomach) Medical & Surgical - Physicians/General Practitioners ☐ 3. PROFILES OF EXPERT WITNESSES JANE SARROWS, MD LOS ANGELES CA Medical & Surgical - Malpractice Medical & Surgical - Physicians/General Practitioners ☐ 4. PROFILES OF EXPERT WITNESS DONNA SCHAFER, MD SAN FRANCISCO CA 94115 Medical & Surgical - Cardiology & Cardiovascular Surgery Medical & Surgical - Physicians/General Practitioners ☐ 5. PROFILES OF EXPERT WITNESS DAVID S SILVER, MD BEVERLY HILLS CA Medical & Surgical - Arthritis/Rheumatic Medical & Surgical - Internal Medicine 6. PROFILES OF EXPERT WITNESS, J ALLEJOS, MD LOS ANGELES CA Medical & Surgical - Cardiology & Cardiovascular Surgery Medical & Surgical - Pediatrics 7. PROFILES OF EXPERT WITNESS ENOS TRENT ANDREWS, MD SAN FRANCISCO CA 94118 Medical & Surgical - Surgery -- General Medical & Surgical - Physicians/General Practitioners

Site Map

Search Westlaw
- Directory (Database Directory)
- Find a Database Wizard
- Key Number Digest (Custom Digest)
- KeySearch
- Search Court Docs
- Tabs (Research Start Pages)

Citator (KeyCite)
- KeyCite a citation
- KeyCite Alert
- Table of Authorities

Browse Westlaw
- 50 State Surveys
- Directory (Database Directory)
- Key Number Digest (Custom Digest)
- KeySearch
- Table of Contents
- Tabs (Research Start Pages)
- Statutes & Regulations Indexes

Manage your account preferences
- Add/Remove Tabs (My Westlaw)
- Change Client ID
- Preferences (Options)
- Print/Delivery Manager
- QuickView+

Alerts
- Alert Center
- Docket Alerts and Tracks
- Dun & Bradstreet (D&B) Alert

Find a Document
- 50 State Surveys
- Find a brief by party name
- Find a case by citation
- Find a case by party name
- Table of Contents
- Statutes & Regulations Indexes

Find a Person
- Expert Challenge Reports *NEW*
- Expert Comparison Reports *NEW*
- Expert Evaluator Reports *NEW*
- Profiler
- Profiler Attorney or Judge
- Profiler Expert
- Public Records Directory

Tools
- Create a PRO Plan List
- Order Documents Online
- Print/Delivery Manager
- Research Trail
- Send a Tab

Help Center
- Customer Support Contact (phone numbers)
- Getting Started Tips
- Help
- Troubleshooting

| CRITERIA | COLIN M BLOOR<br>Pathologist<br>UCSD School of Medicine<br>La Jolla, CA 92093 | FRANK LEO LANZA, MD<br>Gastroenterologist<br>7777 Southwest Fwy, Suite 762<br>Houston, TX | DAVID S SILVER, MD<br>Rheumatologist<br>Irvine, CA |
|---|---|---|---|
| 1. Areas of Expertise | Medical & Surgical - Surgery - General, - Cardiology & Cardiovascular Surgery, - Internal Medicine, - Malpractice, - Neurology/Neurosurgery, - Nuclear Medicine, - Oncology (Cancer), - Pain (Chronic), - Radiology, - Physicians/General, - Gastro/Gastric, - Arthritis/Rheumatic | Medical & Surgical - Gastro/Gastric (Stomach), - Physicians/General Practitioners | Medical & Surgical - Arthritis/Rheumatic, - Internal Medicine |
| 2. Appearance Summary | | | |
| Cases | 159 | 47 | 12 |
| Dockets | 35 | 10 | 4 |
| Jury Verdicts | 25 | 15 | 0 |
| Andrews Lit. Rep. | 43 | 19 | 5 |
| | 56 | 3 | 0 |
| 3. Roles | | | |
| Plaintiff | 129 | 27 | 7 |
| Defendant | 125 | 24 | 5 |
| Other Legal Roles | 4 | 3 | 2 |
| | 11 | 7 | 3 |
| 4. Trial Docs & Testimony | | | |
| Testimony | 84 | 51 | 36 |
| Trial Pleadings | 22 | 9 | 3 |
| Trial Motions, Memoranda | 14 | 7 | 6 |
| & Affidavits | 13 | 11 | 12 |
| 5. Attorneys | Dalton, Bartholomew J. (-6)<br>Simon, Laura J. (35)<br>Malone, Patrick A. (34) | Simon, Laura J. (25)<br>Malone, Patrick A. (5)<br>Rafferty, Carol (2) | Mitchell, Thomas J. (42)<br>Karam, Peter (6) |

Expert Comparison (January 2001 - June 2006)

| CRITERIA | COLIN M BLOOR<br>Pathologist<br>UCSD School of Medicine | FRANK LEO LANZA, MD<br>Gastroenterologist<br>7777 Southwest Fwy, Suite 762 | DAVID S SILVER, MD<br>Rheumatologist<br>Irvine, CA |
|---|---|---|---|
| 1. Areas of Expertise | Medical & Surgical - Surgery--General, - Cardiology & Cardiovascular Surgery, - Internal Medicine, - Malpractice, - Neurology/Neurosurgery, - Nuclear Medicine, - Oncology (Cancer), - Pain (Chronic), - Radiology, - Physicians/General, - Gastro/Gastric, - Arthritis/Rheumatic | Medical & Surgical - Gastro/Gastric (Stomach), - Physicians/General Practitioners | Medical & Surgical - Arthritis/Rheumatic, - Internal Medicine |
| 2. Appearance Summary |  |  |  |
| Cases | 35<br>35 | 10<br>10 | 4<br>4 |
| 3. Roles |  |  |  |
| Plaintiff | 125<br>125 | 24<br>24 | 5<br>5 |
| 4. Trial Docs & Testimony |  |  |  |
| Testimony | 84 | 51 | 36 |
| Trial Pleadings | 23 | 9 | 3 |
| Trial Motions, Memoranda | 14 | 7 | 6 |
| & Affidavits | 13 | 11 | 12 |
| 5. Attorneys | Dalton, Bartholomew J. (46)<br>Simon, Laura J. (35)<br>Malone, Patrick A. (34) | Simon, Laura J. (25)<br>Malone, Patrick A. (5)<br>Rafferty, Carol (2) | Mitchell, Thomas J. (42)<br>Karam, Peter (6) |

Westlaw

Westlaw | Expert | Litigation | Minnesota | Add/Remove Tabs

Edit Search

COLIN M BLOOR
Pathologist
UCSD School of Medicine
La Jolla, CA 92093

Area(s) of Expertise: Medical & Surgical - Surgery -- General, Cardiology & Cardiovascular Surgery; Criminal, Fraud and Personal Identity - Pathology Date Range: From 2001 To: 2006 [Submit]

Advanced Filter

Expert Challenge Report for Colin M. Bloor (January 2001 - June 2005)

| Case | Date | Result of Challenge | Role | Attorney | Primary Case Type | Court | Judge | Opinion/Docket | Expert Ct Docs |
|------|------|---------------------|------|----------|-------------------|-------|-------|----------------|----------------|
| In re Vioxx Products Liability Litigation | 2005 | Permitted View Testimony | Plaintiff | Simon, Laura J. | Products Liability | E.D.La. | Fallon | 401 F.Supp.2d 565 | Expert Ct Docs |
| Long v. Weider Nutrition Group, Inc. | 2004 | Permitted in part | Plaintiff | Stein, Joel | Products Liability | Del.Super | Johnston | ▲ 2004 WL 1543226 | Expert Ct Docs |
| In re Diet Drugs | 2001 | Excluded View Testimony | Plaintiff | Malone, Patrick A Nelson, Rohor | Products Liability | E.D.Pa. | Bechtle | H 2001 WL 454506 | Expert Ct Docs |
| Fortner Helen v. Mullikin Med Ctr | 2001 | Excluded View Testimony | Plaintiff | Dalton, Barth J. Garcia, Alberto Jones, Tim Smith Kay Stein Joel More | Medical Malpractice | Superior Court, Los Angeles County | Stanton | YC031201 | Expert Ct Docs |

Expert Evaluator Report for Colin M. Bloor

Appearance Summary (January 2001-June 2006)

| Appearance Summary | 2001 | 2002 | 2003 | 2004 | 2005 | 2006 | Total |
|---|---|---|---|---|---|---|---|
| Cases | 22 | 26 | 29 | 27 | 18 | 13 | 135 |
| Dockets | 12 | 8 | 12 | 9 | 10 | 5 | 56 |
| Jury Verdicts | 16 | 2 | 1 | 2 | 0 | 16 | 37 |
| Andrews Lt Rep | 11 | 12 | 5 | 5 | 2 | 0 | 35 |
| Total | 61 | 48 | 47 | 43 | 30 | 34 | 348 |

Roles (January 2001-June 2006)

| Roles | 2001 | 2002 | 2003 | 2004 | 2005 | 2006 | Total |
|---|---|---|---|---|---|---|---|
| Plaintiff | 27 | 31 | 9 | 27 | 8 | 13 | 125 |
| Defendant | 1 | 2 | 1 | 2 | 0 | 1 | 7 |
| Other Legal Roles | 1 | 5 | 2 | 0 | 2 | 1 | 11 |
| Total | 29 | 38 | 12 | 29 | 11 | 15 | 144 |

Expand List | Collapse List

Trial Docs & Testimony (January 2001-June 2006)

Expert Comparison Report for Colin M. Bloor; Frank Leo Lanza, MD; David S. Silver, MD

| CRITERIA | COLIN M BLOOR<br>Pathologist<br>UCSD School of Medicine<br>La Jolla, CA 92093 | FRANK LEO LANZA, MD<br>Gastroenterologist<br>7777 Southwest Fwy, Suite762<br>Houston, TX | DAVID S SILVER, MD<br>Rheumatologist<br>Irvine, CA |
|---|---|---|---|
| 1. Appearance Summary | | | |
| Cases | 159 | 47 | 12 |
| Dockets | 95 | 10 | 4 |
| Jury Verdicts | 25 | 15 | 3 |
| Andrews Lit. Rep. | 43 | 19 | 5 |
|  | 56 | 3 | 0 |
| 2. Roles | | | |
| Plaintiff | 129 | 27 | 7 |
| Defendant | 125 | 24 | 5 |
| Other Legal Roles | 4 | 3 | 2 |
|  | 11 | 7 | 3 |
| 3. Trial Docs & Testimony | | | |
| Testimony | 84 | 51 | 36 |
| Trial Pleadings | 23 | 9 | 3 |
| Trial Motions, Memoranda | 14 | 7 | 6 |
| & Affidavits | 13 | 11 | 12 |
| 4. Attorneys | | | |

SYSTEM, METHOD, AND SOFTWARE FOR RESEARCHING, ANALYZING AND COMPARING EXPERT WITNESSES

CROSS-REFERENCE TO RELATED APPLICATION

This application claims priority under 35 U.S.C. §120 of U.S. patent application Ser. No. 12/319,132, filed 31 Dec. 2008, now allowed, having the same title and inventive entity as the instant application, which application in turn claims benefit under 35 U.S.C. §119(e) of U.S. Provisional Application 61/009,692, filed on Dec. 31, 2007. The complete disclosures of these applications are hereby incorporated in their entirety herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to this document: Copyright © 2007, Thomson Reuters Global Resources.

TECHNICAL FIELD

Various embodiments of the present invention relate to systems and method for researching, evaluating, and comparing expert witnesses.

BACKGROUND

One of the fundamental aspects of the American legal system, and indeed many others across the world, is the use of impartial fact finders to resolve legal disputes. Whether the fact finder takes the form of a judge or a jury, its function is to take in evidence regarding a particular legal dispute and to draw conclusions about what happened or didn't happen based on this evidence. In today's complex world, impartial fact finders regularly encounter maters about which they know little or nothing, matters involving the intricacies or limitations of science, medicine, economics, and technology, for example.

In these instances, fact finders typically rely on expert witnesses whose experience and/or training in a given field can be useful to teaching the fact finders enough to discern likely fact from likely fiction. In high-stake legal disputes it is common for both sides to have their own expert witness. Often, these legal disputes reduce to a duel of opposing expert witnesses, with each expert presenting an alternative evaluation or conclusion about some technical issue beyond the real-world knowledge of the fact finder. In these contests, the choice of expert witness often turns out to be a crucial factor in the successful resolution of the dispute for the prevailing side.

As such, lawyers spend considerable time, attention, and money not only evaluating and selecting expert witnesses to advocate the positions of their own clients, but also evaluating and critiquing expert witnesses advocating opposing positions.

One problem the present inventors recognized is the lack of efficient tools for helping lawyers evaluate expert witnesses. Conventionally, evaluation expert witnesses entails using online legal research systems, such as the Westlaw™ legal research system, to find judicial opinions that mention particular experts, study these opinions, and then draw conclusions about which experts may or may not be appropriate to support them in a new dispute. Typically, this process not only takes many hours of time-consuming analysis of cases and expert testimony, but is also fraught with the potential for errors, such as overlooking particular patterns or tendencies of a particular expert. Moreover, for comparing multiple experts the problems are only multiplied.

Accordingly, the present inventors identified a need for a better way of evaluating expert witnesses.

SUMMARY

To address this and/or other needs, the present inventors devised, among other things, system, methods, and interfaces for researching, evaluating, and comparing expert witnesses. One exemplary system includes interfaces that facilitate users entering queries regarding experts based on name or subject matter and filtering search results based on damage awards, case types, attorneys, clients and date range. The system also enables side-by-side comparisons of the cumulative litigation history for multiple experts, and provides an expert challenge report that indicates whether an expert has been challenged in past litigation, the result of the challenge, the presiding judge, and the text of the challenged testimony.

BRIEF DESCRIPTION OF THE DRAWINGS

FIGS. 1-47 are facsimiles of exemplary graphical user interfaces which are used within a system and which correspond to one or more embodiments of the present invention.

FIG. 1 shows an exemplary graphical user interface for a legal research system;

FIG. 2 shows a "Links for" tab interface for an expert profile in PROFILER;

FIG. 3 shows an exemplary interface that depicts implicit relationships between an expert and cases, dockets and trial documents;

FIG. 4 shows the "Links for" tab for a judge profile in PROFILER;

FIGS. 5 and 6 show that links to Expert Evaluator Report, Expert Challenge Report and Expert Comparison Report are accessible from the Expert and Litigation tabs;

FIG. 7 shows an exemplary expert evaluator report template for searching and generating an expert evaluator report;

FIG. 8 shows an exemplary template interface for initiating search and generation of an expert comparison report based on specific experts;

FIG. 9 shows an exemplary template interface for initiating search and generation of an expert comparison report based on an "area of expertise" search;

FIGS. 10 and 11 show a search screen template for Expert Evaluation Report, Expert Challenge Report and Expert Comparison Report, and a result list generated including hypertext links;

FIG. 12 shows an exemplary result list interface for an expert challenge report;

FIG. 13A shows the result list for the Expert Compare Report;

FIG. 13B shown links to Expert Evaluator Report, Expert Comparison Report and Expert Challenge Report are added alphabetically under the "Find a Person" heading on a "Site Map" page;

FIG. 14 shows links to the Expert Evaluator Report, Expert Comparison Report and Expert Challenge Report displayed in the 'Links for' tab for all Jury Verdicts and Expert Testimony content;

FIG. 15 shows a pane that contains the Expert Evaluator Report;

FIG. 16 shows a filtered Expert Appearances List;

FIG. 17 shows an Advanced Filter feature allowing users to select multiple criteria for a single report when filtering;

FIG. 18 shows a new screen appearing when the user clicks Advanced Filter;

FIG. 19 shows the Expert Evaluator Report displaying links in a pane under an Expert Evaluator heading;

FIG. 20 shows the Appearance Summary report summarizing, year-by-year, the number of cases, dockets, jury verdicts and Andrews Litigation Reporters for an expert over a range of years;

FIG. 21 shows a Roles report having breakdowns by expert role, year-by-year, the number of cases, dockets, jury verdicts and Andrews Litigation Reporters for an expert over a range of years;

FIGS. 22 and 22A show a Trial Documents and Testimony report having breakdowns, year-by-year, by document type, number of expert testimonies, trial pleadings, trial motions, appellate petitions and appellate briefs for an expert over a range of years;

FIG. 23 shows an Attorneys report listing, year-by-year, the attorneys for the cases, dockets, jury verdicts and Andrews Litigation Reporters that an expert was associated with, over a range of years, and the number of times associated.

FIGS. 24 and 24A show a Parties report having breakdowns, year-by-year, by client, number of cases, dockets, jury verdicts and Andrews Litigation Reporters for an expert over a range of years;

FIG. 25 shows a Courts report which breakdowns by federal court, year-by-year, the number of filed dockets, the number of Andrews Reporters, the number of Jury Verdicts and the number of case opinions for an expert over a range of years;

FIG. 26 shows a Judges report having breakdowns by judge, year-by-year, the number of filed dockets, the number of Andrews Reporters, the number of Jury Verdicts and the number of case opinions for an expert over a range of years;

FIGS. 27 and 27A show a Case Types report having breakdowns by practice area, year-by-year, the number of filed dockets, the number of case opinions, jury verdicts and Andrews Litigation Reporters for an expert over a range of years;

FIG. 28 shows an Awards report breakdown by the award ranges currently assigned to the Jury Verdict data, year-by-year, and the number of Jury Verdicts for an expert over a range of years;

FIG. 29 shows an application running each case through a classification system to match the case to three different case types from a hierarchy;

FIG. 30 shows the search running against PROFILER for names;

FIGS. 31A, 31B, and 31C show exemplary interfaces that are rendered in response to a user selecting experts from a results list for comparison;

FIG. 32 shows the search functionality for the text boxes identical to existing search functionality in PROFILER when a user enters a name;

FIG. 33 shows a basic filtering occurring from any links in the left-most column;

FIG. 34 shows a Challenge Report feature allowing the user to input various criteria into the Challenge Report template to create a report that shows challenged expert witness testimony;

FIG. 35 shows an instance where there are multiple judges listed for a case in the Judge column, sorting based on the name of the judge listed as the first multiple;

FIGS. 36 and 36A show the Result of Challenge column with each cell containing one link to an expert testimony list of documents regarding the specific challenge to the specific expert in the report, and a doc list containing documents pertaining to the expert in the case displayed by clicking on that link;

FIGS. 37 and 37A show the Judge link, and the profile of the selected judge in PROFILER;

FIG. 38 shows the Expert Challenge Report displayed in full screen;

FIGS. 39 & 40 show a view of a judge's profile in PROFILER, and the Expert Challenge Report for that particular judge available by clicking on the Expert Challenge Report link;

FIGS. 41 & 41A show screen shots the display responsive to the user selecting the advanced filter button;

FIG. 42 shows an Expert Evaluator Reports ResultsPlus link in a results list responsive to a query containing an expert field restriction against the Expert Testimony database;

FIG. 43 shows the Expert Evaluator Reports ResultsPlus link in a left pane for all documents returned by the search;

FIGS. 44, 45, 46, and 47 show screen shots of exemplary print outs of each expert report and a cover sheet.

DETAILED DESCRIPTION OF THE EXEMPLARY EMBODIMENT(S)

This description describes one or more specific embodiments of one or more inventions. These embodiments, offered not to limit but only to exemplify and teach the inventive subject matter, are shown and described in sufficient detail to enable those skilled in the art to implement or practice the various embodiments of the invention. Thus, where appropriate to avoid obscuring the inventive subject matter, the description may omit certain information known to those of skill in the art.

Notes and Terms

Note that the features of various embodiments may be combined with features of other embodiments to yield other embodiments not expressly delineated as such.

The processes, graphical user interfaces, and data sets shown and/or described herein are generally stored in a machine readable medium, such as an electronic, optical, magnetic, or ferromagnetic medium, as coded program instructions and/or data. These machine readable media may be used in combination with one or more processors within a single computing or data processing system or within multiple systems that are interlinked, for example via a local or wide-area network.

The terms mentioned below are used throughout this document and their definitions are provided to better understand the description. Major elements are individual entries in a report which occur frequently enough to be listed individually in a report. Major elements are the top ten items in the list by frequency. Minor elements are individual entries in a report that occur so infrequently that they are grouped together under the "Other" heading in the report. Minor elements are those that appear less often than the top ten items do. An exemplary expert evaluator report is a report that contains a complete set of sub-reports for an expert, such as the case types report. An exemplary expert comparison report is a report that allows multiple experts, for example, three experts to be compared at a high level. Expert challenge report describes a report that contains specific information on an expert's admissibility record and included rulings by judges on the admissibility of the expert's testimony.

Exemplary Information-Retrieval System

Figure 48:
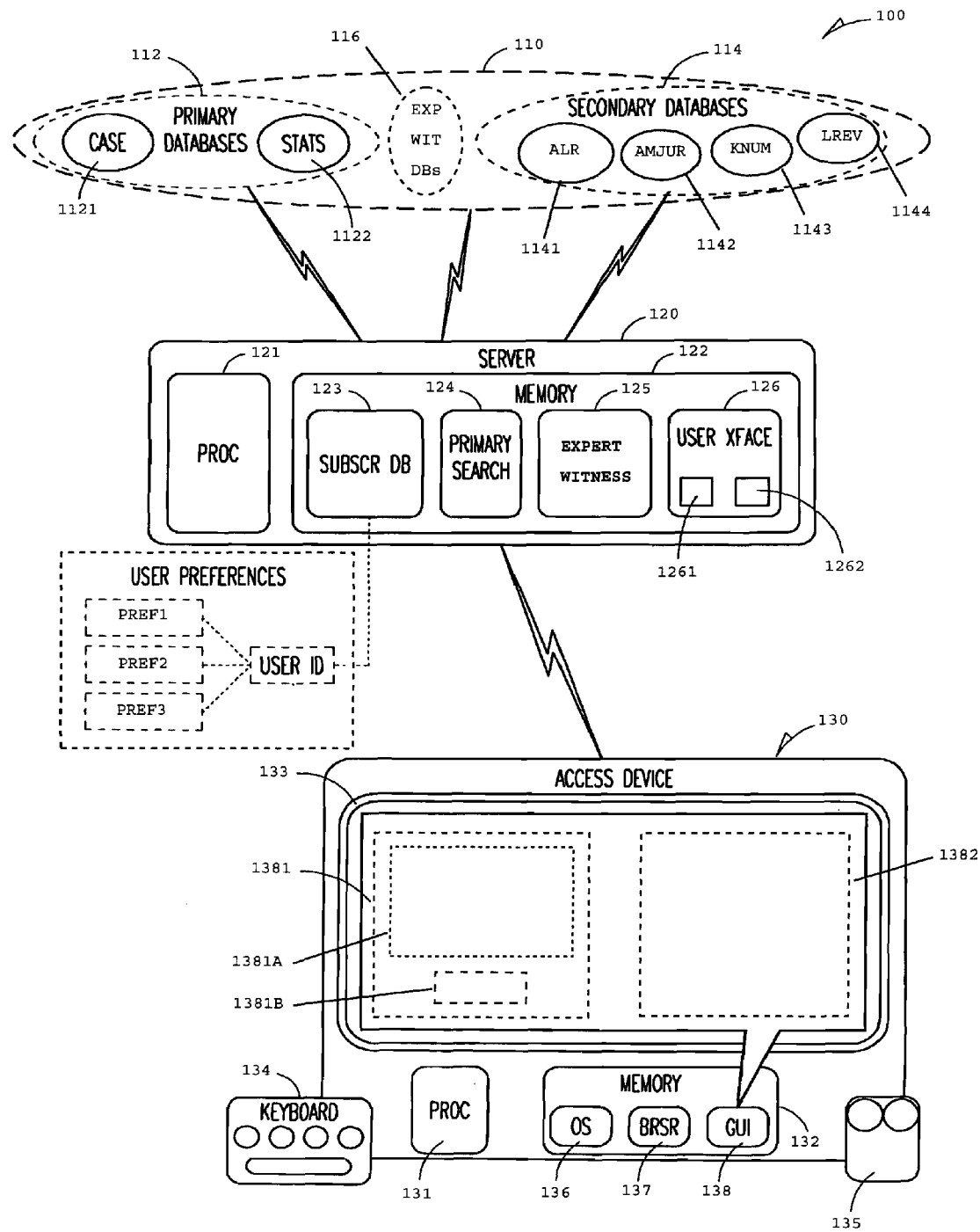
FIG. 48 is a schematic diagram of an exemplary online legal research system corresponding to one or more embodiments of the invention.

FIG. 48 shows an exemplary online information-retrieval (or legal research) system 100. System 100 includes one or more databases 110, one or more servers 120, and one or more access devices 130.

Databases 110 includes a set of primary databases 112, a set of secondary databases 114, and a set of expert witness databases 116. Primary databases 112, in the exemplary embodiment, include a caselaw database 1121 and a statutes databases 1122, which respectively include judicial opinions and statutes from one or more local, state, federal, and/or international jurisdictions. Secondary databases 114, which contain legal documents of secondary legal authority or more generally authorities subordinate to those offered by judicial or legislative authority in the primary database, includes an ALR (American Law Reports) database, 1141, an AMJUR database 1142, a West Key Number (KNUM) Classification database 1143, and a law review (LREV) database 1144. Expert witness databases 116 includes expert witness profiles and other data as described below.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, expert witness module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, expert witness module 125, and user-interface module 126.

Subscriber database 123 includes subscriber-related data for controlling, administering, and managing pay-as-you-go or subscription-based access of databases 110. In the exemplary embodiment, subscriber database 123 includes one or more user preference (or more generally user) data structures. In the exemplary embodiment, one or more aspects of the user data structure relate to user customization and preferences for various expert witness functionality described herein.

Primary search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Expert witness module 125 includes one or more search engines for receiving and processing queries against expert witness databases 116 and aggregating, scoring, and filtering, and presenting results in various report and user interfaces described herein. Some embodiments charge a separate or additional fee for accessing documents from the second database.

User-interface module 126 includes machine readable and/or executable instruction sets for wholly or partly defining web-based user interfaces, such as search interface 1261 and results interface 1262, over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B. Search-results region 1382 is also defined in memory and upon rendering presents a variety of types of information in response to a case law query submitted in region 1381. In the exemplary embodiment, the results region identifies one or more source case law documents (that is, one ore good cases, usually no more than five), jurisdictional information, issues information, additional key cases, key statutes, key briefs or trial documents, key analytical materials, and/or additional related materials. (See FIG. 3, which is described below, for a more specific example of a results region.) Each identified document in region 1382 is associated with one or more interactive control features, such as hyperlinks, not shown here. User selection of one or more of these control features results in retrieval and display of at least a portion of the corresponding document within a region of interface 138 (not shown in this figure.) Although FIG. 48 shows query region 1381 and results region 1382 as being simultaneously displayed, some embodiments present them at separate times.

Accessing Expert Evaluator Tool

The exemplary embodiment provides a number of points through out the graphical user interface of system 1000 for accessing the expert evaluation tools.

Search for an Expert Using PROFILER-Expert

Figure 1:
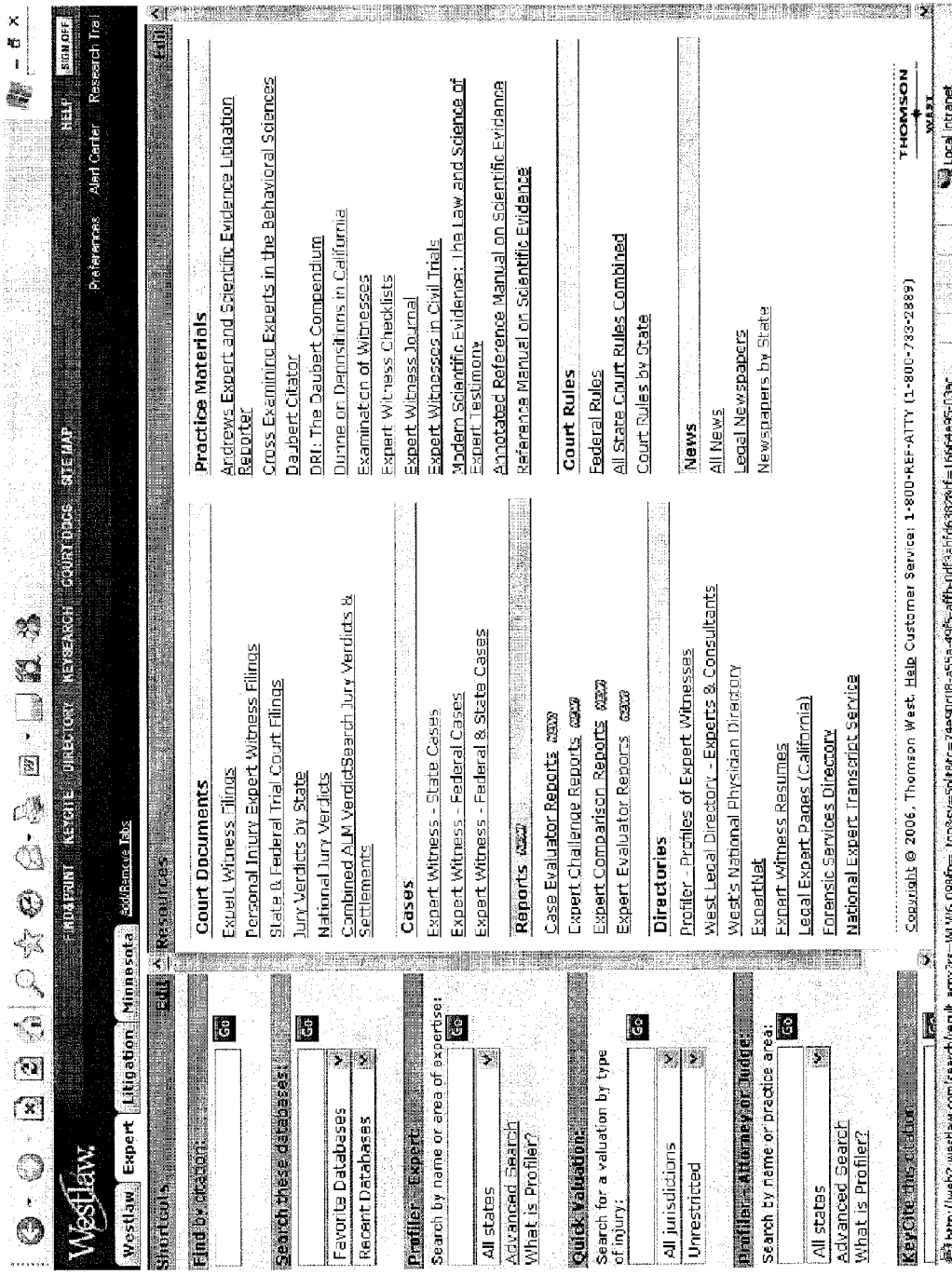

FIG. 1 shows an exemplary graphical user interface for a legal research system. Using this interface, a user can select from PROFILER left pane search utilities: "PROFILER—Expert" and "PROFILER—Attorney or Judge." These search utilities also contain links to two advanced search screens: one for experts and one for attorney/judge. (EW denotes expert witness.)

Figure 2:
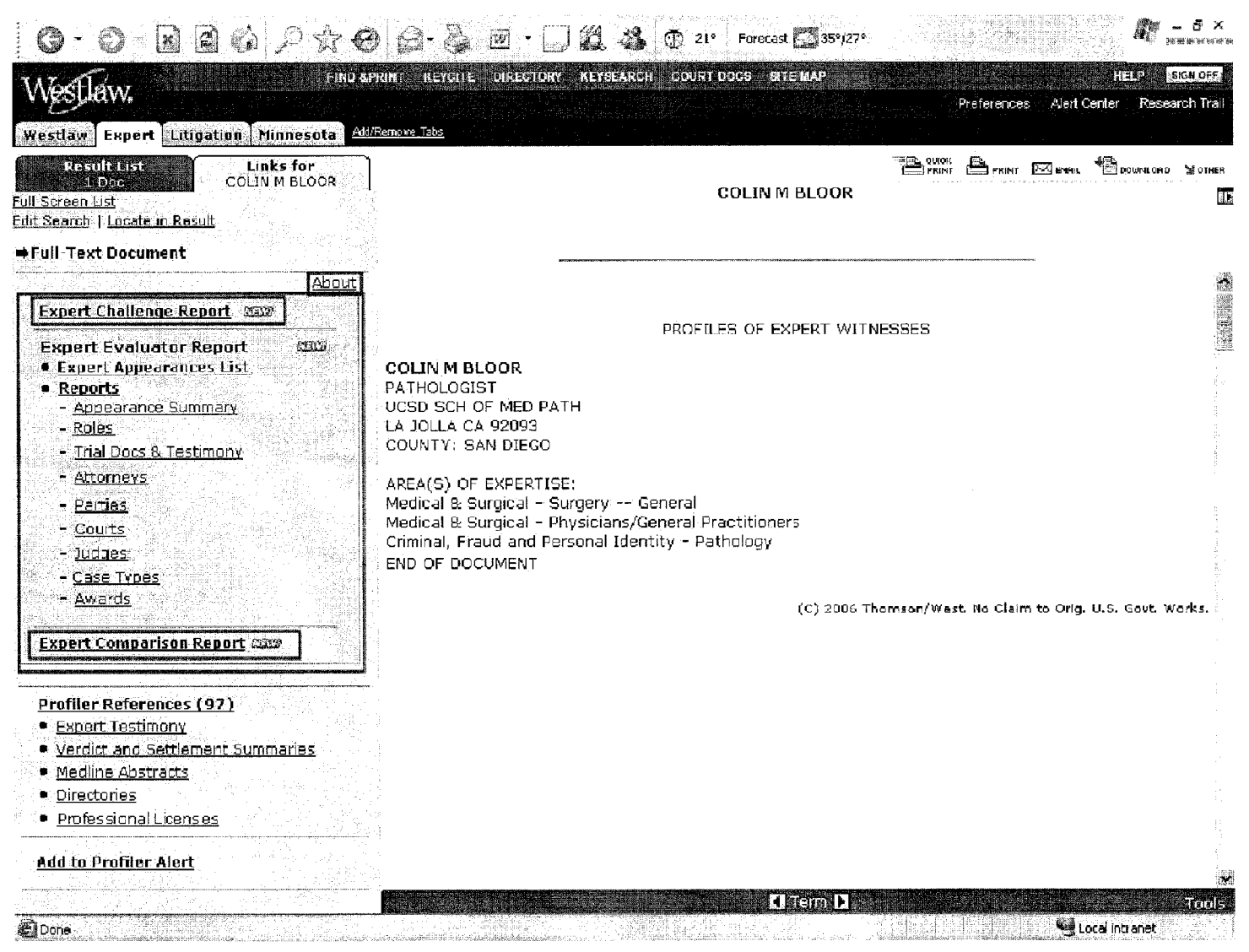

FIG. 2 shows a "Links for" tab interface for an expert profile in PROFILER that displays after a user runs an expert search and selects a listed expert by clicking on a link on the results page. This interface includes, among other things, an "Expert Challenge Report" link, an "Expert Evaluator Report" label, and an Expert Comparison Report link. Under the Export Evaluator Report label two main links appear: "Expert Appearances List" and "Reports." Under the "Reports" link are links to the different reports (subreports) included in Expert Evaluator Report (EER): appearance summary, roles, trial docs & testimony, attorneys, parties, courts, judges, case types, and awards. The Expert Comparison Report and Expert Challenge Report displays only if there is EER data available for the expert.

Figure 3:
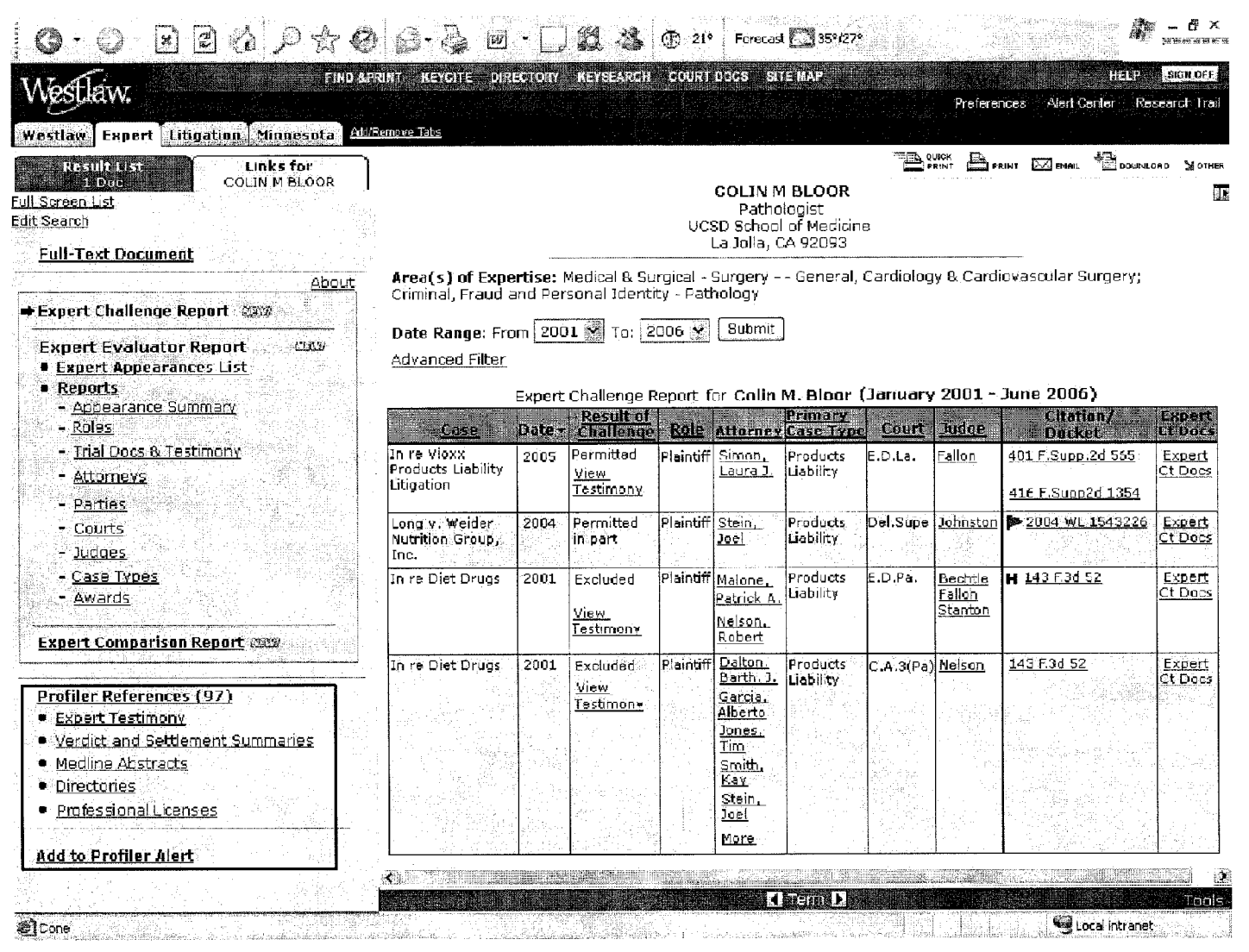

FIG. 3 shows an exemplary interface that depicts implicit relationships between an expert and cases, dockets and trial documents. These types of relationships are not identified by PROFILER engines. As these relations are created, they are made available and displayed in the PROFILER References section in the order already available in PROFILER for Attorneys and Judges. For example, just as cases and dockets are available for Attorney and Judges in PROFILER References, these types of documents are available for Experts in PROFILER References.

Figure 4:

FIG. 4 shows the "Links for" tab for a judge profile in PROFILER. This interface displays after a user runs a PROFILER search and selects a judge by clicking on a link on the results page is enhanced by adding a linked heading labeled "Expert Challenge Report." In addition to the "Expert Evaluator Report", "Expert Comparison Report" and "Expert Challenge Report" links, an "About" link is located to the right of each report and links to the help system associated with the respective Reports.

While searching for the Expert Reports associated with that expert in the PROFILER, basic filtering is used to generate the results list. A datamart utility gathers the data needed to provide the user with a results list. After a user selects to generate a Report, the system retrieves information needed to generate the report from a data warehouse.

Expert and Litigation Tabs

Figure 5:
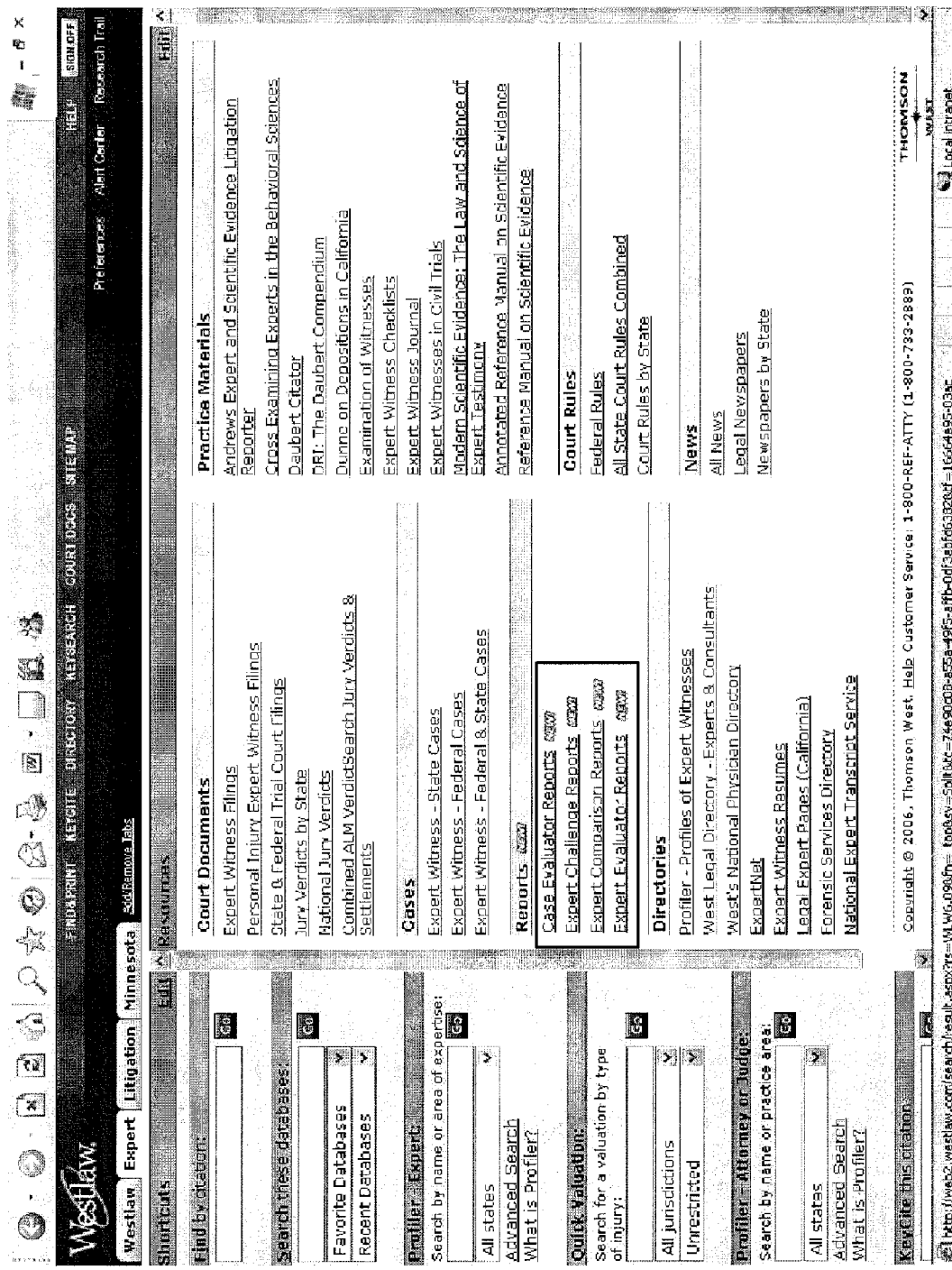
Figure 6:
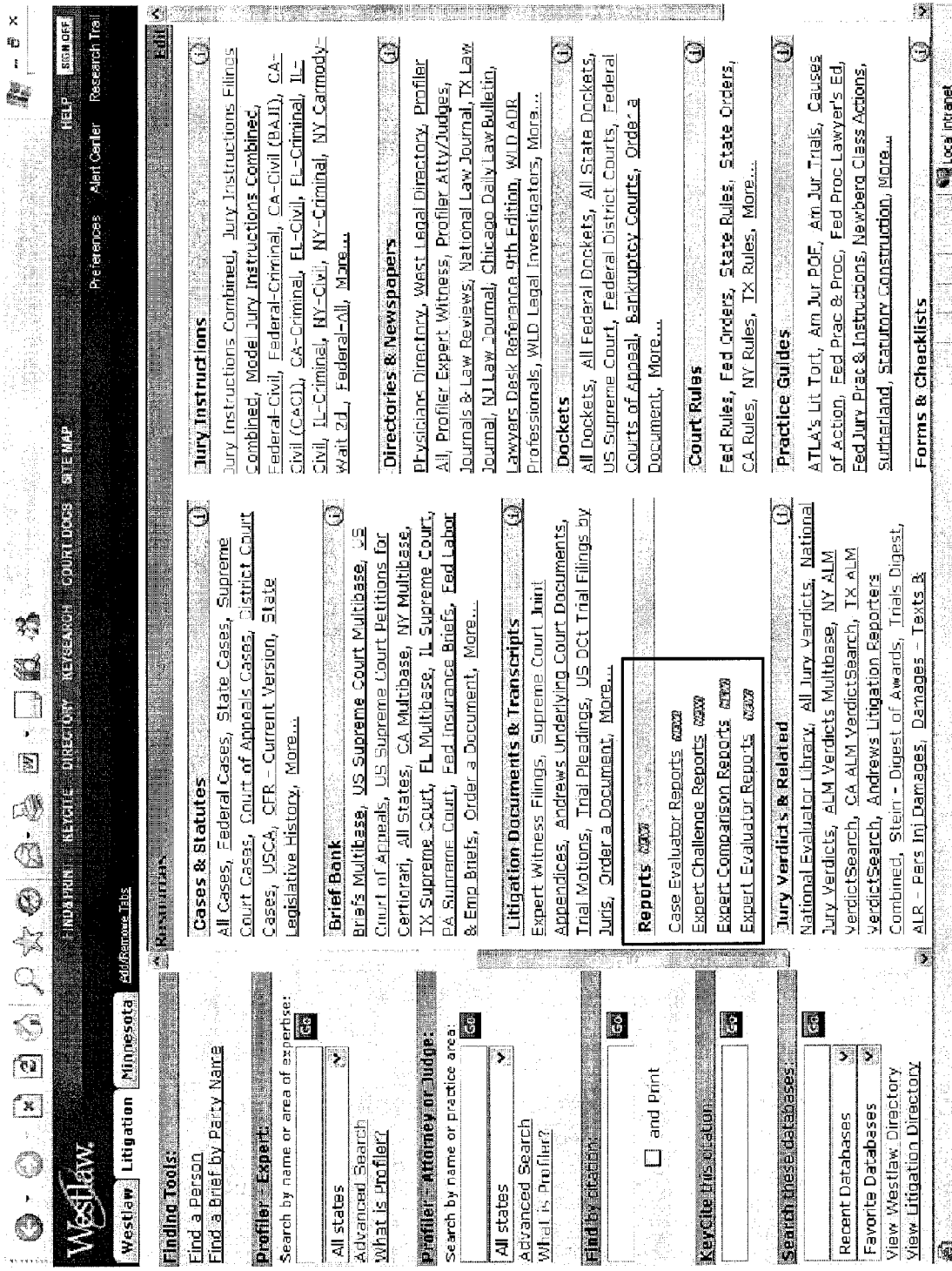

FIGS. 5 and 6 show that links to Expert Evaluator Report, Expert Challenge Report and Expert Comparison Report are accessible from the Expert and Litigation tabs and resolve to search templates specific to each report.

Figure 7:
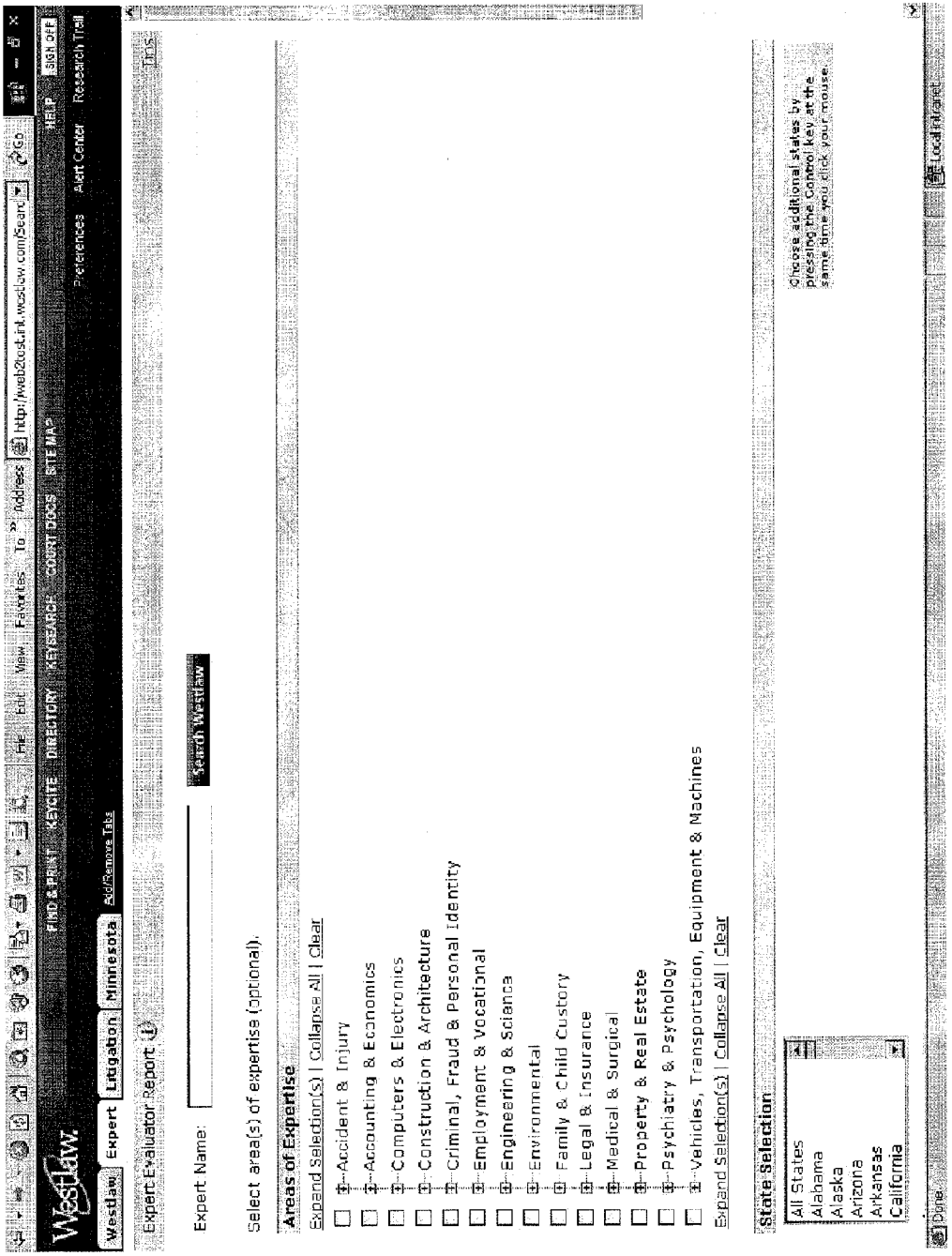

FIG. 7 shows an exemplary expert evaluator report template for searching and generating an expert evaluator report. This template allows a user to enter an expert's name, select an expertise from a hierarchy of areas of expertise, and select a state.

Figure 8:
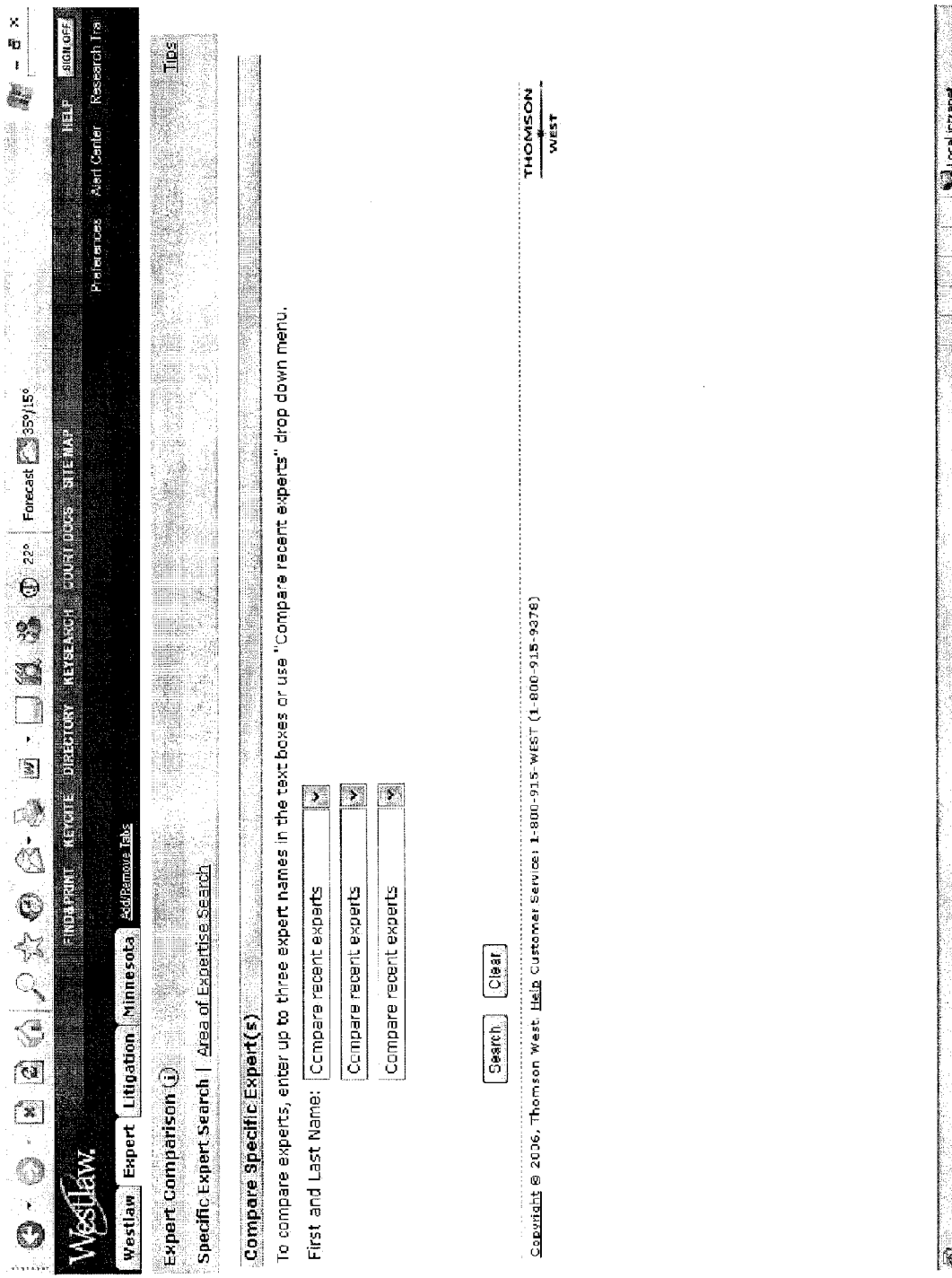

FIG. 8 shows an exemplary template interface for initiating search and generation of an expert comparison report based on specific experts. The exemplary interface allows a user to enter three expert names in three text input boxes. Each input box is associated with a drop down menu to access recently used expert names.

Figure 9:
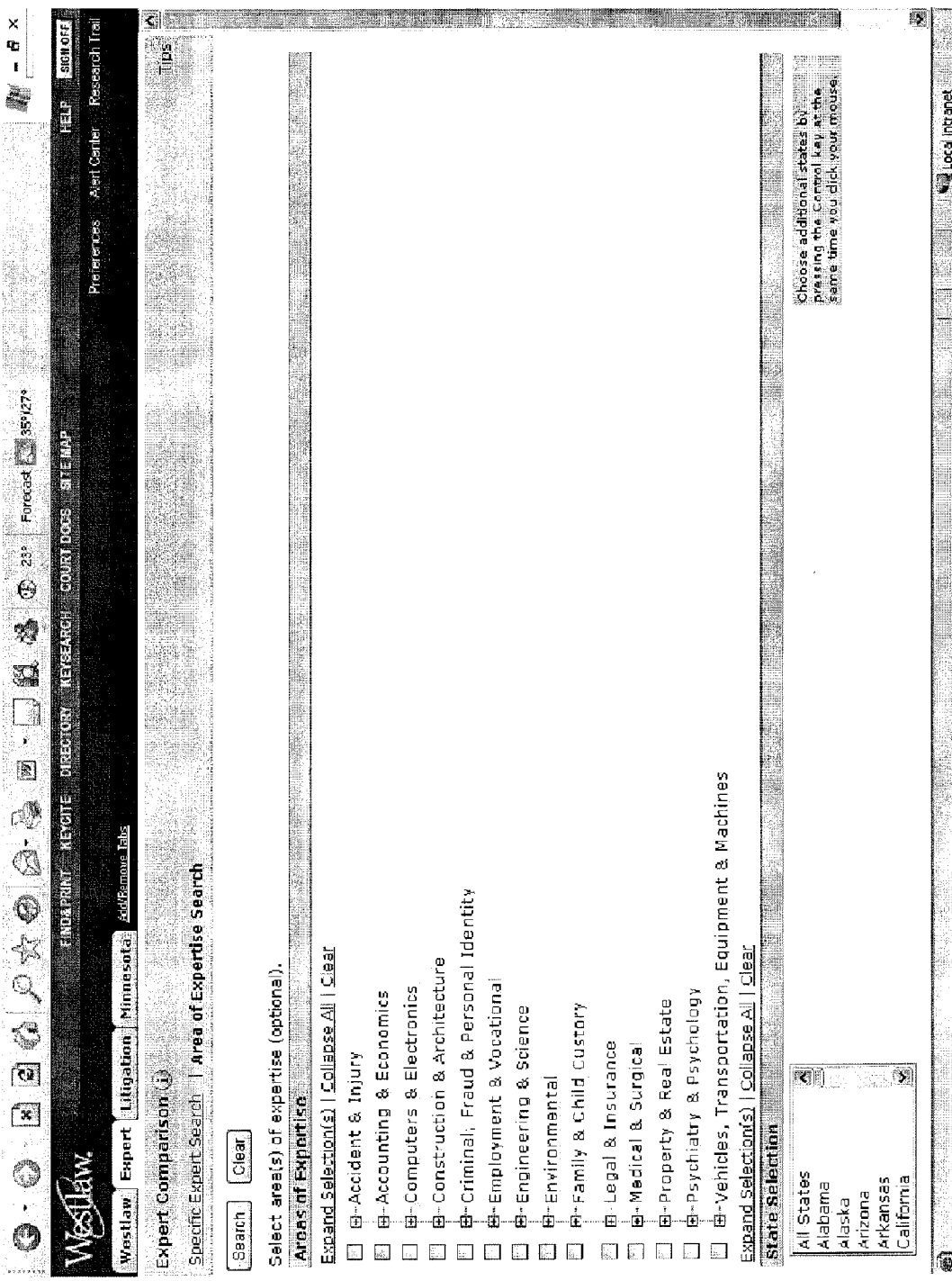

FIG. 9 shows an exemplary template interface for initiating search and generation of an expert comparison report based on an "area of expertise" search. The exemplary interface allows a user to select an expertise from a hierarchy.

Figure 10:
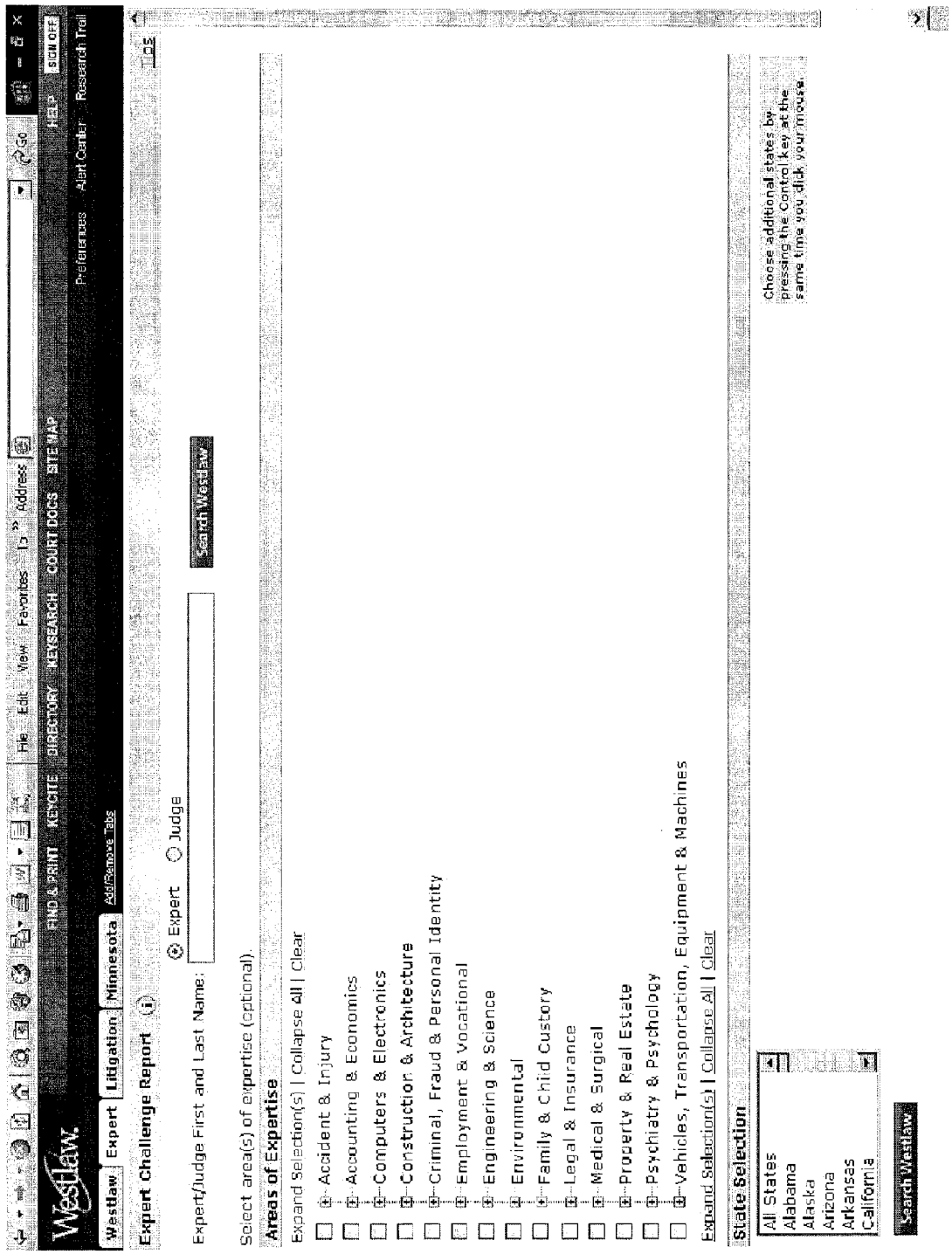

In FIG. 10, when a user searches for an expert using the template for EER, Expert Challenge Report and Expert Comparison Report, a result list is generated by checking PROFILER for any matches to the search using standard PROFILER search logic and a full screen result list displays.

In FIG. 11, the result list for the EER and Expert Challenge Report has one or two hypertext links appearing directly below each listed expert. If there is data such that an EER or Expert Challenge Report can be generated, there is a link for the requested report and one for the underlying Profile for that expert. If the requested report, EER or Expert Challenge, is not available because there is no EER data for that expert, there is only a link for the Profile. The result list for EER and Expert Challenge floats to the top of the list the results that have both the requested report and a Profile. Within these items, the results may be ranked as they are returned from Westlaw®. Within the results that do not have reports available, only Profiles, these are returned in the second grouping of the list, in the same order as they are returned from Westlaw®.

FIG. 12 shows an exemplary result list interface for an expert challenge report.

In FIG. 13A, the result list for the Expert Compare Report has check boxes that indicate which results (pulled from PROFILER) have EER data available for an expert compare report. That is, the experts that have EER data appears at the beginning of the result list and check boxes are displayed to the left of these experts. Those experts that have only profiler reports displays after the experts with EER data and does not have check boxes next to them. A user may then check up to three of the check boxes (i.e., tag) in order to compare the experts whose check boxes are checked.

In FIG. 13B, links to Expert Evaluator Report, Expert Comparison Report and Expert Challenge Report are added alphabetically under the "Find a Person" heading on the "Site Map" page.

Figure 14:
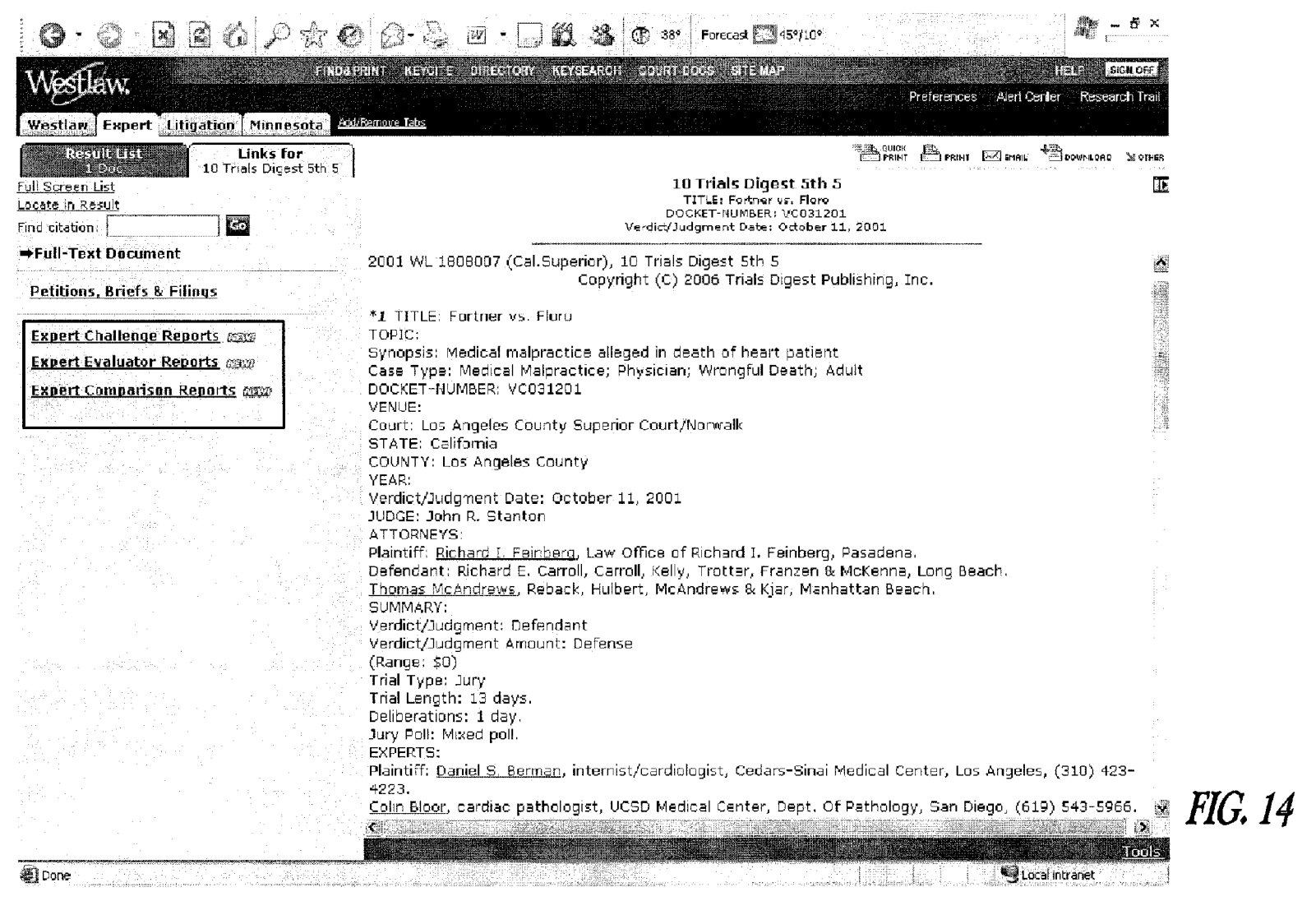

In FIG. 14, links to the Expert Evaluator Report, Expert Comparison Report and Expert Challenge Report are displayed in the 'Links for' tab for all Jury Verdicts and Expert Testimony content. The links in the left pane take the user to the general search template for each tool. The links do not go through PROFILER and do not bring back an initial report for any expert names listed in the related document on the right.

Exemplary Expert Evaluator Report Interface

Figure 15:
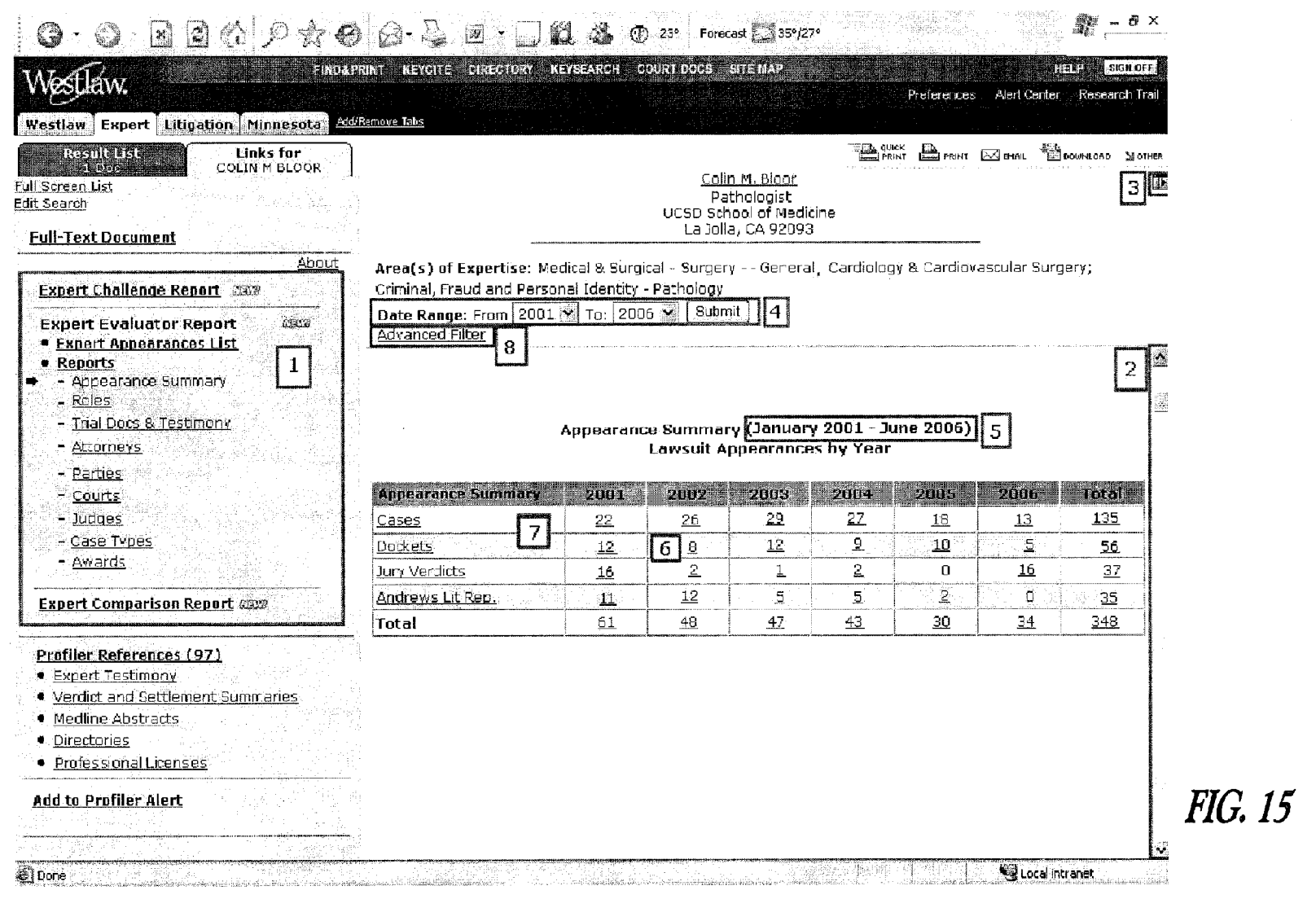

In FIG. 15, the left pane that contains the Expert Evaluator Report provides easy navigation to each report, and to the Expert Appearances List, within the profile (1). As users select any section for navigation, the corresponding text in the left pane changes from blue-hypertext to flat black text. Each link brings the user to a certain location within a scrollable report. The left pane links does not filter the report in any way. Alternatively, users may scroll through the profile using the browser's scrollbar. As a user scrolls through a report in the right window (2), the left pane remains static to provide easy access to other reports. The Expert Appearances List is not available by scrolling. A user clicks on the Expert Appearances List link and only the Appearances List appears in the right pane. A full screen view is available by clicking on the icon (3). The full screen view includes a PROFILER Alert link in the same manner that this link currently appears with the existing Westlaw® PROFILER. A user also has the option to select the date ranges (4). All of the litigation content for an expert may fall outside of the default date range. If a user clicks on the Report link, any of the report sub-links or the Expert Appearances List link, where a person has litigation content entirely outside the default date range, the system adjusts the date range according to these rules: If the most recent case or docket falls within the default date range, the system should not adjust the date range. If the most recent case or docket falls prior to the beginning of the default date range, the system should adjust the date so that the closing year in the range is the year of the most recent case and the beginning year in the range is the closing year minus 5 (allowing for a six-year view). For example, if the latest case is 1997, the date range should be 1992 to 1997. If the most recent case or docket falls less than five years after the earliest year content is available (i.e., 1990 to 1993), the beginning year of the date range should be the earliest year available. The system may adjust the report date range label as appropriate (5).

Still in FIG. 15, each criteria (in the left most column) represented in a table has a hypertext link (7), allowing a user to refresh the profile to include only those cases, dockets, jury verdicts or Andrews Litigation Reporters that meet the selected criteria. Once filtered, users can further filter a profile by selecting additional filter criteria in other reports within the profile. An advanced link allows the user to view the breakdown of the criteria into sub-criteria, and further re-filter the report to view those cases, dockets, jury verdicts and litigation reporters that meet either a specific criteria or sub-criteria (8). The numbers, and in some cases, text, in each column are links except for the number "zero" (6). The link takes the user to the filtered expert appearances list showing that particular number of documents for a specific year, and any other filtering that has been done for that row in that report. When this occurs, the date range changes to match the filtered expert appearances list and stays that way when/if the user goes on to filter the report again.

Figure 16:

In FIG. 16, by clicking on a number in the table of a report, the user "drills down" to the lowest level and goes directly to a filtered Expert Appearances List. If there is an Other row for Attorneys, Parties or Judges criteria, the numbers appearing in the Other row for those criteria are not linked, though some embodiments provide such links. If a user expands the Other row, the numbers for each individual row within the now expanded item are linked and goes to Expert Appearances Lists. This is not true for the Other row in the Roles report. The numbers are hypertext linked in the Roles Other data. Clicking on a linked number within a report takes the user to a filtered expert appearances list. The date range for the expert appearances list is now limited to the year from the column where the user clicked the link on the report. If all docs are from 2003, the date range is now filtered to 2003. If user goes back, date range changes accordingly. If user filters again but has not gone back, the date range is now at the 2003 filtered date.

Any filter set may be removed by clicking on the Remove Filter link in the header. The Remove Filter link clears the filter in all reports, not just the report being viewed when the filter is removed. The Remove Filter link does not appear in the header unless a user had filtered the profile. The Remove Filter link does not affect date restrictions.

When a user filters a profile using Basic Filter, a breadcrumb describing the filter appears in the header. The breadcrumb lists all levels of filter criteria for each report where a filter is selected. Within the breadcrumb, different reports are separated by a semi-colon and different levels of filtering within a report are separated by a comma. For example, if a user chooses Products Liability and then drills down to Evidence under Case Types, then chooses Plaintiff under Roles, the breadcrumb would look like: Filter: Products Liability; Evidence; Plaintiff. Where the length of a breadcrumb would normally require it to wrap to a second line, the breadcrumb should instead end with an ellipsis (three dots). Where this occurs, a user is able to hover the mouse over the shortened breadcrumb to see it in its entirety. When no filter has been set, the breadcrumb does not appear. As a result, the size of the header shrinks by one line.

Figure 17:
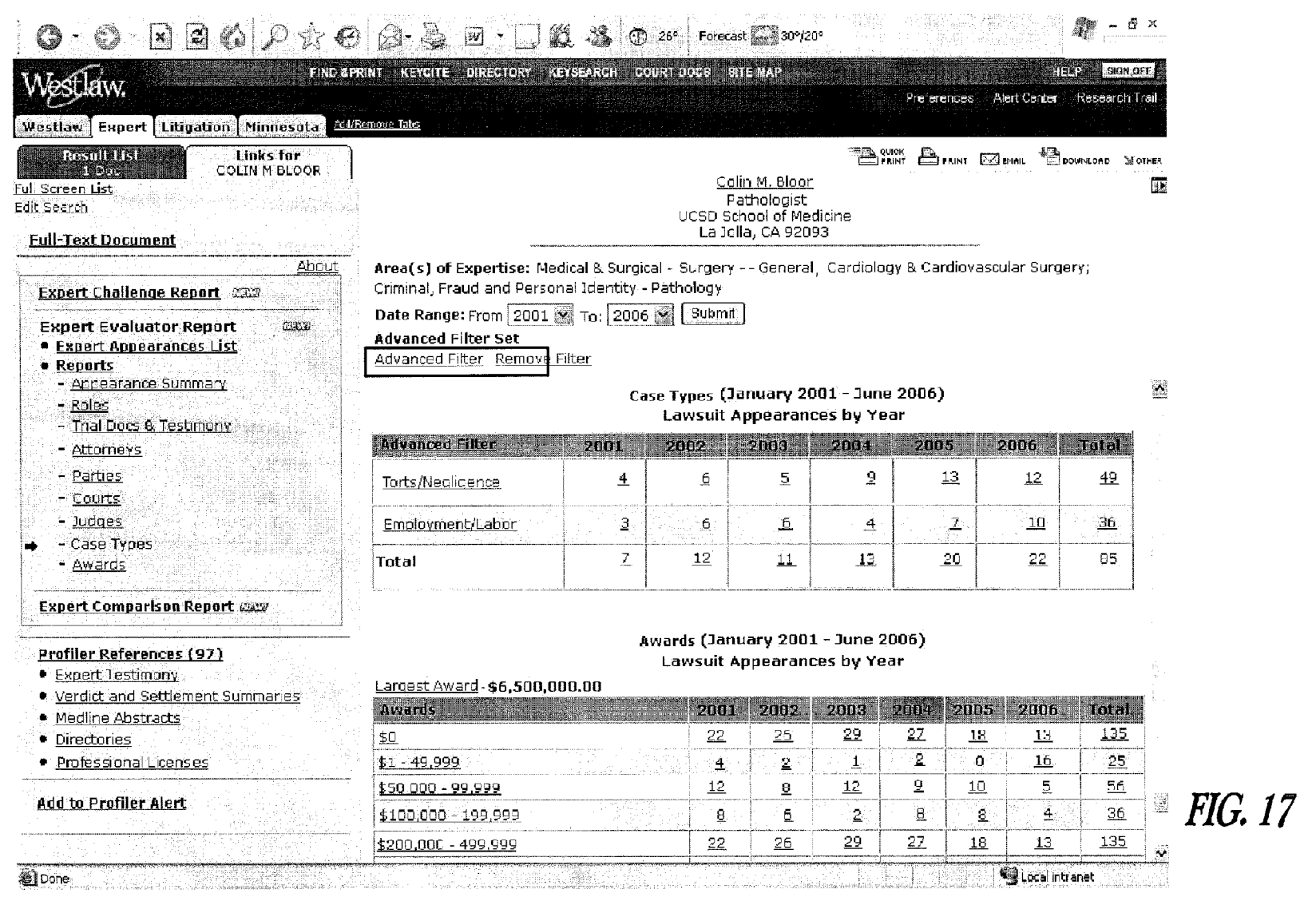

In FIG. 17, an Advanced Filter feature allows users to select multiple criteria for a single report, such as two different case types, when filtering. When a user filters a profile using Advanced Filter, the breadcrumb displays the message "Advanced Filter Set" along with the "Remove Filter" and "Advanced Filter" links. If a user adds a basic filter after an advanced filter has been set, the breadcrumb should continue to display "Advanced Filter Set." The Remove Filter link removes any filter, whether basic or advanced, set at that time. In some embodiments, there is no "mouse over" text describing the filter when Advanced Filter has been set.

Figure 18:
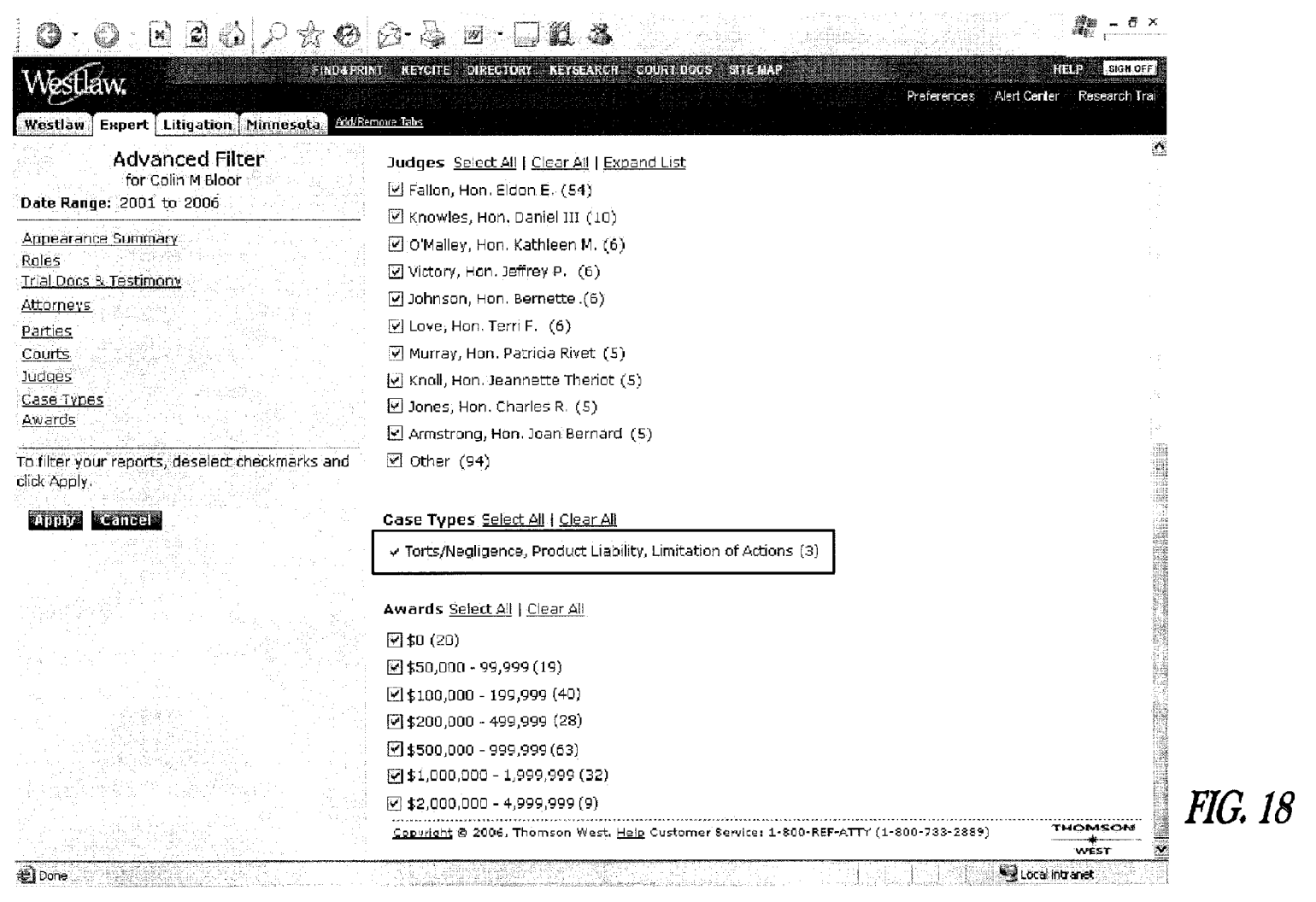

In FIG. 18, when the user clicks Advanced Filter, a new screen appears allowing the user to choose criteria from each of the reports and with check boxes for all of the elements in each report where a basic filter has not been set. The criteria for each of the reports appears on a single screen, which users can scroll through. Criteria include: Appearance Summary, Roles, Trial Docs & Testimony, Attorneys, Parties, Courts, Judges, Case Types, and Awards. Users can also move to the different reports using navigation links in the left pane. All elements appearing in advanced filter have an event count in parenthesis. The event count is equal to the Total count for that element with the date range and basic filter in place before accessing Advanced Filter. All reports include the following controls at the top of the list of check boxes adjacent to the report name: Select All—checks all check boxes for that report; Clear All—clears all check boxes for that report. For reports with drilldown capability, such as the Case Types report, Advanced Filter only allows the user to choose a filter at the highest level. Advanced Filter may allow the user to check and uncheck 'Other' in the same manner as any major or minor element. Advanced Filter may allow the user to expand a list containing minor elements in the same manner that basic filter allows. In some embodiments, Advanced Filter may not allow a user to collapse a list once it has been expanded. In Advanced filter, if a user attempts to expand a list containing more than 1000 elements only the first 1000 elements appears.

The Courts report is presented in a manner that preserves some hierarchy. When a parent court is unchecked in Advanced Filter, the children of that parent also become unchecked. In the left pane, Advance Filter includes the following controls: An Apply button, which saves all Advanced Filter criteria set by the user and exits the user from Advanced filter, a Cancel button, which exits the user from Advanced Filter without saving any of the changes made in that Advanced Filter session, and A message that states: "To filter your reports, deselect checkmarks and click Apply. Unchecking all of the entries under a report in Advanced Filter and selecting Apply, causes a warning message to display. Advanced Filter may display the date range without allowing a user to change it.

Any report where minor elements are grouped together under the "Other" heading should have "Expand List" and "Collapse List" links at the bottom of the report when the list is collapsed. When a user expands the "Other" list, the "Expand List" and "Collapse List" links appears at the top of the report and at the bottom of the expanded list. When a user is viewing the collapsed list, The "Expand List" link is active and the "Collapse List" link is inactive. The numbers appearing in each column in the Other row are not linkable when the list is collapsed. The user may expand the list to include all elements listed individually by clicking on the "Expand List" link. If the user expands the list, each individual entry has a number of litigation events in each year's column, even though the rolled up "Other" entry may not have had that information year-by-year. The numbers appearing in each column are linkable when the Other row is expanded. If a user attempts to expand a list containing more than 1000 elements only the first 1000 elements appears. In addition, any elements beyond the first 1000 remains grouped under the "Other" heading. When a user is viewing the expanded list, The "Expand List" link is inactive and the "Collapse List" link is active. The user may collapse the expanded list to regroup all minor elements under the "Other" heading by clicking on the "Collapse List" link.

Where an entire profile would have zero litigation events as the result of a date range filter may display the report header with the message: "There is no data for this section based on the current criteria." Where an individual report contains no data, even though data is available for other reports, the system may display the report header with the message: "There is no data for this section based on the current criteria."

Figure 19:
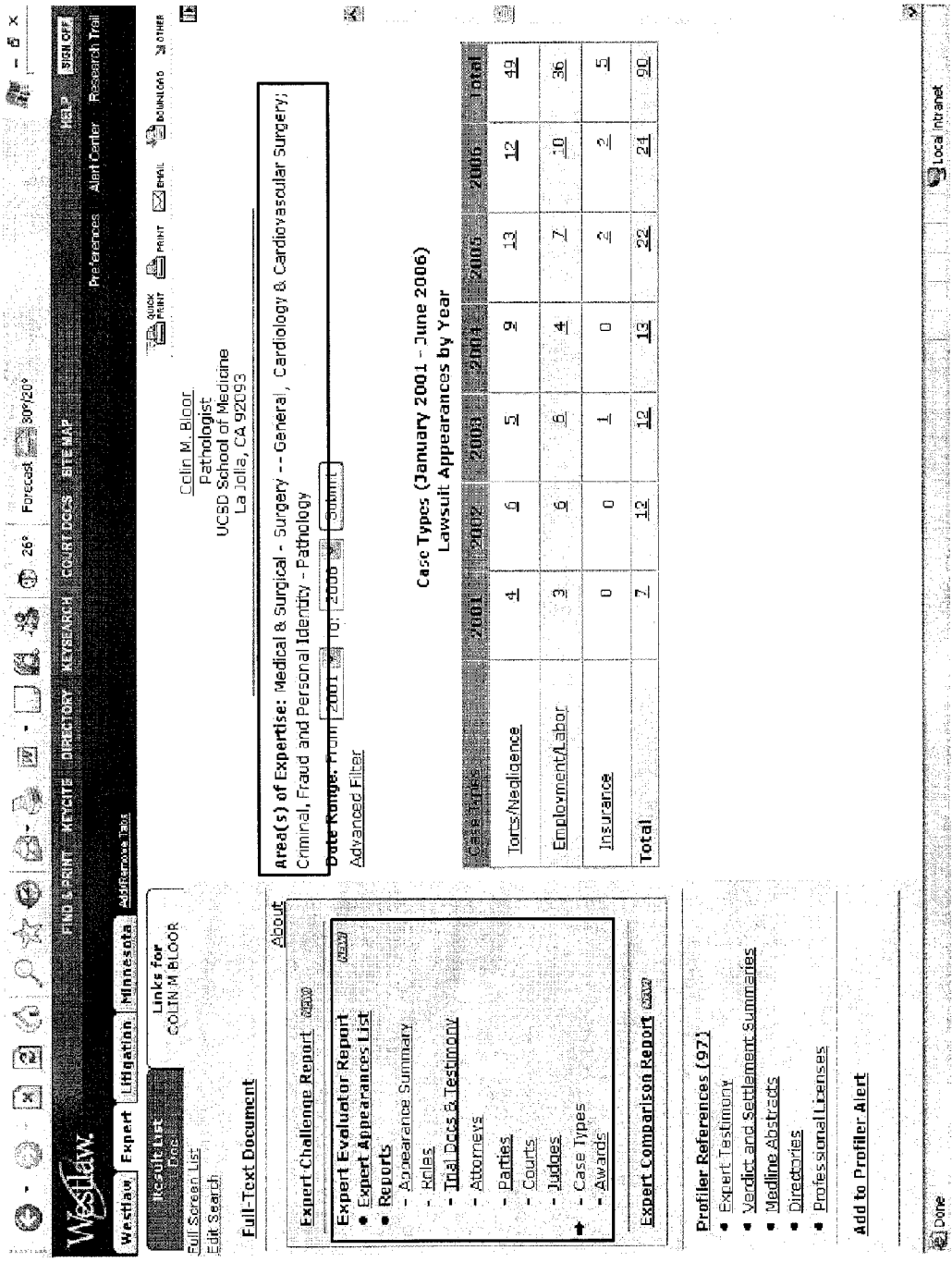

In FIG. 19, Expert Evaluator Report displays links in the left pane under the Expert Evaluator heading. The Areas of Expertise for an expert's EER report and Expert Challenge Report are displayed just below the document header and just above the date selection functionality in the non-scrollable portion of the report. Areas of Expertise are pulled from the expert's Profile in PROFILER. The areas of expertise displays after the heading: "Area(s) of Expertise:" The areas of expertise is pulled from the PROFILER data and appear, one after another, after the main heading, separated by semicolons between entries. If two entries have the same parent categorization but differing sub categorizations, the two or more sub categorizations appear after just one reference to the shared parent categorization, separated by commas.

Figure 20:
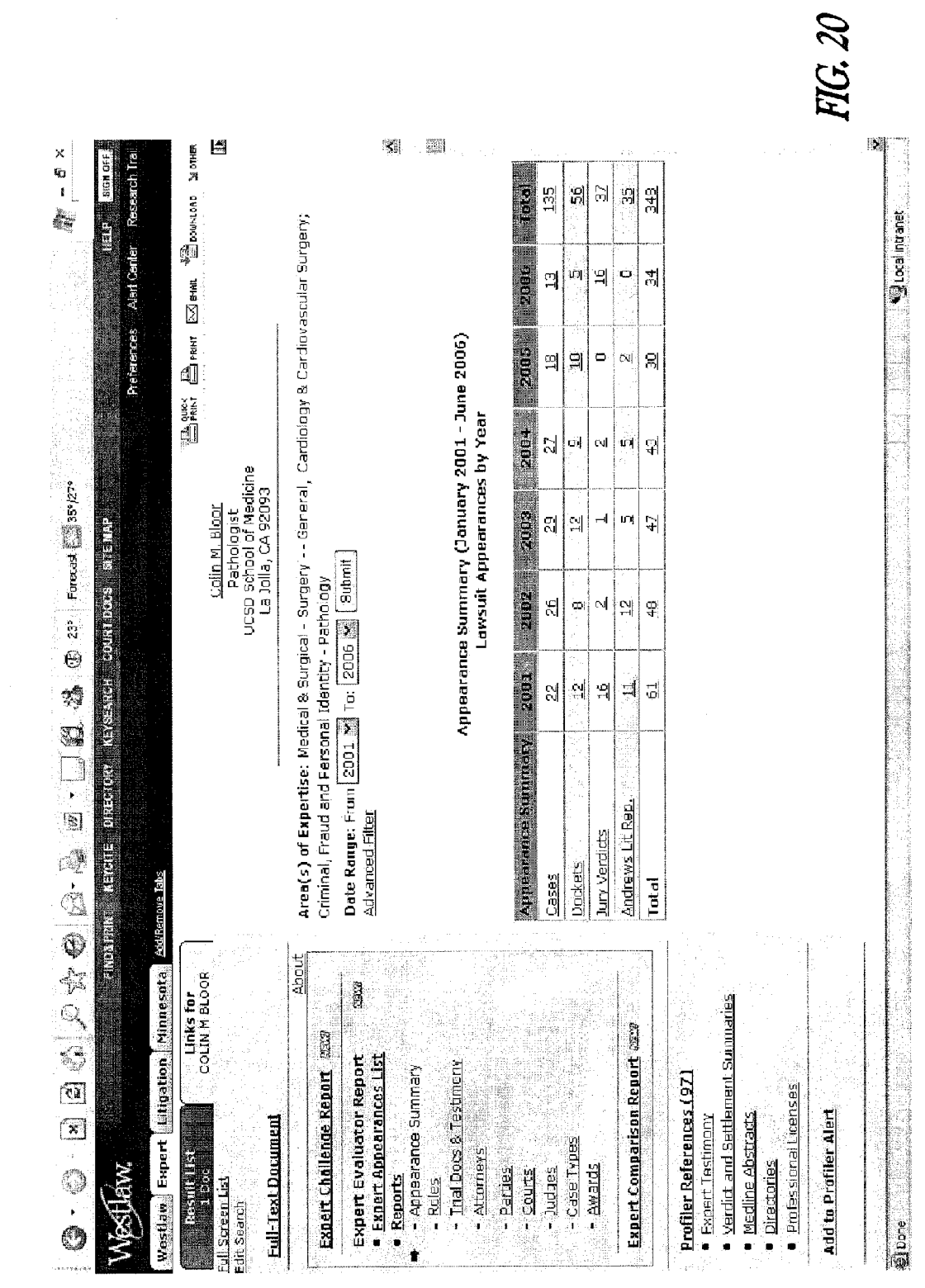

In FIG. 20, the Appearance Summary report summarizes year-by-year, the number of cases, dockets, jury verdicts and Andrews Litigation Reporters for an expert over a range of years. A user may filter the report to display only cases, dockets, jury verdicts and Andrews Litigation Reporters by clicking on the appropriate link in this report.

Figure 21:
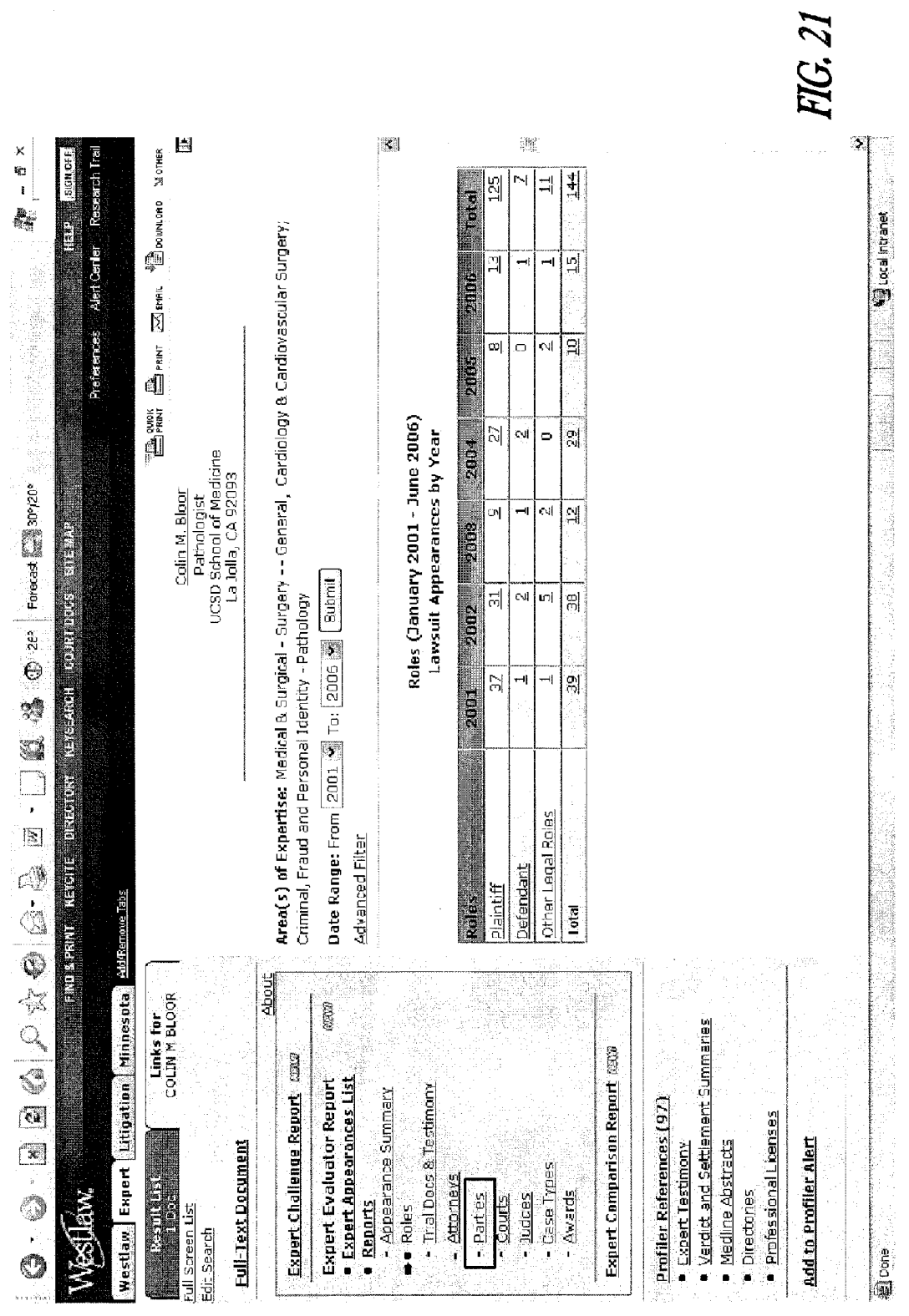

In FIG. 21, the Roles report breakdowns by expert role, year-by-year, the number of cases, dockets, jury verdicts and Andrews Litigation Reporters for an expert over a range of years. A user can filter the profile to display only a single expert role by clicking on the appropriate link in this report. There is an Other category for Roles report. "Other Legal Roles" includes other roles as well as unknown.

Figure 22:
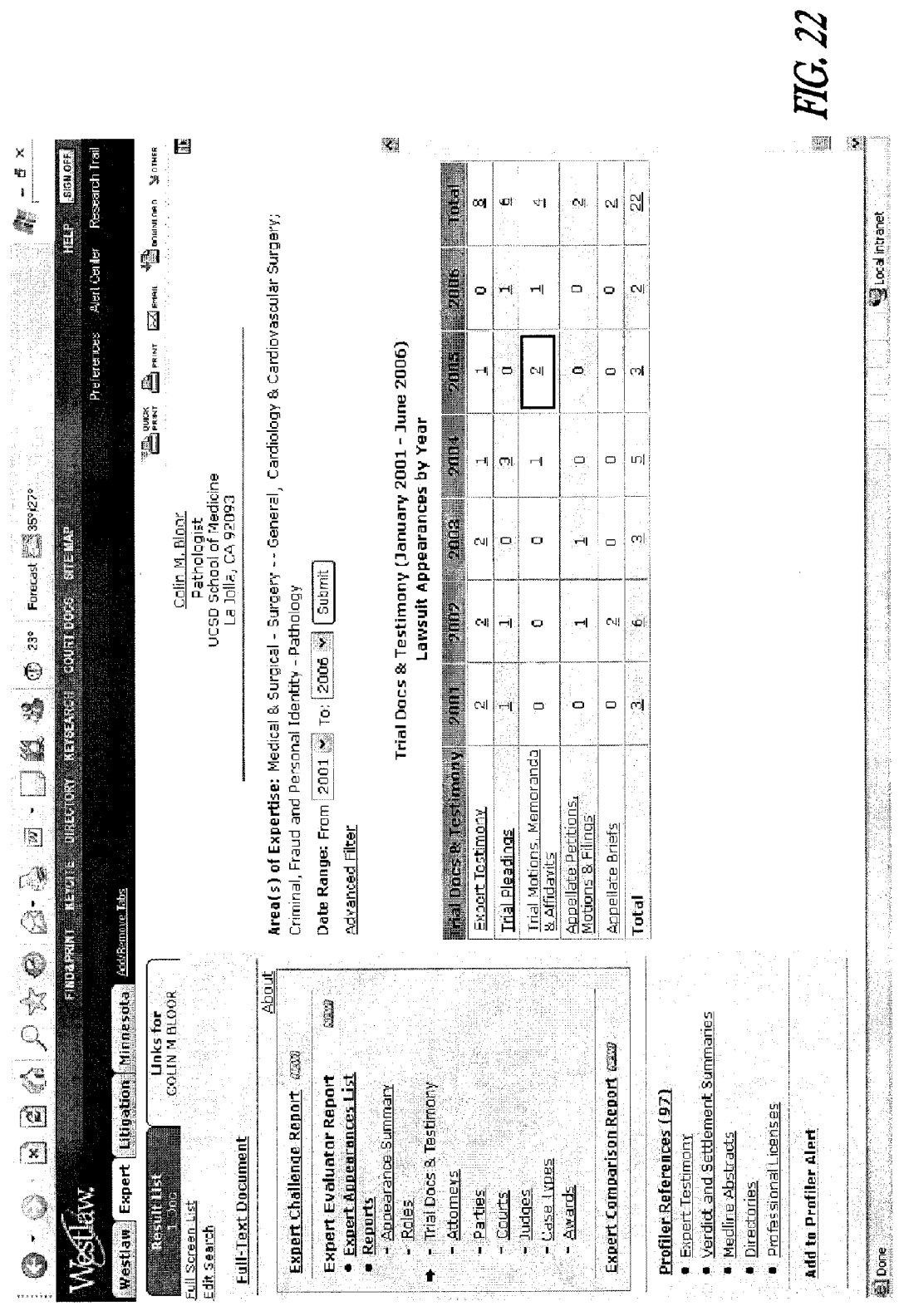
Figure 22A:
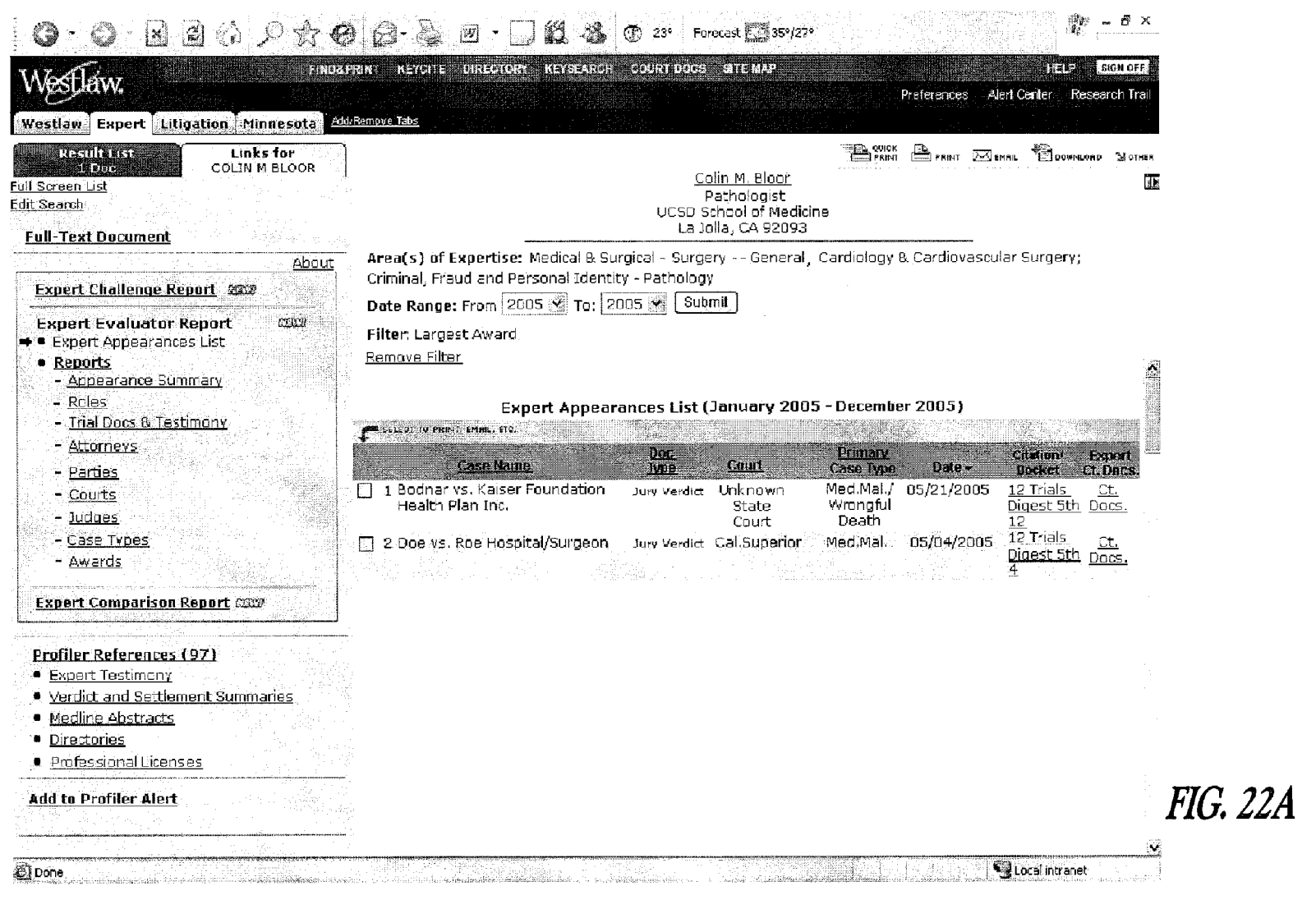

In FIGS. 22 and 22A, the Trial Documents and Testimony report breakdowns by document type, year-by-year, number of expert testimonies, trial pleadings, trial motions, appellate petitions and appellate briefs for an expert over a range of years. A user can filter the profile to display only a single document type by clicking on the appropriate link in this report. If a user clicks on a number in the table, a filtered Expert Appearances List displays. The filtered Expert Appearances List is specific to trial docs & testimony documents. The Ct Docs column is blank. The citation column contains citations to the actual trial doc or testimony doc. The Doc Type column should contain the type of Expert Testimony document, or the type of Trial Doc, as available, regardless of availability of lawsuit appearances information. If a user clicks on the Citation/Docket No. link, the document opens in a link viewer and then maximized. This assumes the user has opted in Preferences to open documents in Link Viewer.

Figure 23:
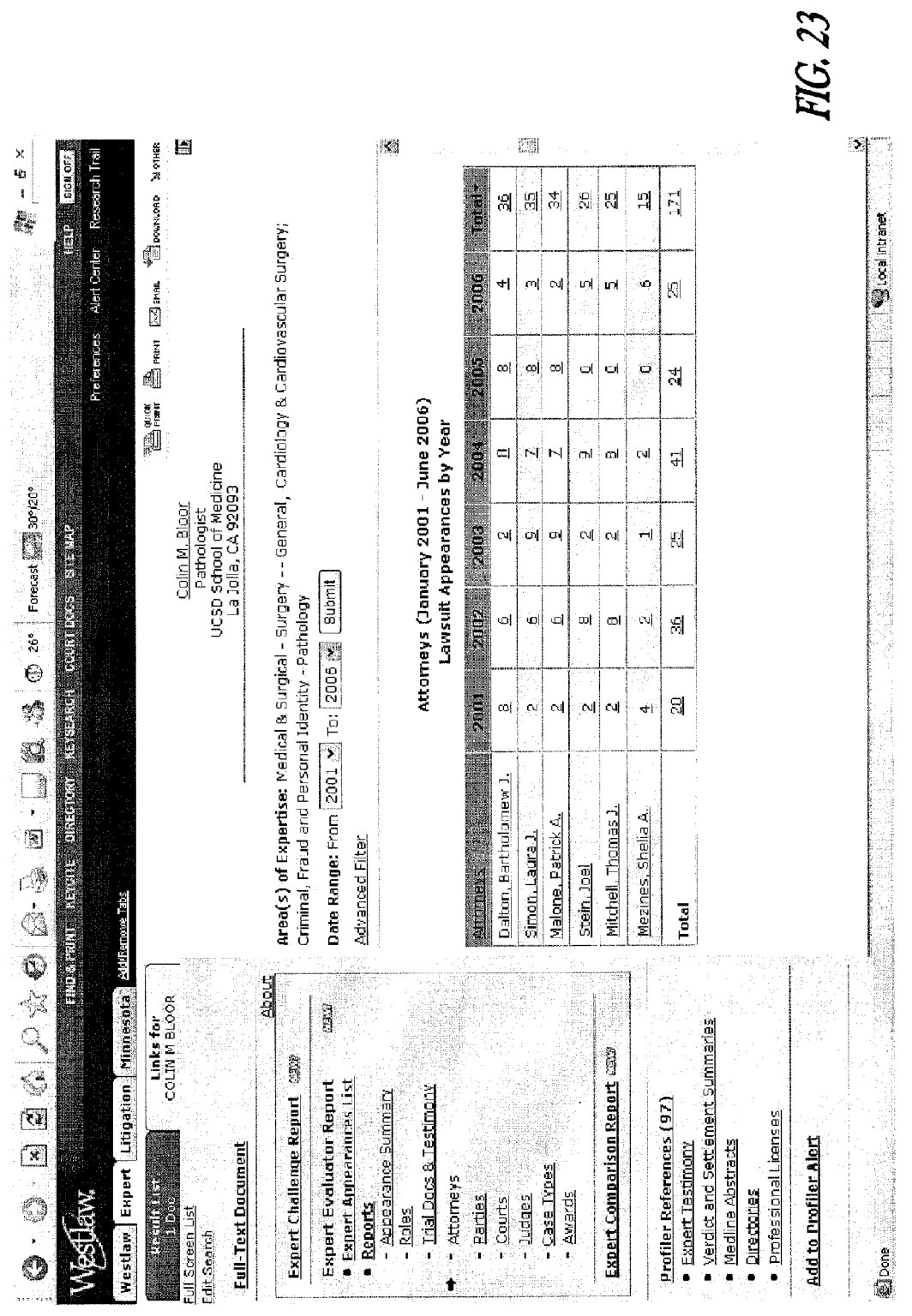

In FIG. 23, the Attorneys report lists the attorneys, year-by-year, for the cases, dockets, jury verdicts and Andrews Litigation Reporters that an expert was associated with, over a range of years, and the number of times associated. Attorneys are listed in the report if it can be editorially determined that the attorneys appeared on the same side of the case as the expert who testified. If it cannot be determined, what side the attorneys were on, the attorneys are not listed nor accounted for in the numbers/totals.

Figure 24:
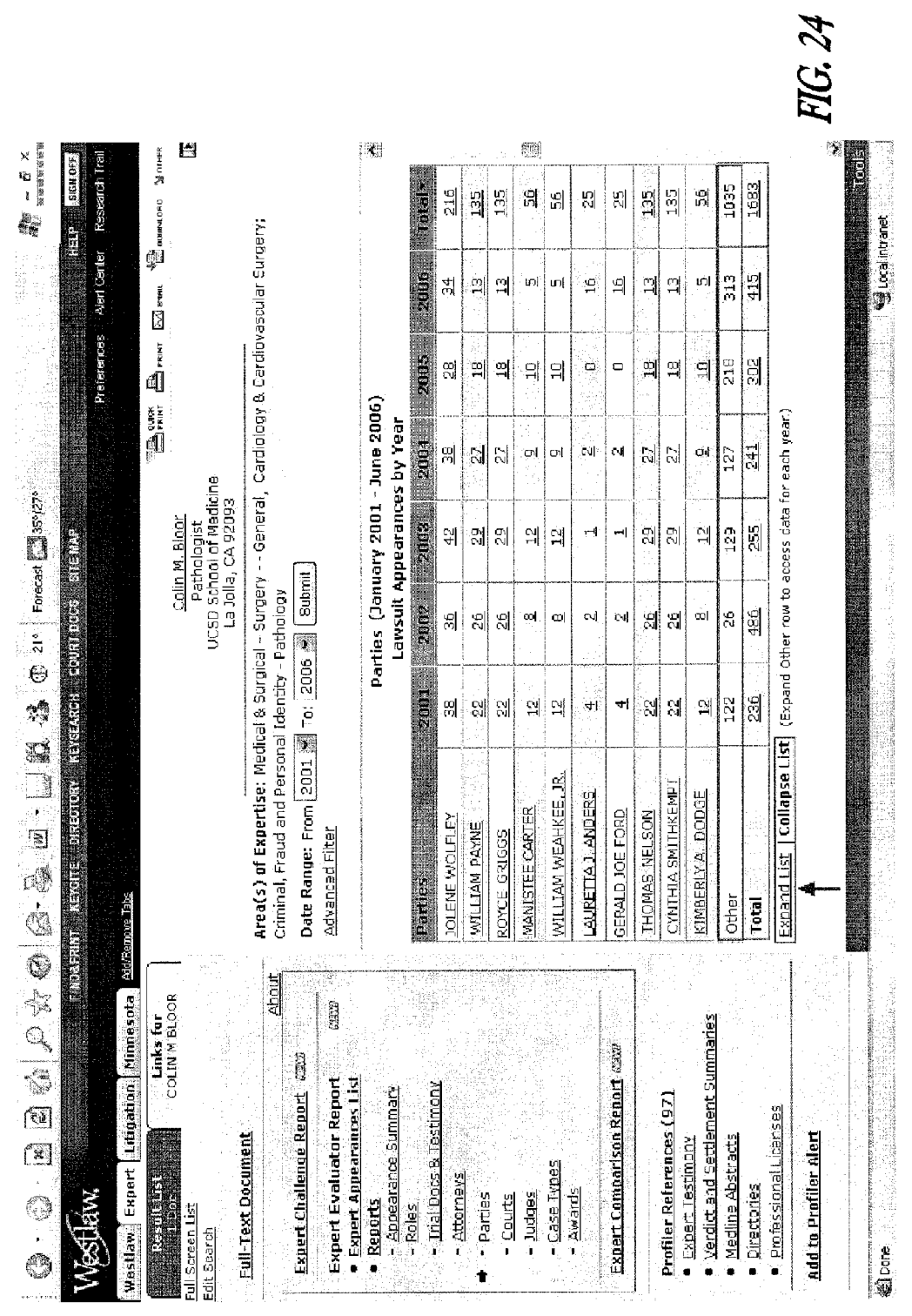
Figure 24A:
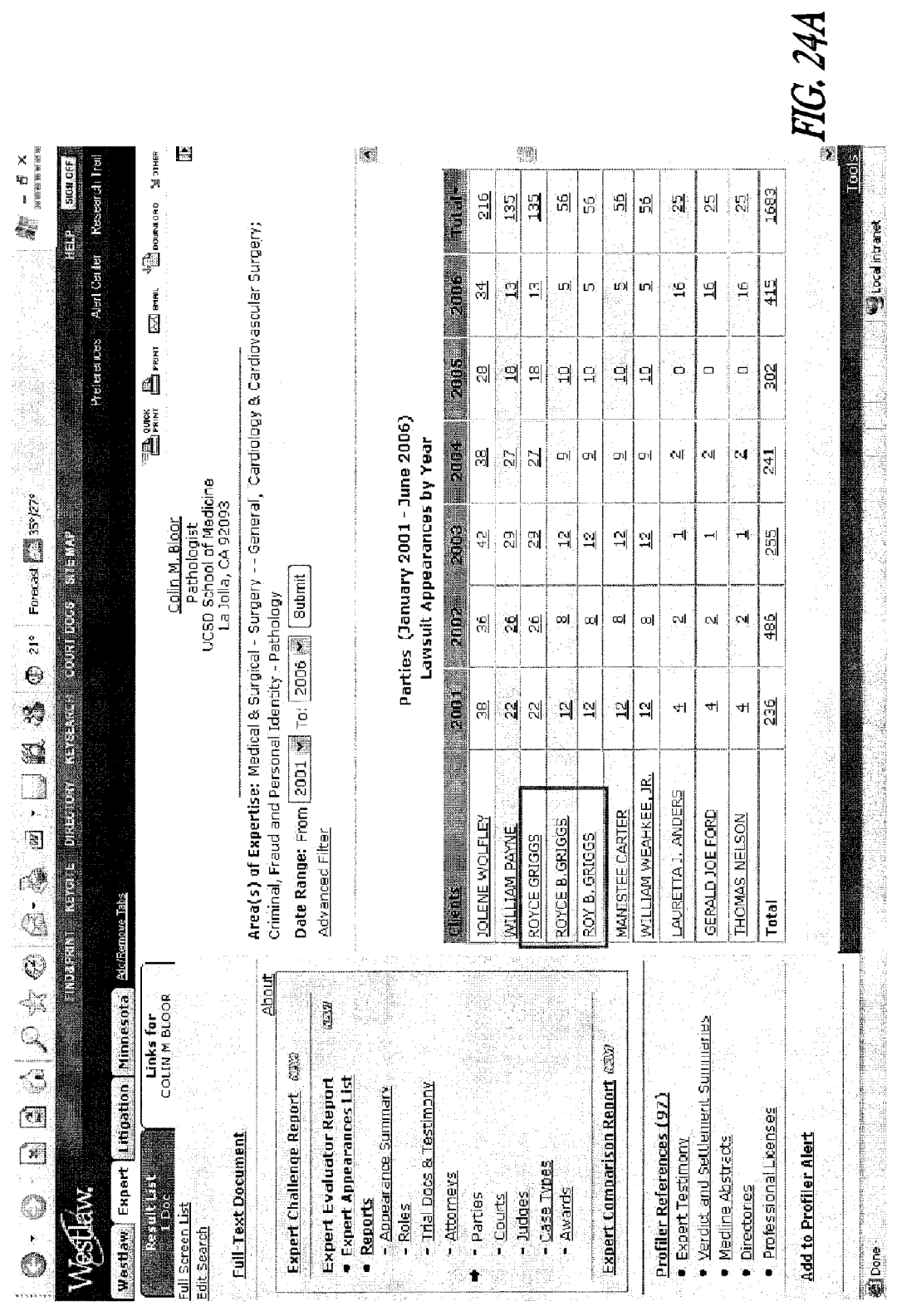

In FIGS. 24 and 24A, the Parties report breakdowns by client, year-by-year, number of cases, dockets, jury verdicts and Andrews Litigation Reporters for an expert over a range of years. However, party names for individuals are listed multiple times if there are variations in names that are similar but not exact. Report includes validated and non-validated individual and company names. An asterisk appears next to the non-validated names. A user can filter the profile to display only a single party by clicking on the appropriate link in this report. List is sortable by Parties and Total.

Figure 25:
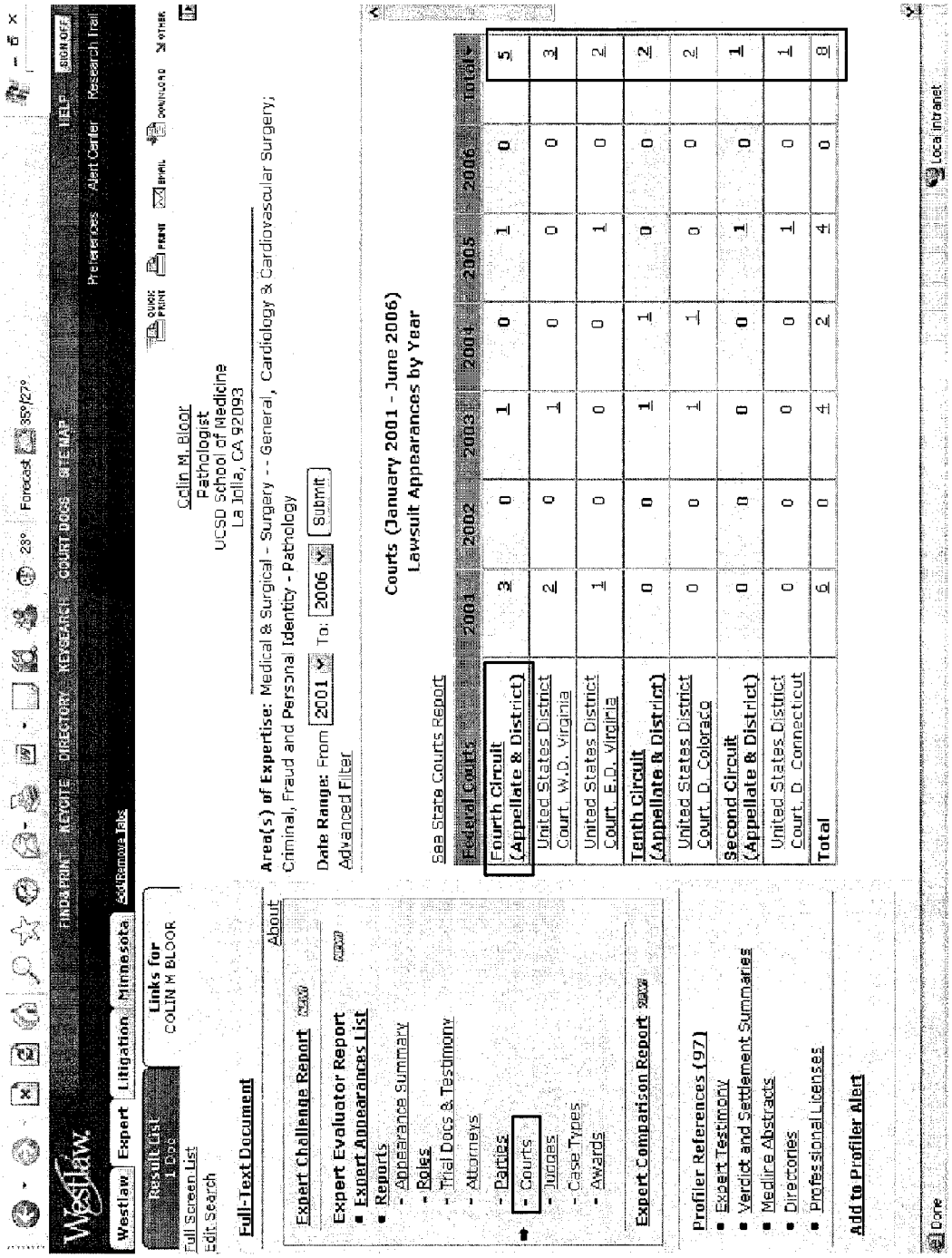

In FIG. 25, the Courts report consists of two separate reports (see FIGS. 20 and 21) just as developed for PROFILER: A federal court report, which breakdowns by federal court, year-by-year, the number of filed dockets, the number of Andrews Reporters, the number of Jury Verdicts and the number of case opinions for an expert over a range of years. A state court report, which breakdowns by state court, year-by-year, the number of filed dockets, the number of Andrews Reporters, the number of Jury Verdicts and the number of case opinions for an expert over a range of years. A link at the top of the federal court report, labeled "See State Court Report," allows a user to link to the top of the state court report. A link at the top of the state court report, labeled "See Federal Court Report," allows a user to link to the top of the federal court report. The Federal Courts report allows a user to filter on a single federal court or on all of the federal courts within a circuit by clicking on the appropriate link in the report. The State Courts report allows a user to filter on a single state court or on all of the courts within a state by clicking on the appropriate link in the report. Both reports are sortable by Courts and Total. Federal Courts are sorted by circuit, numerically, and then court hierarchy. State Courts sort by state, alphabetically, and then court hierarchy.

Figure 26:
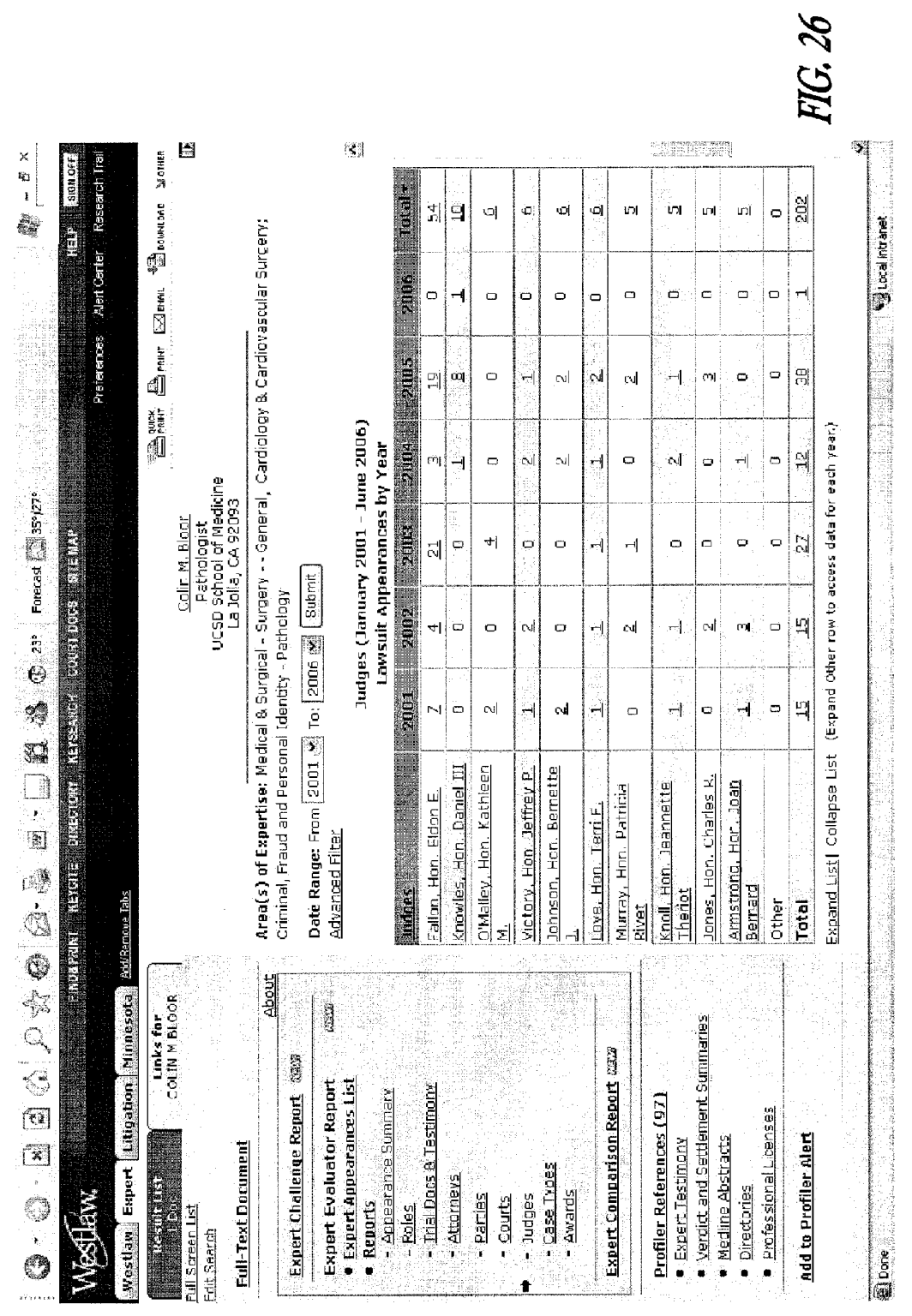

In FIG. 26, the Judges report breakdowns by judge, year-by-year, the number of filed dockets, the number of Andrews Reporters, the number of Jury Verdicts and the number of case opinions for an expert over a range of years. A user filters the profile to display only a single judge by clicking on the appropriate link in this report. The report is sortable by Judges and Total.

Figure 27:
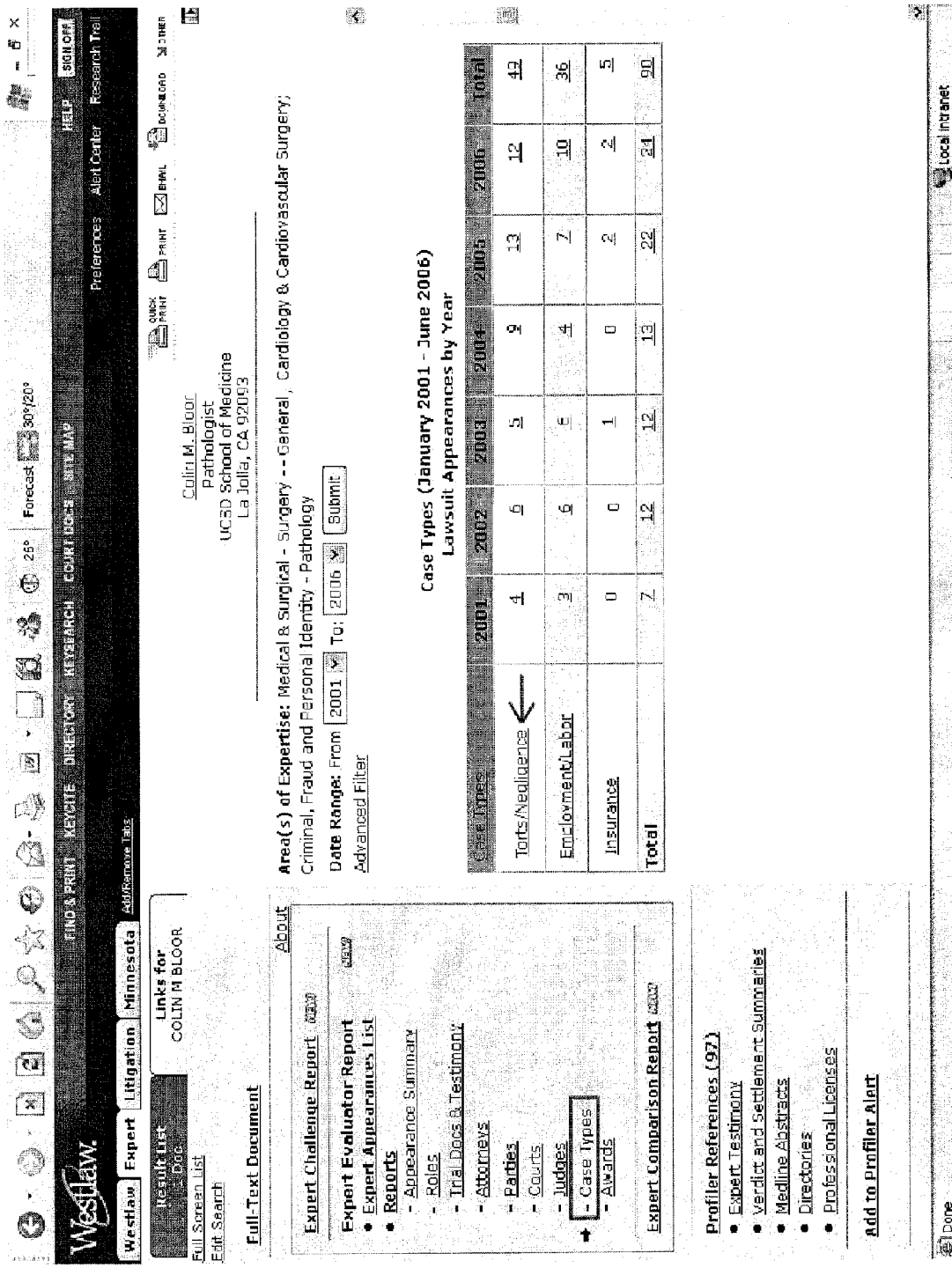
Figure 27A:
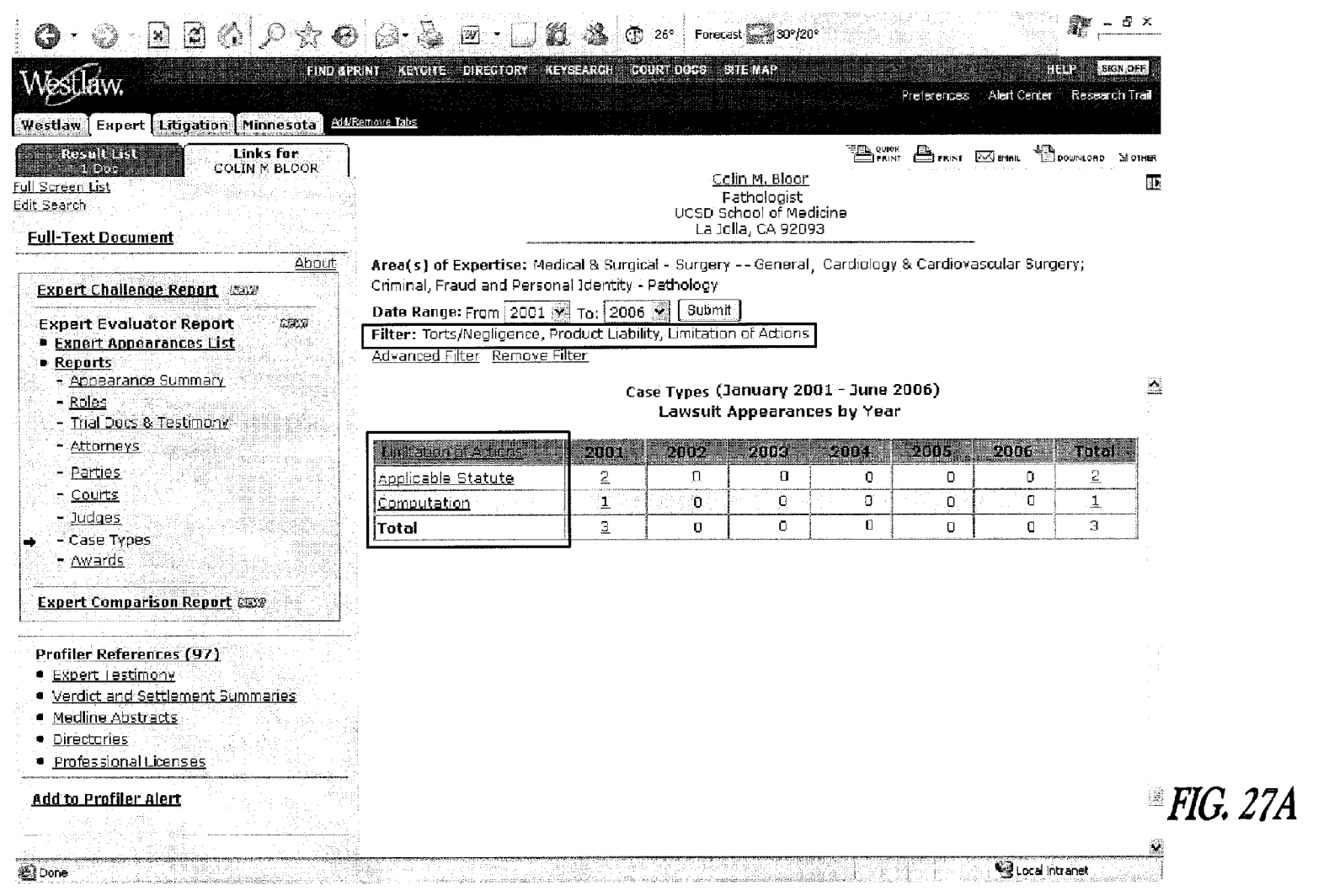

In FIGS. 27 and 27a, the Case Types report breakdowns by practice area, year-by-year, the number of filed dockets, the number of case opinions, jury verdicts and Andrews Litigation Reporters for an expert over a range of years. The Case Types report provides the Filter and Drill Down functionality and allows a user to view and further restrict or drill-down to specific 1$^{st}$, 2$^{nd}$, and, when available, 3$^{rd}$ level classification categories. The report can be sorted by case type.

Figure 28:
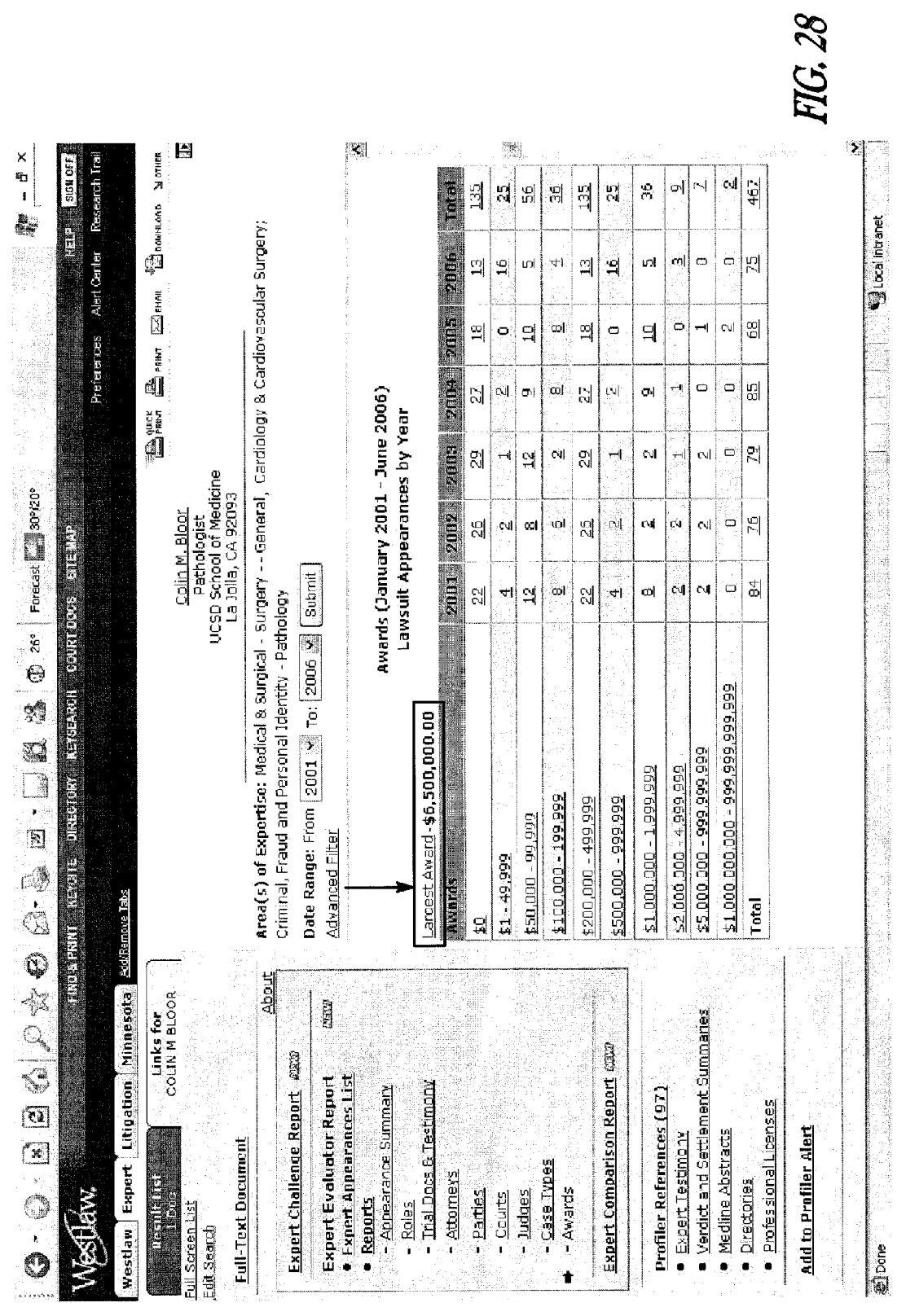

In FIG. 28, the Awards report breakdowns by the award ranges currently assigned to the Jury Verdict data, year-by-year, and the number of Jury Verdicts for an expert over a range of years. Awards reports are based off Jury Verdicts only. The ranges are to be listed smallest to largest in the order listed below. By clicking on the Largest Award link, found at the top of the Award table, the system returns a filtered Expert Appearances list for the case(s) with the largest award(s), regardless of whether there is one document or two or more documents with the same amount. The largest award is the actual amount from the case involved regardless of the current date range displayed. That is, the largest award is not subject to date range. The Date Range shows the new filtered date range for the largest award documents only. If the user filters again from the largest award the date range is the one from the largest award documents. If user users the back button from the largest award screen, the date range changes back accordingly with the previous screen.

Expert Appearance List

Figure 29:
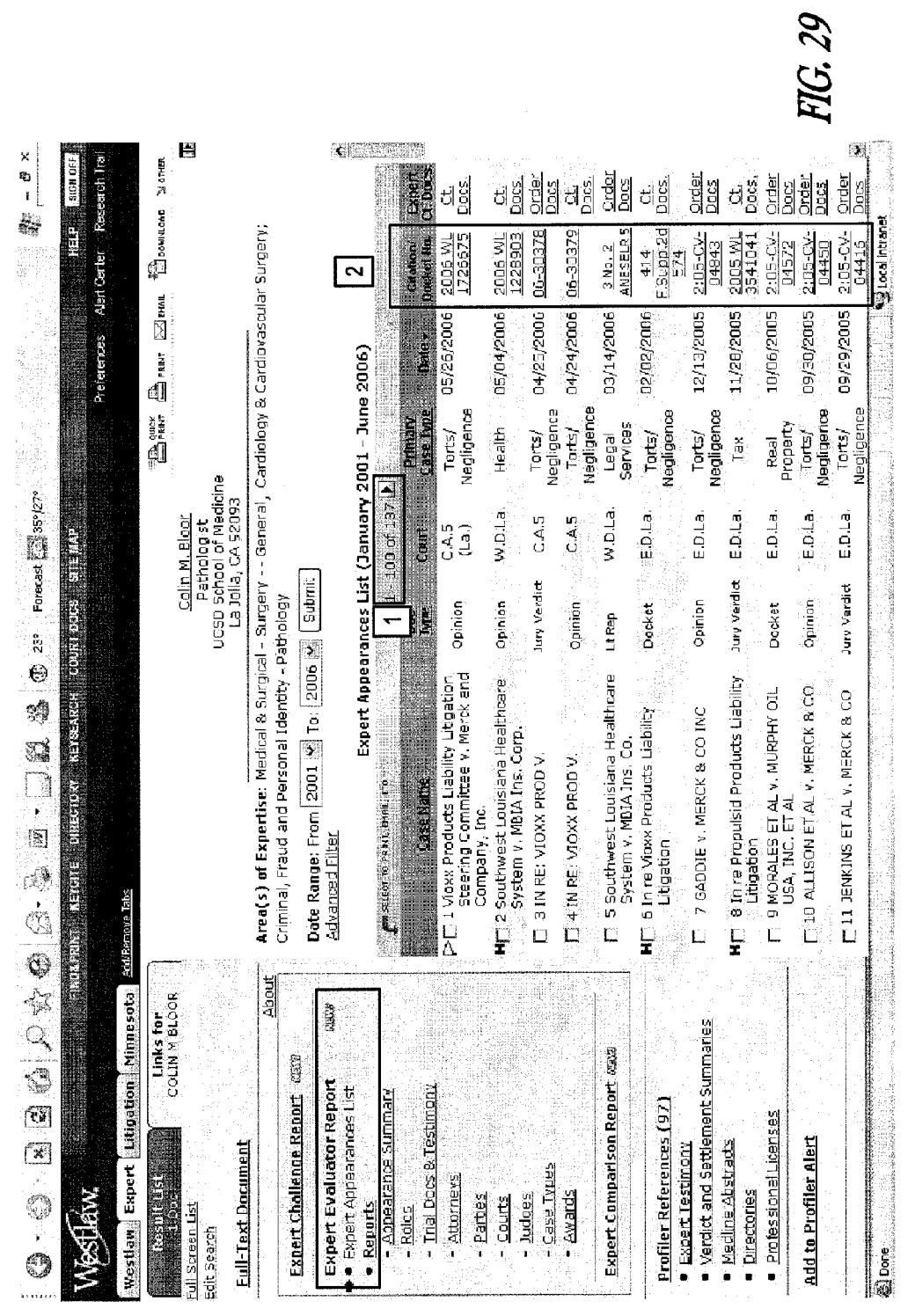

In FIG. 29, an application runs each case through a classification system to match the case to three different case types from a hierarchy. The three different case types are ranked from best match to third best match. While the Case Types report reflects all three matches, in some embodiments only the highest ranked match show up as the Primary Case Type in the Expert Appearances List. Certain case types returned by the classification system are excluded from the available case types: Civil Procedure, Remedies, and Nuclear Power. The Expert Appearances list is sortable by case name, doc type, court, primary case type, and date. Each opinion citation in the Expert Appearances List has appropriate KeyCite flags to the left of the number of the line. As a default, the Expert Appearances List is sorted by date in reverse chronological order. If a user sorts by case name, doc type, court, or primary case type, the secondary sort order is by date in reverse chronological order. If a user sorts by date, the secondary sort order is by case name in alphabetical order. The Expert Appearances List displays 100 documents at a time. A control allows the user to page through a list of documents exceeding 100 (1). If a user resorts at any page after the first (e.g., on a page showing results 101 through 200), the user is returned to the first result at the top of the first page.

The Reporter or Westlaw® cite contains a link to the opinion, jury verdict or Andrews Litigation Reporters on Westlaw® system (2). The docket number contains a link to the docket on Westlaw® system (2). The Reporter, Westlaw® cite, and docket number links appears in the pop-up Link Viewer. The document availability value contains a link to the court documents on Westlaw® system, if available or to an order form if not available. The Court Documents (Ct. Docs.) link takes the user directly to the court documents. It does not appear in a pop-up Link Viewer. The Court Document link takes the user to only the expert-related court documents for this case, docket, jury verdict, or Andrews Litigation Reporter. It does not take the user to the full list of court documents for that case.

Exemplary Expert Comparison Report

Figure 30:
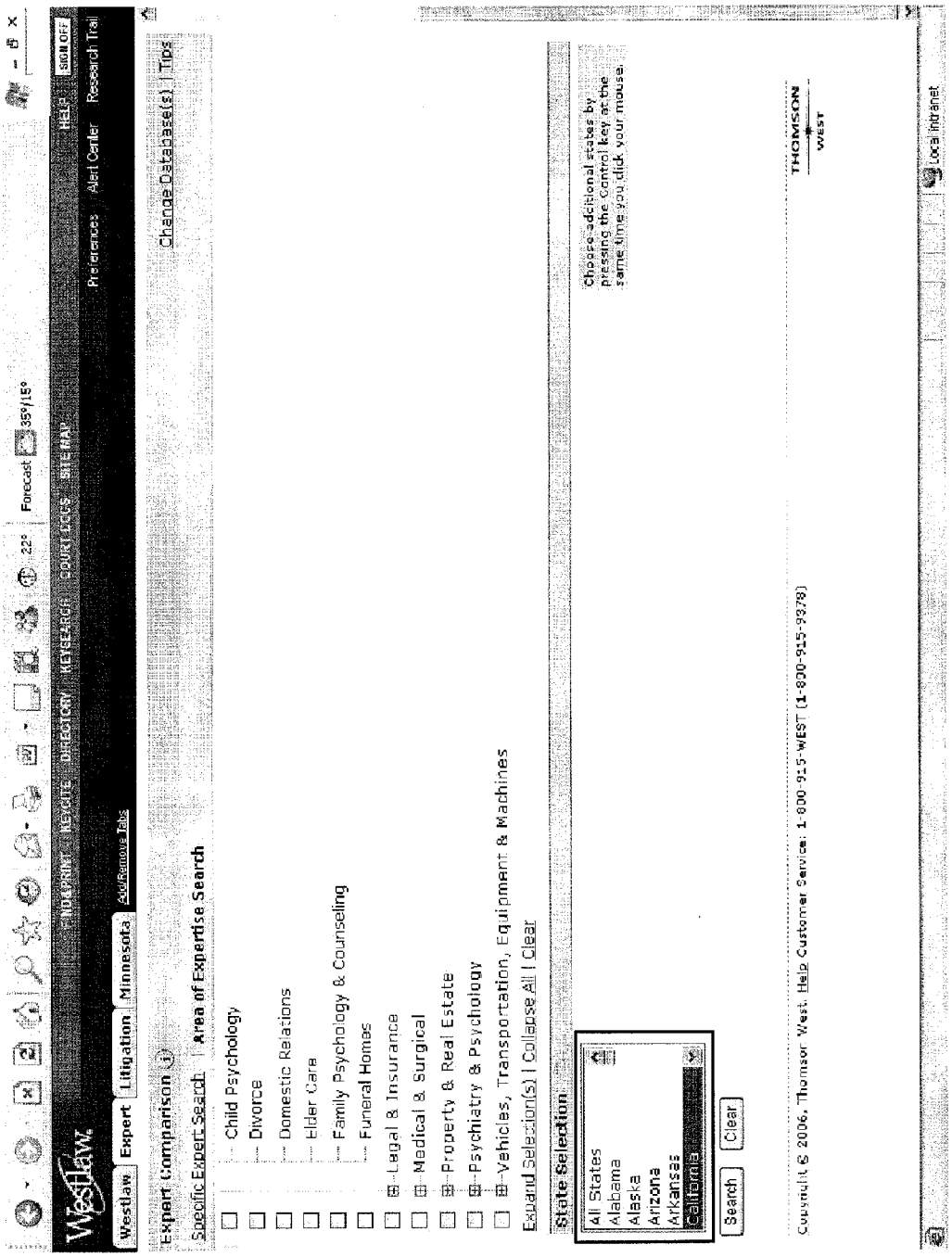

In FIG. 30, the search runs against PROFILER for names. User has the ability to search for an expert based upon expertise and jurisdiction. User can select one or more areas of expertise by checking the check boxes and expanding the areas of expertise to view and select related specialties. The content for areas of expertise and specialties are the same as the ones available in PROFILER Advanced Search. The UI portion of the template for EER, for Expert Compare and for Expert Challenge search templates that contains areas of expertise and specialties now has an expand/collapse functionality and a tree appearance. User can also select one or more states in the dropdown. There is no limit to number of areas of expertise or number of states that can be checked or selected.

Figure 31B:
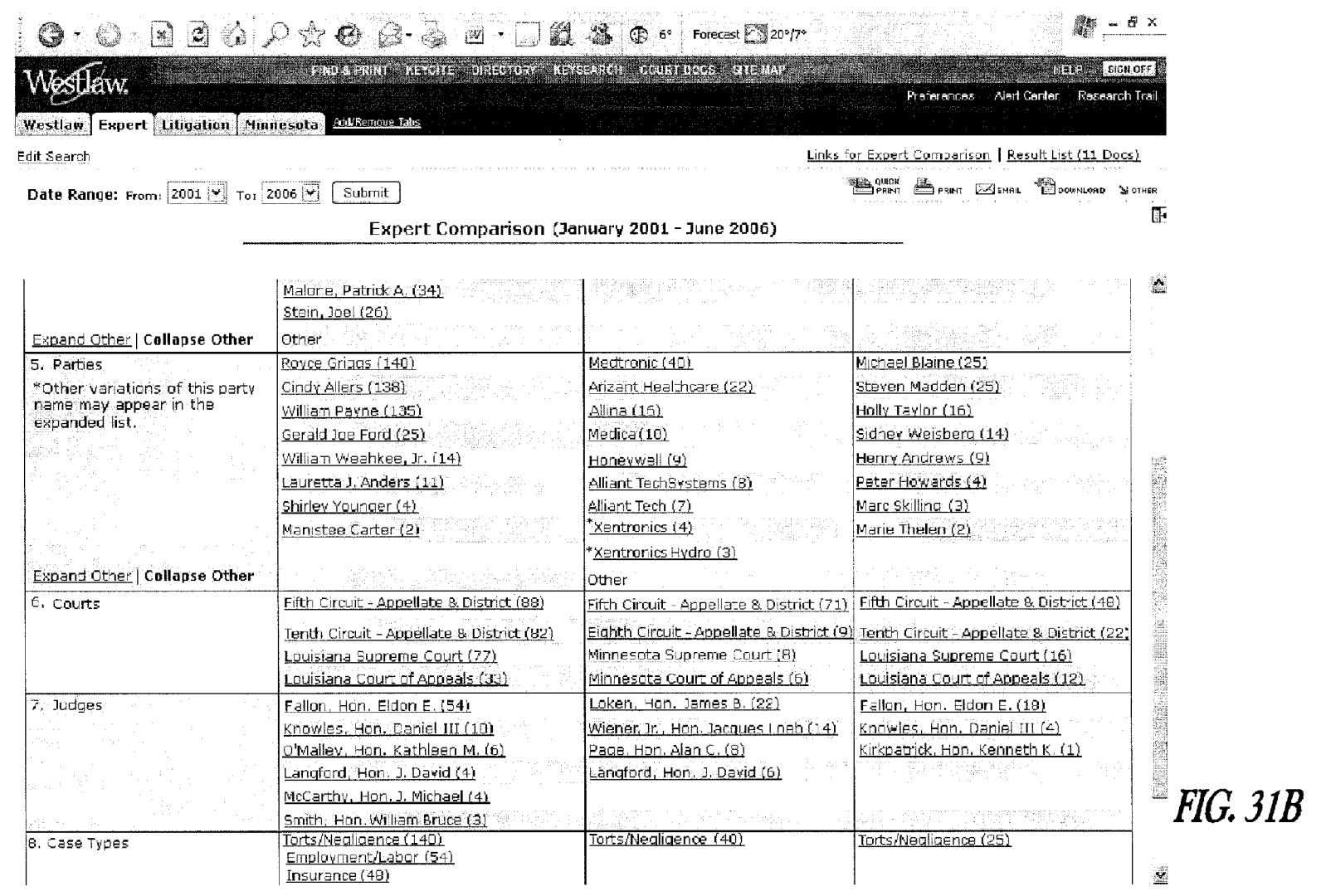
Figure 31C:
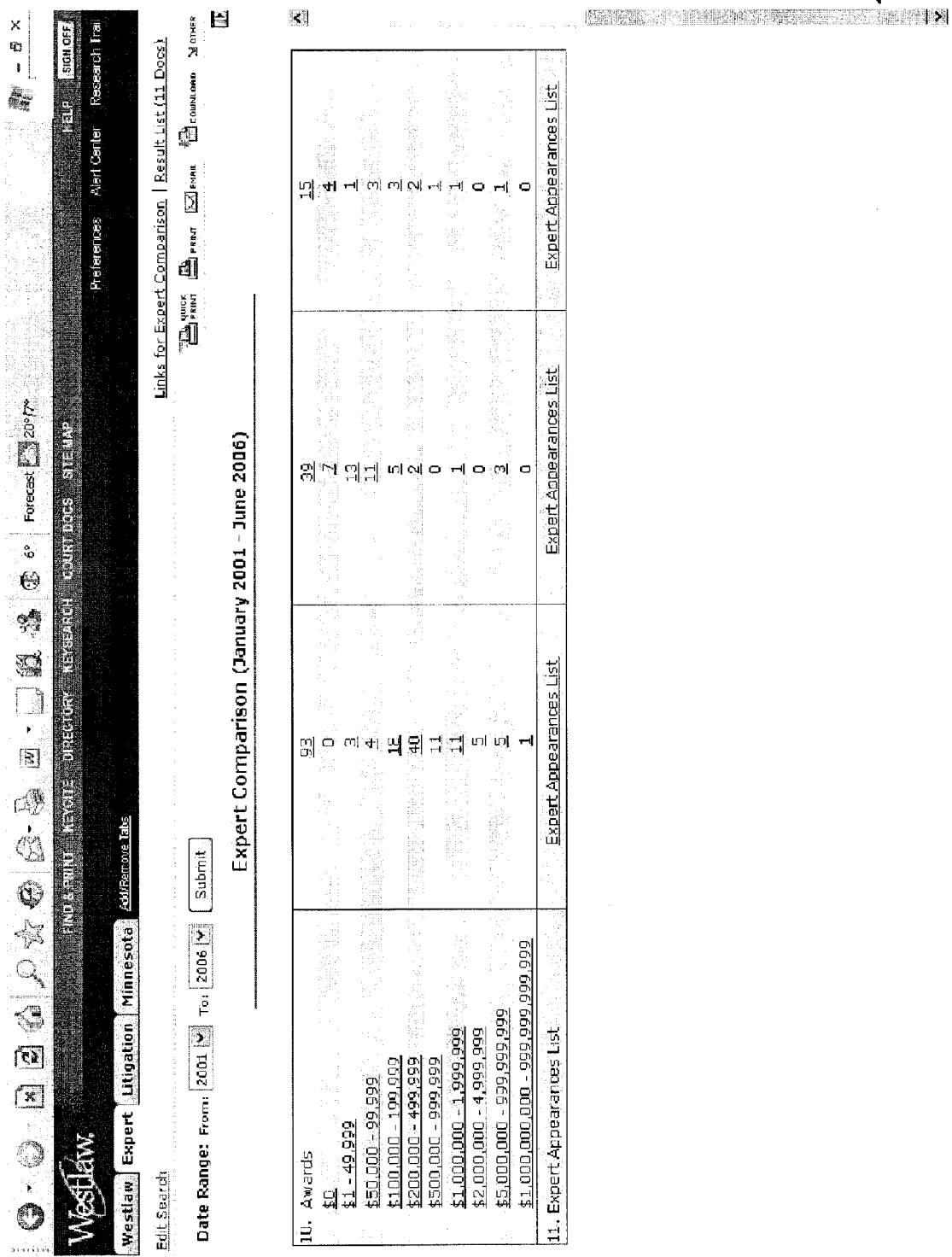

FIGS. 31A, 31B, and 31C show an exemplary interface that is rendered in response to a user selecting experts from a results list for comparison. Prior to presentation of this interface, a user hits Search button and a result list appears in full screen. Before the result list screen appears, the system goes to PROFILER (within expert witness databases) for a list of names that satisfy the search. Then, the expert names are validated for the existence of EER data. The result list displays all names of experts that satisfy the search. The experts that have EER data float to the top and have a check box that allows the user to select that citation to compare the expert. A message at the top of the page displays the following text: "Profiles without check boxes cannot be compared." The immediate display of a full screen citation list rather than the first result from the list may override a user's preference for split screen display. This is by design for the compare report and the EER and Expert Challenge Reports. As a result, the forced full screen does not contain the split screen/full screen toggle, as the user does not have the option to view split screen until the user has selected a document (either a profile or selects 3 choices to create a Compare Report). The experts that do not have EER data does not have check boxes and is displayed after the names of those experts who have EER data. The experts with check boxes is sorted first alphabetically by last name and then by state within their grouping and the experts without check boxes is sorted first alphabetically by last name and then by state within their grouping. The numbered hyperlink for each expert takes the user to the PROFILER document for that expert. User selects up to three items from the result list by checking the check boxes and clicking on the Compare button. In full screen, if user selects check boxes on the first page of multiple page result list, goes to a second page in the result list, then goes back to the first page, the selected check boxes on the first page is still be selected. User can also choose the Edit Search link to go back to template.

User can access a split screen result list by clicking on the split screen icon or by clicking an individual document link on the result list and access the result list tab in the left pane. If user selects split screen, user has access to the Links For tab specifically for the Compare Report. The "Links for" tab contains navigational links for this report consisting of the items from the left most column in the Compare Report. These are Areas of Expertise, Appearance Summary, Roles, Trial docs & Testimony, Attorneys, Parties, Courts, Judges, Case Types, Awards. There is also an About link.

Figure 32:
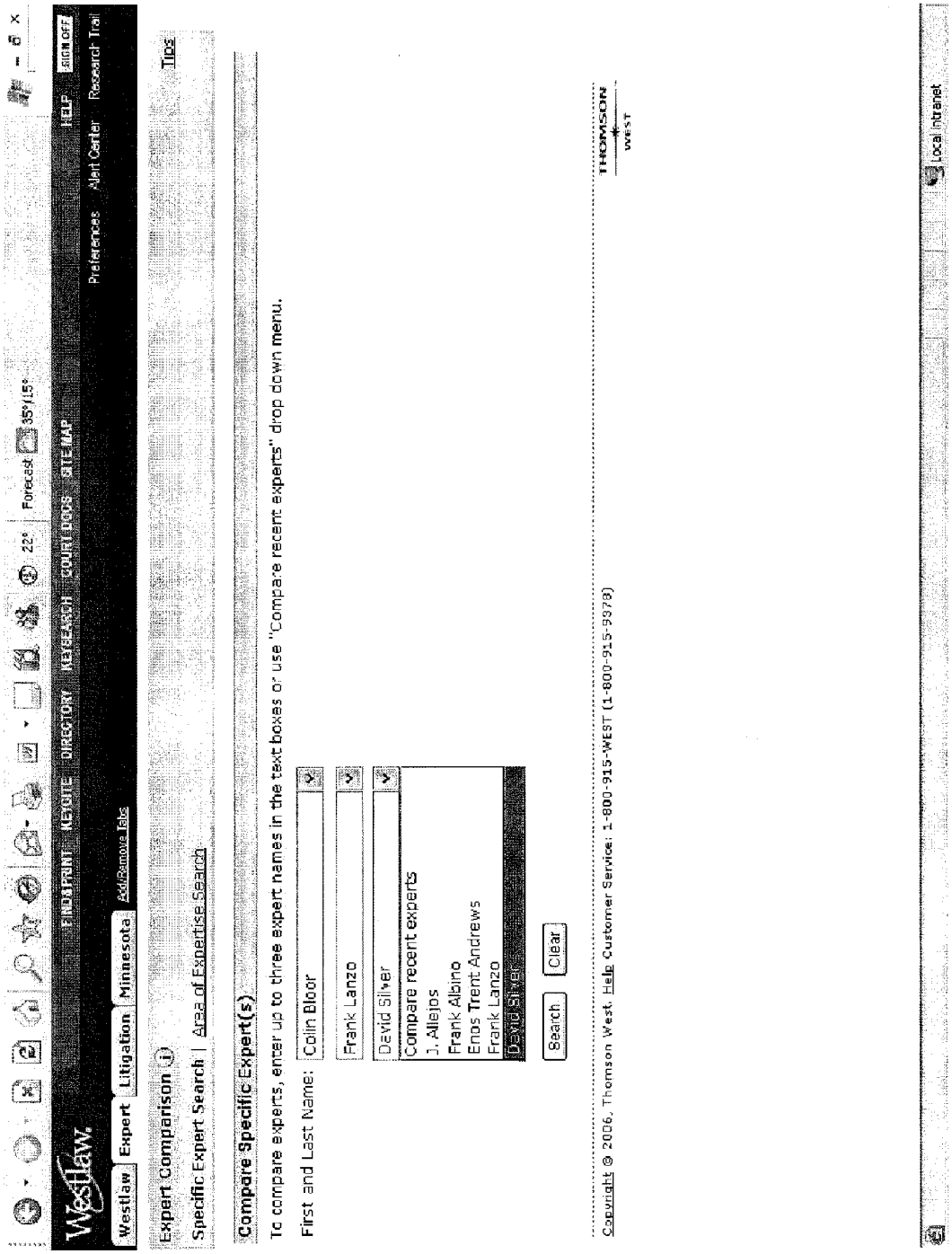

In FIG. 32, search functionality for the text boxes are identical to existing search functionality in PROFILER when a user enters a name. For example, a search for Jane Smith in California yields this underlying query: IND (JANE/5 SMITH) PRA (JANE/5 SMITH). There are three free text/drop-down boxes. All have the text "Compare recent experts" in them. Because user accessed this tool from the expert tab or litigation tab, none of the three boxes is prepopulated with a name. If user had accessed the template from a Profile the name of the expert, as it appears in the PROFILER header, pre-populates the first text box. The name is editable by user. For each free text/drop-down menu boxes, the user has the option to type an expert's name or select an expert from the dropdown menu. The dropdown menu displays a list of the most recent experts the user has searched for recently (up to 20 experts). The recent experts are drawn from profiles the user has actually viewed from PROFILER or in some Expert Investigation Report, not just names in a result list. The dropdown list values are the same for all text boxes in the template.

User clicks the Search button and sees a full screen citation list containing names matching the 1 to 3 experts user selected on the template. Before the result list screen appears, the system goes to PROFILER for a list of names that satisfy the search. Then, the expert names are validated for the existence of EER data. The result list displays all names of experts that satisfy the search. The experts that have EER data "float to the top" of the list and have a check box that allows the user to select them to compare the expert. The experts that do not have EER data does not have check boxes and is displayed in the result list after the names of those experts that have EER data. The experts with check boxes is sorted alphabetically within their grouping and the experts without check boxes are sorted alphabetically within their grouping. The numbered hyperlink for each expert takes the user to the PROFILER document for that expert. If user selects more than three check boxes user sees a popup warning screen reminding user that no more than three items can be compared. If a user types the name of the same expert in two or three of the text/drop down boxes, the expert information for the expert displays in the second and third columns. That is, an expert comparison report displays the same expert two or three times, respectively. If a user selects the name of the same expert from a drop-down menu, and then clicks the Search button, a warning screen displays stating the user has selected the same expert to compare and asking whether the user when the user wants to continue.

A user goes to comparison report search template from an expert profile. If user goes to the comparison report search screen and selects the Specific Expert Search template, the first of the three name text boxes are pre-populated with the name of the expert in the Profile. User can change that name or use it. User can also type names into one or both of the next two boxes. Finally, user can access the recent experts drop-down for a name in any of the three boxes. The dropdown lists recent experts user has viewed in PROFILER.

A comparison report search template can be accessed from an access point such as the Litigation tab. User selects the Specific Expert Search template. All three "name" text boxes are empty. User can type names into any of the boxes. User can also use the Recent Experts drop-down in any of the three boxes. The dropdown lists recent experts user has viewed in PROFILER.

User can go to comparison search template from another document that has an Expert Comparison Report link in the left pane. User selects the Specific Expert Search template. All three "name" text boxes are empty. User can type names into any of the boxes. User can also access the Recent Experts drop-down in any of the three boxes. The dropdown lists recent experts user has viewed in PROFILER.

Specific Expert Search

The Expert Comparison Report Specific Experts template looks and functions the same as the Comparison report originating from the areas of expertise template, with one exception. If user comes from Specific Expert Search Template to the result list, user sees Edit Search link at the top left. User cannot toggle between links to the two templates available for the Expert Compare Report or return to the Areas of Expertise template from the result list. Regardless of the search template used, the main heading of the report is Expert Comparison, with a dateline.

In addition, all criteria listed are ranked based on occurrences. This holds true for the Attorneys, Parties and Judges criteria, too. They are listed based on occurrences and not alphabetically. Attorneys and judges are displayed last name first. For Attorneys, Parties, Courts, Judges and Case Types criteria, the number of occurrences displays after each item.

The areas of expertise for each expert are pulled from that expert's PROFILER entry. Within the Compare Report, all Areas of Expertise appear for each individual expert, as they appear in the respective expert's Profile. The areas are not hypertext linked. The areas are consolidated if some experts have several expertise categories that share the same parent expertise. All areas of expertise for an expert may appear in the report.

In individual EER reports, the Areas of Expertise are displayed in a breadcrumb trail that appears just below the date functionality in the printable portion of the report. See FIG. 33 for a more complete description of Areas of Expertise breadcrumb trail functionality and screens.

Appearance Summary

Appearance Summary contains links to the four types of documents used as data for the reports. Clicking a link to cases, dockets, jury verdicts or Andrews Litigation Reporters filters the report for all three experts to show data for that doc type only. Clicking a number hypertext link for any of the four doc types takes user to a filtered court doc list for that doc type and the specific expert and date range selected.

All roles types are hypertext linked in the first column. Clicking the role type filters the compare report for all three experts to that specific role type. Clicking any numbers in the role area takes the user to a filtered court doc list for that role, in that date range, for that expert. "Other Legal Roles" includes other legal roles as well as unknown.

The four court docs types in the first column are hypertext linked. Clicking these links filters the report for all three experts to documents of that doc type only. Clicking the hypertext-linked numbers takes the user to a filtered court doc list for that doc type, in that date range, for that expert.

All attorney names may be hypertext linked in the columns pertaining to each expert. Displayed within the link, immediately following the attorney name, are the number of occurrences in which the attorney represented the expert. Clicking the linked attorney name takes a user to a filtered court doc list for all documents involving that attorney acting in the same case, on the same side (role) as that expert. The top five attorneys are listed by occurrences. There is also an Other category for all other attorneys. When there are more than five attorneys and the "Other" category is then available, there is an expand/collapse toggle in the first column to expand or collapse the Other category.

All party names may be hypertext linked in the columns pertaining to each expert. Displayed within the link, immediately following the party name, are the number of occurrences in which the expert testified on behalf of the party. Clicking the linked party name takes a user to a filtered court doc list for all documents involving that party for that expert. The top ten parties, by frequency, are listed. When there are more than ten parties listed and the Other category is then available, there is an expand/collapse toggle in the first column to expand or collapse the other category.

All courts may be hypertext linked in the columns pertaining to each expert. Displayed within the link, immediately following the name of the Court, are the number of occurrences in which the expert appeared in that particular court. Clicking the linked court name takes a user to a filtered court doc list for all documents involving that court, in that date range, for that expert. The top ten courts, by frequency, are listed. When there are more than ten courts listed and the Other category is then available, there is an expand/collapse toggle in the first column to expand or collapse the Other category.

All judges' names may be hypertext linked in the columns pertaining to each expert. Displayed within the link, immediately following the name of the judge, are the number of occurrences in which the expert appears before that particular judge. Clicking the linked judge name takes a user to a filtered court doc list for all documents involving that judge in that date range for that expert. The top ten judges, by frequency, are listed. When there are more than ten judges listed and the Other category is then available, there is an expand/collapse toggle in the first column to expand or collapse the Other category.

The case types for each expert should be linked. Displayed within the link, immediately following the Case Type, are the number of occurrences in which the expert testimony pertained to that particular case types. Clicking the linked case types takes user to a filtered court doc list for that expert in that date range for the documents regarding the case type selected. The top ten case types, by frequency, are listed. When there are more than ten case types listed and the Other category is then available, there is an expand/collapse toggle in the first column to expand or collapse the Other category.

The 10 categories of award levels are all hypertext linked. Clicking an award level filters the report for all three experts to only documents relating to that award level. Clicking a number hypertext link for any number in this section takes user to a filtered court doc list for that award level and the specific expert and date range selected.

The Expert Court Documents link in each expert's column is hypertext linked. Clicking on the link takes user to a court doc list of all expert court documents for that expert.

In FIG. 33, basic filtering occurs from any links in the left-most column. These links filter the entire compare report and it repaints to the filtered state with a breadcrumb trail. User can also filter the report from any link in any of the columns specific to an expert in the report. This filtering takes user to a filtered Expert Appearances list with an appropriate breadcrumb trail. User creates a breadcrumb trail when he filters the report in any way.

Exemplary Expert Challenge Report

Figure 34:
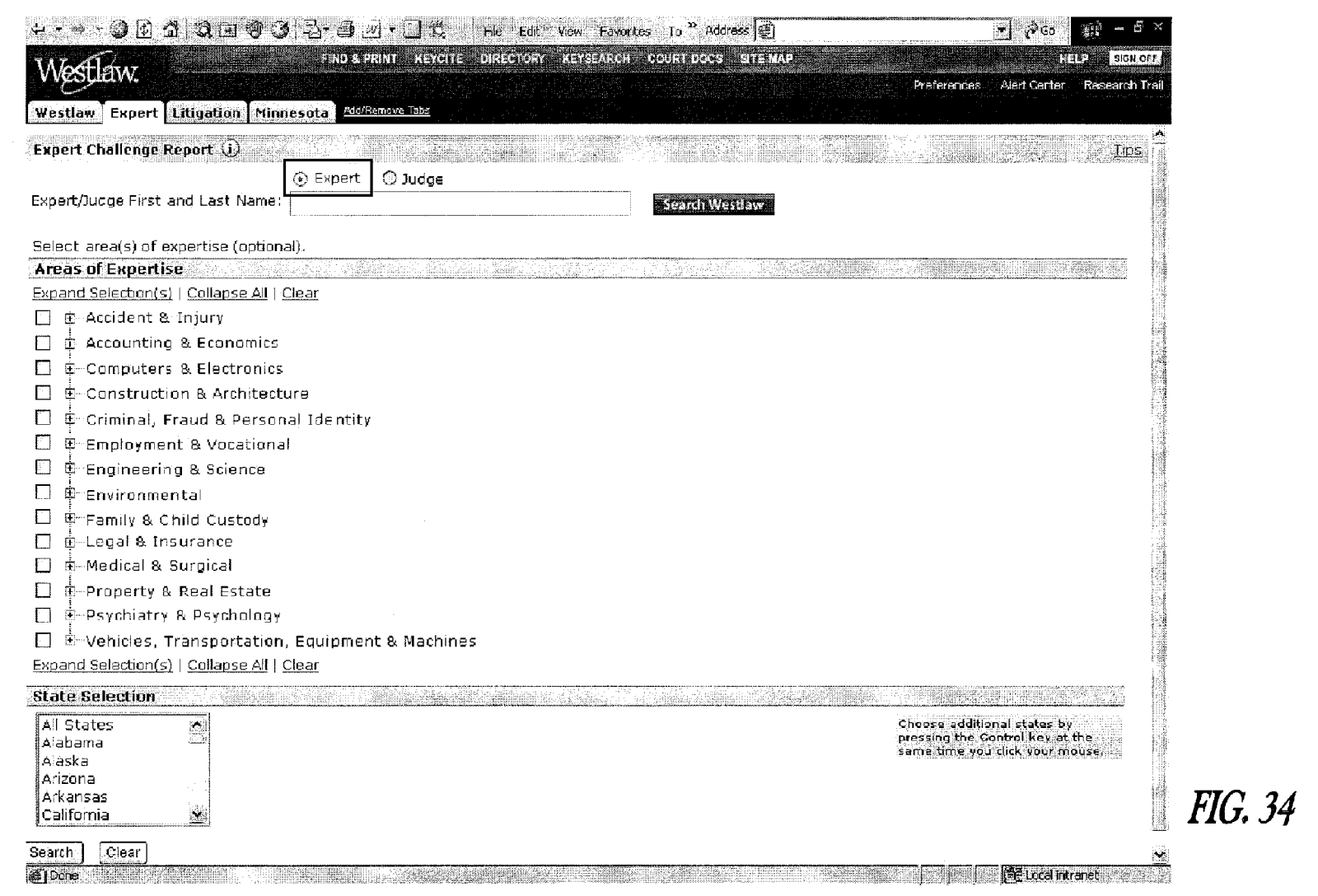

In FIG. 34, the Challenge Report feature allows the user to input various criteria into the Challenge Report template to create a report that shows challenged expert witness testimony. Although all the fields are optional, a user fills in at least one field or user sees a standard warning screen reminding user to complete at least one field. Language: Please complete at least one field on the Challenge Template. The Challenge Report criteria are as follows: Name—text box with two radio buttons above text box for Expert (default) and Judge. If judge is selected the areas of expertise section is grayed out or hidden, whichever is easier for App Tech. Expert's Area of Expertise (taken from PROFILER Advanced Search template). Areas of Expertise appear in a tree format. A check box precedes each area of expertise so user can select more than one area. The tree can be expanded to display specialties. There is a check box before each specialty as well. More than one specialty may be selected. Jurisdiction, such as state, is selected from a drop-down menu.

A user may enter the name of the expert using terms and connectors or natural language. The default is expert button. If user selects Judge, the area of expertise section is grayed out or hidden.

Areas of Expertise display in a tree structure. A user may expand an area of expertise to view specialties included in that area by expanding the node for that area. A user may select areas of expertise and related specialties by checking one or more check boxes. This list of entries comes from PROFILER Advanced Search. This section is grayed out (or hidden) and not available if user has selected the judge radio button under the Name. A user may expand an area of expertise to view related specialties included in that area by expanding the node for that area. A user may select a jurisdiction type by using the State Selection menu. The jurisdictions used in this product should be the same jurisdictions (courts).

Figure 35:
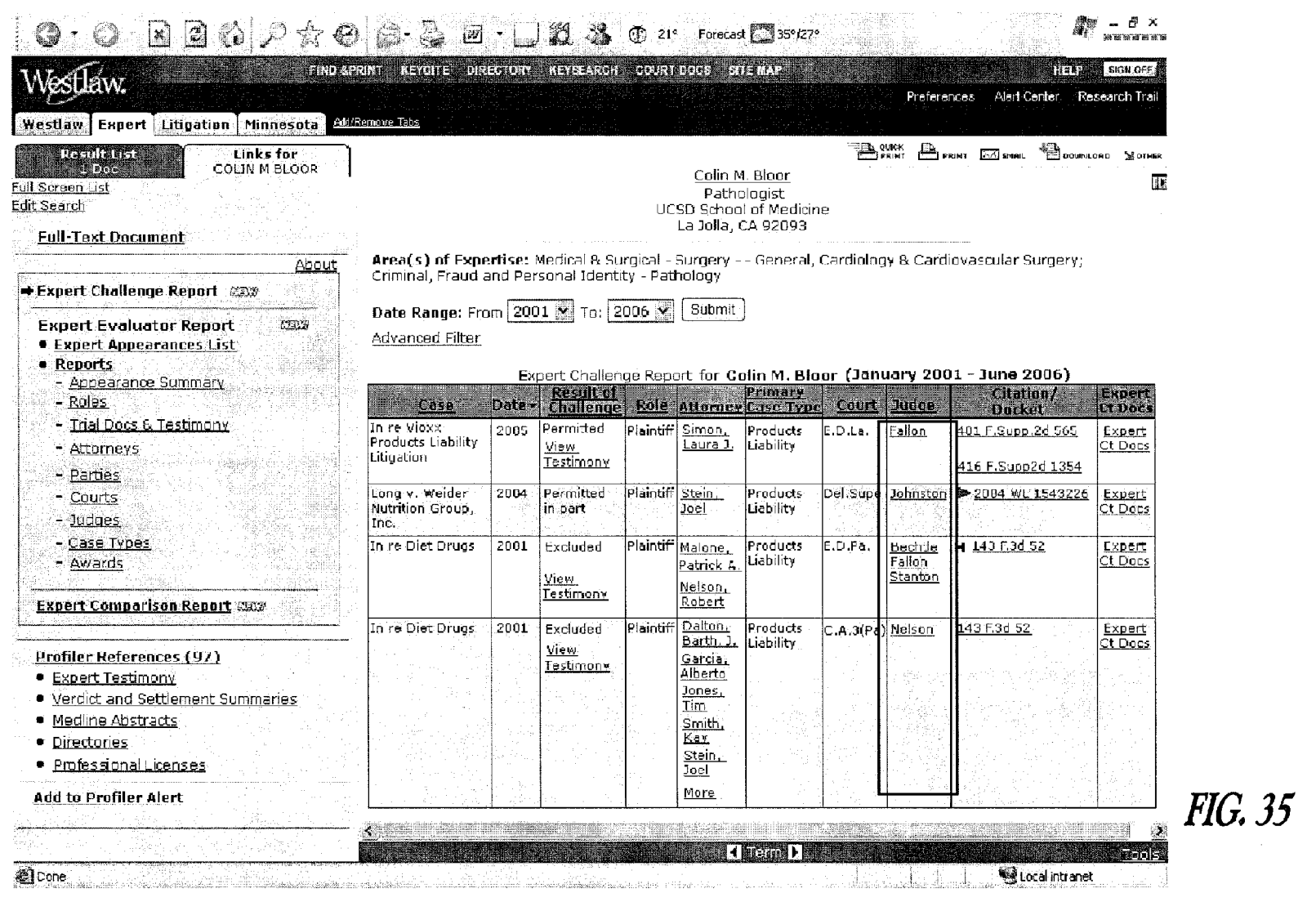

In FIG. 35, in instances where there are multiple judges listed for a case in the Judge column, when the column sorts, it sorts based on the name of the judge listed as the first multiple. Secondary sort is reverse chronological in some embodiments.

Figure 36:
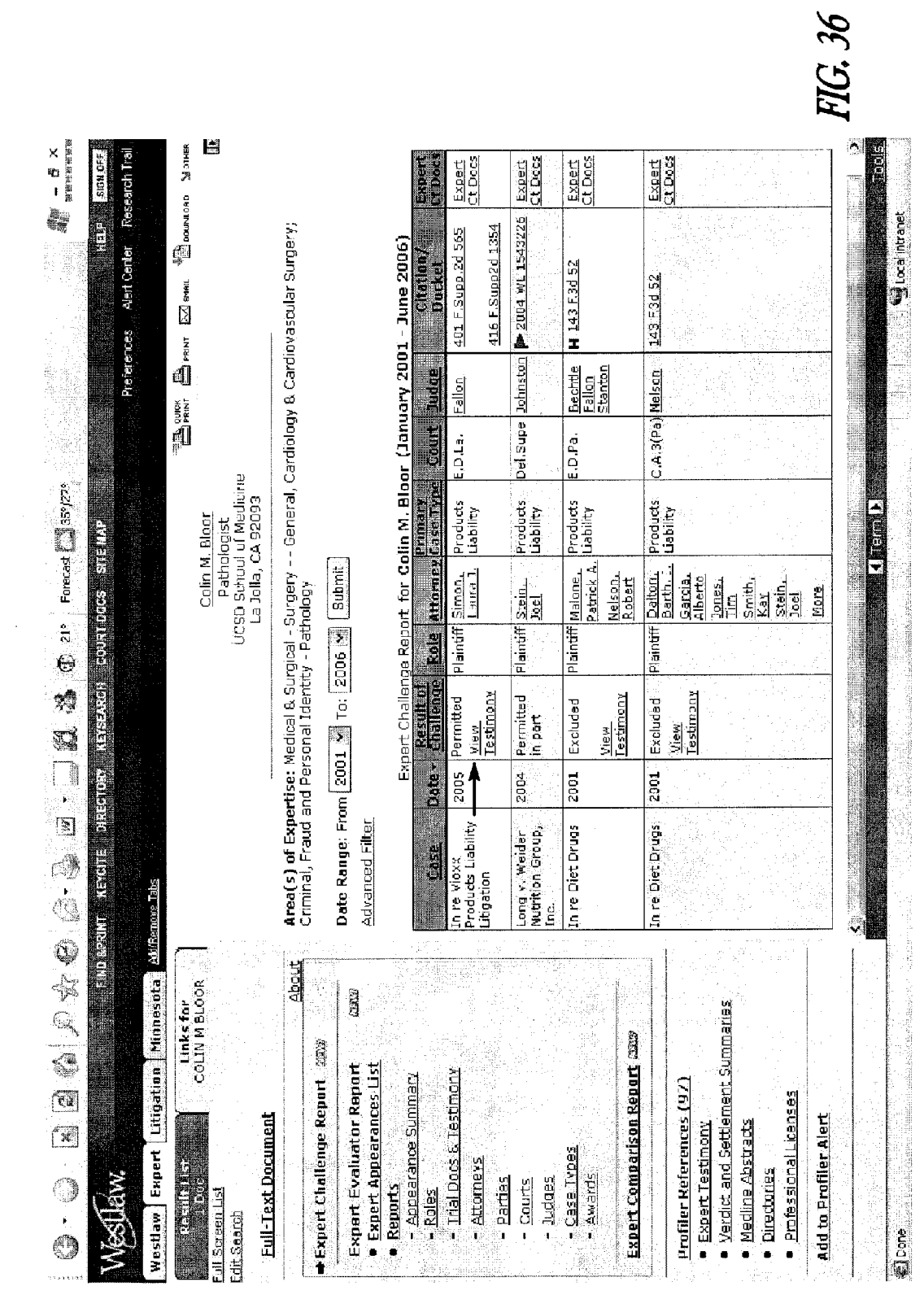
Figure 36A:
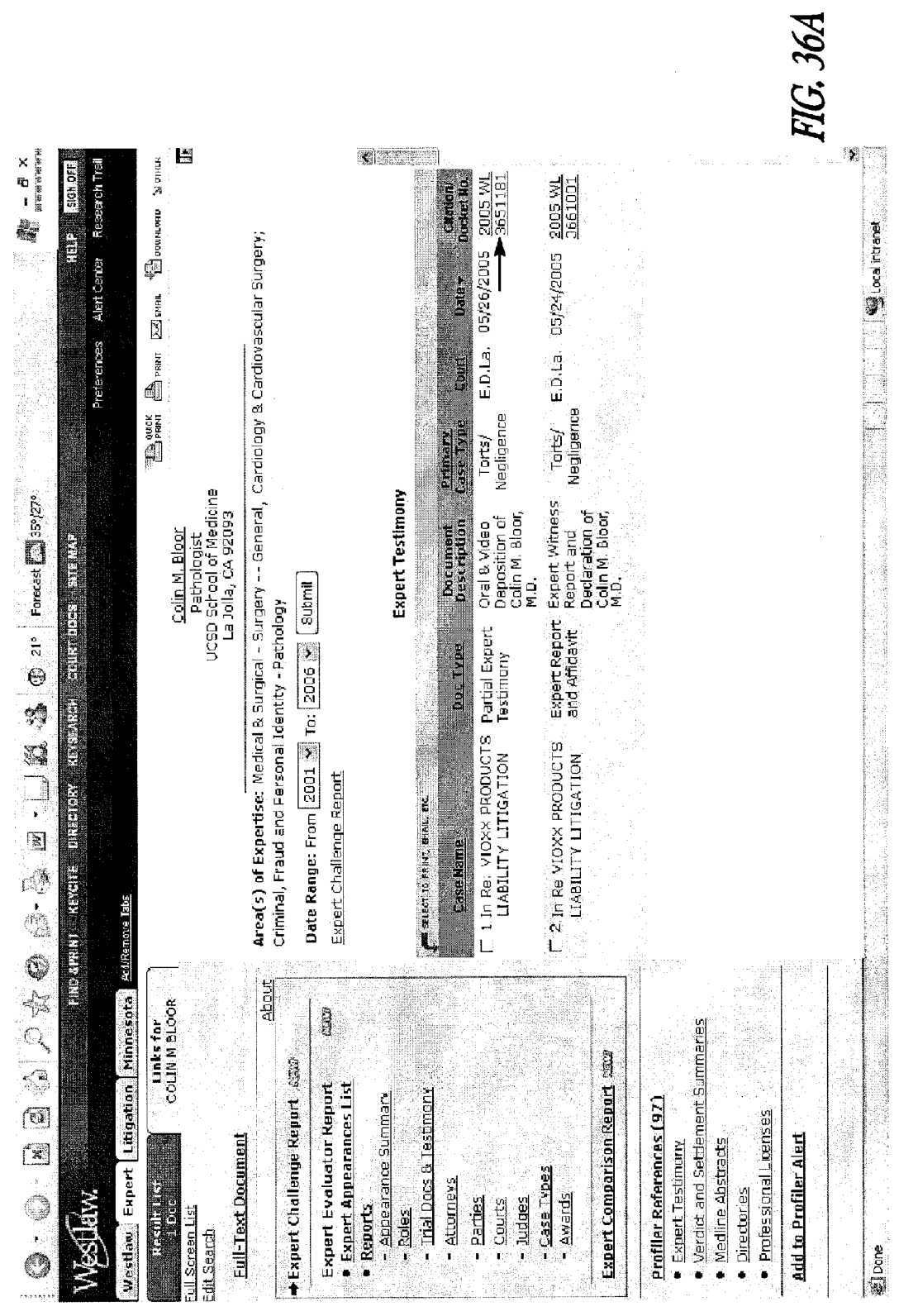

In FIGS. 36 and 36A, the Result of Challenge column, each cell may contain one link to an expert testimony list of documents regarding the specific challenge to the specific expert in the report. When the user clicks on the View Testimony link, a doc list displays containing documents pertaining to this expert in this case. The items in the list appear based upon reverse chronology. The linked documents can be any related EW-Docs document, as editorially determined by Content Ops. The document(s) are expert specific for this expert in this report. Related motions and docs are accessed by clicking on the "Ct-Docs" link and are case specific.

Figure 37:
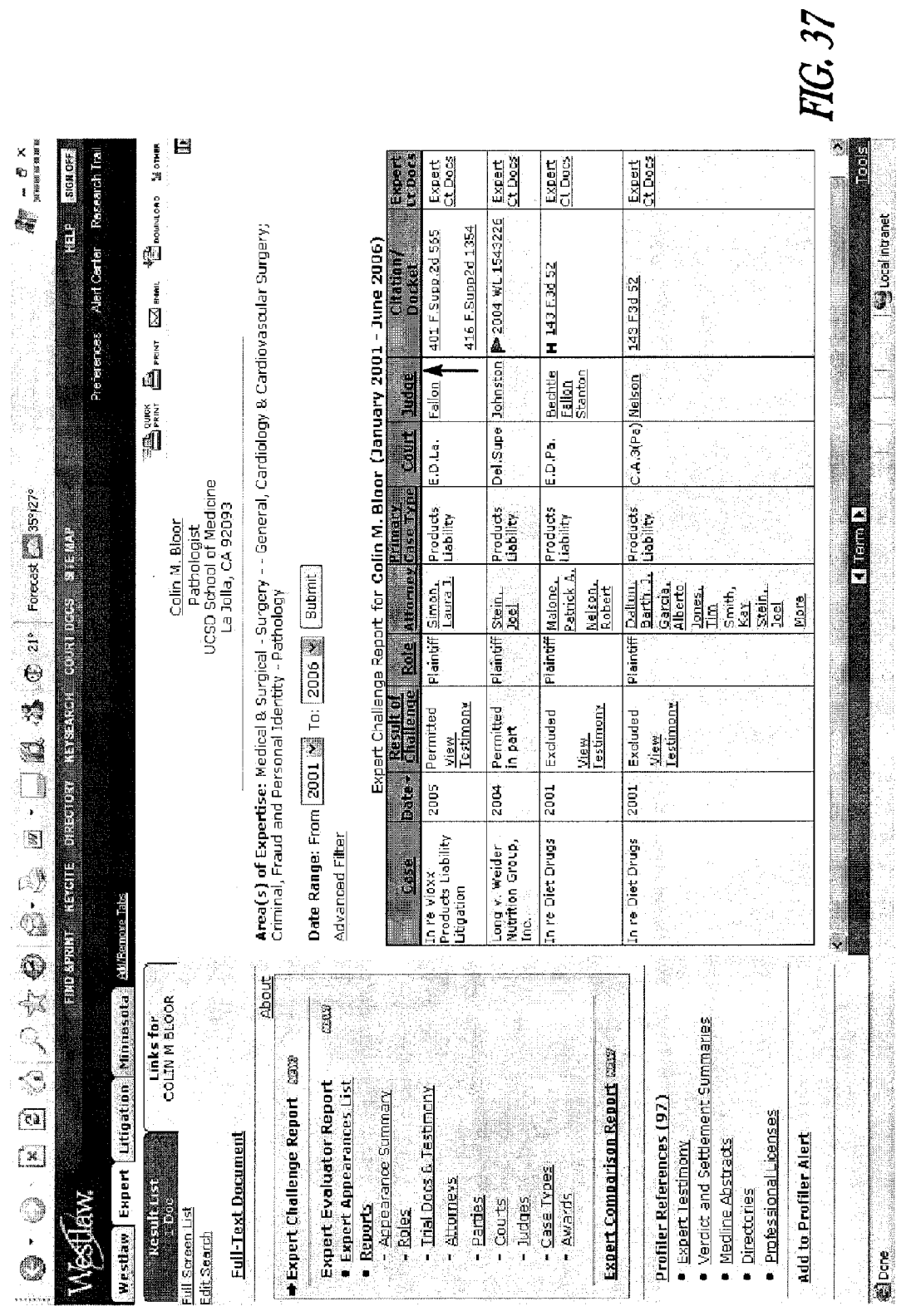
Figure 37A:
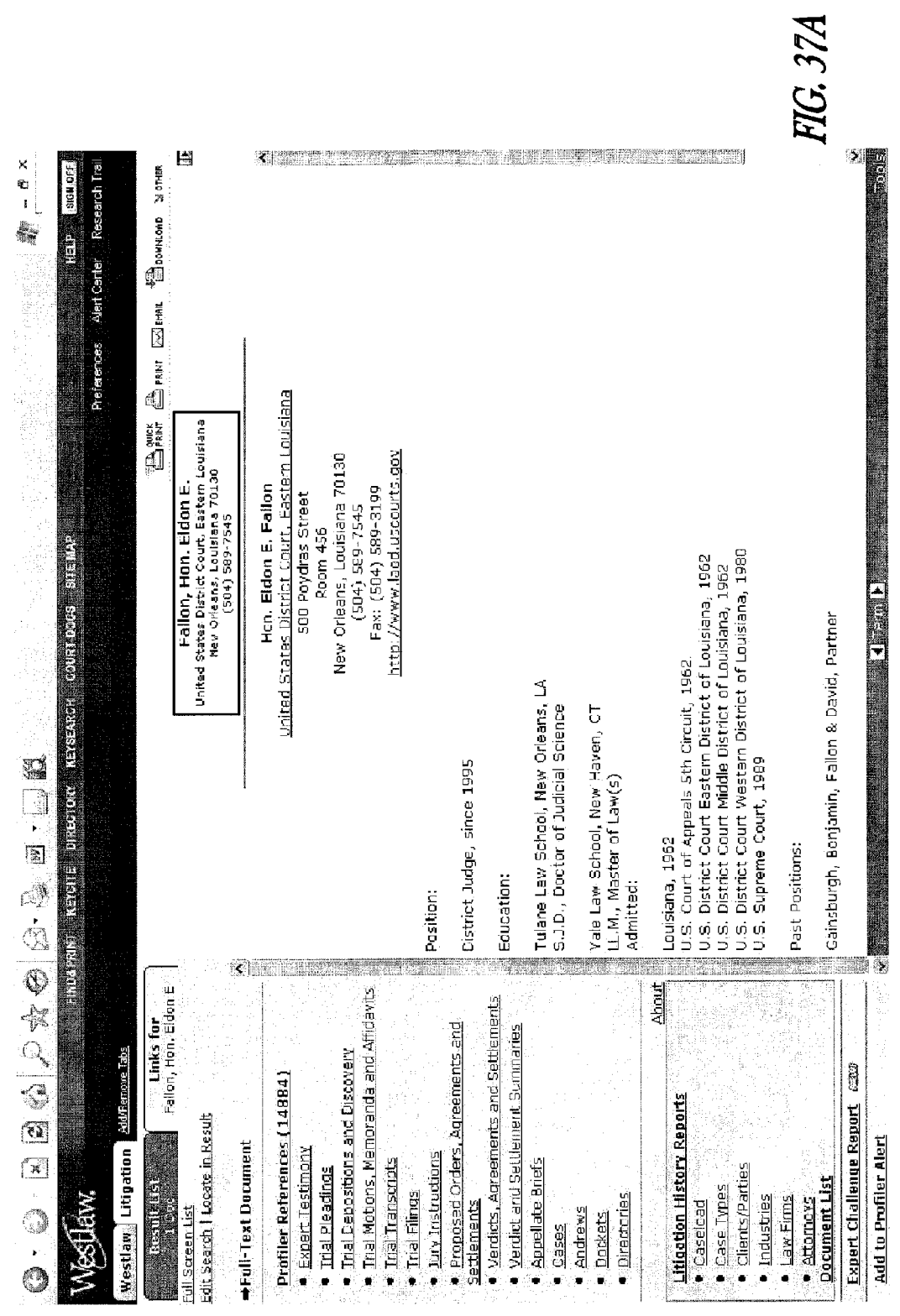

In FIGS. 37 and 37A, the Judge link takes the user to the profile of the selected judge in PROFILER.

In FIG. 38, the Expert Challenge Report that displays in full screen. The Edit Search link takes the user to the PROFILER Search Template. The Document Text link takes the user back to the expert's profile in PROFILER. The "Links for "link takes the user back to the left rail links but in full screen display. The Result List link takes the user to the PROFILER Search Result List. Expert's Name Link in header is a link. The Document Text link, Links for link and Result List links are toggles. When a user clicks on one of the links the link is not displayed on the screen that opens but the other two links are displayed.

A user may search for a specific expert by entering the expert's name in the "Name" textbox on the template and clicking on the Search button. Expert is defaulted as the choice in the radio buttons above the name box. An expert witness report for the specific expert displays in split screen. If the user clicks on the Full Screen Icon, the Challenge Report opens in full screen. Advanced Filter—The Advanced Filter link takes the user to the advanced filter screen The Expert's Name in the header (e.g., "Colin M Bloor") takes the user to the full-text profile of the expert in PROFILER. The advanced filter link is available from full or split screen Expert Challenge Reports. The link appears below the date range.

Expert Challenge Report for Judge

Figure 39:
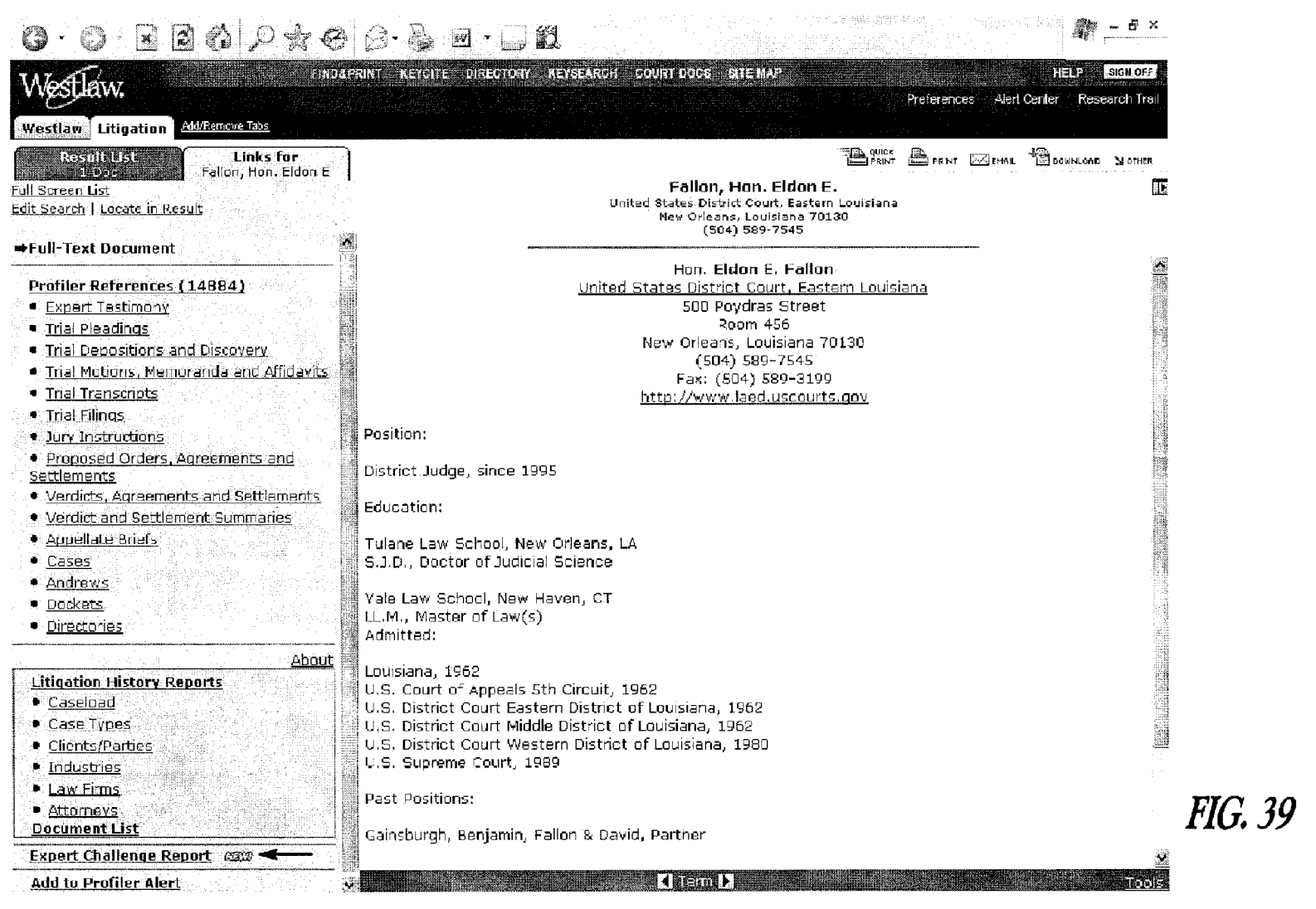
Figure 40:
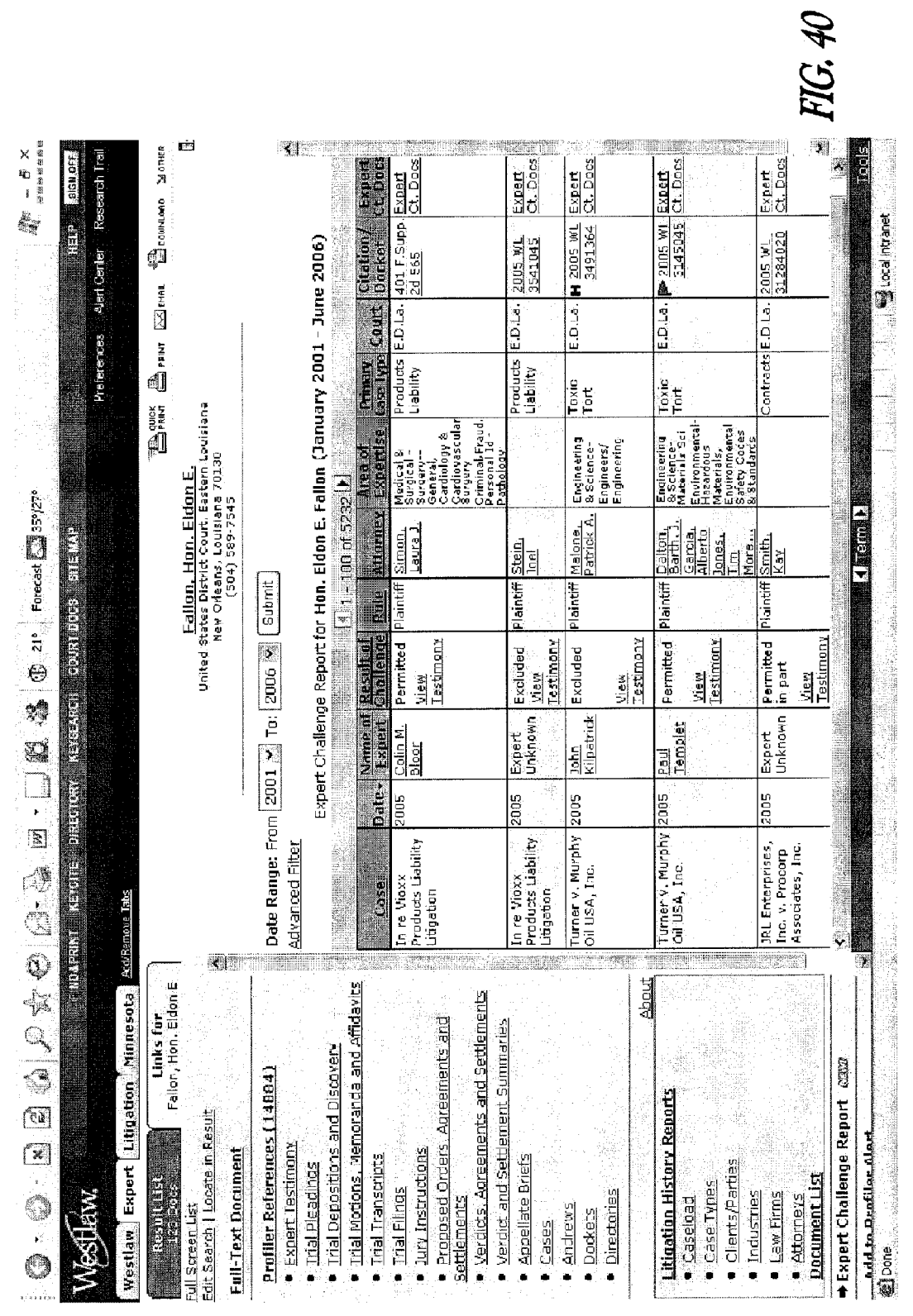
Figure 41:
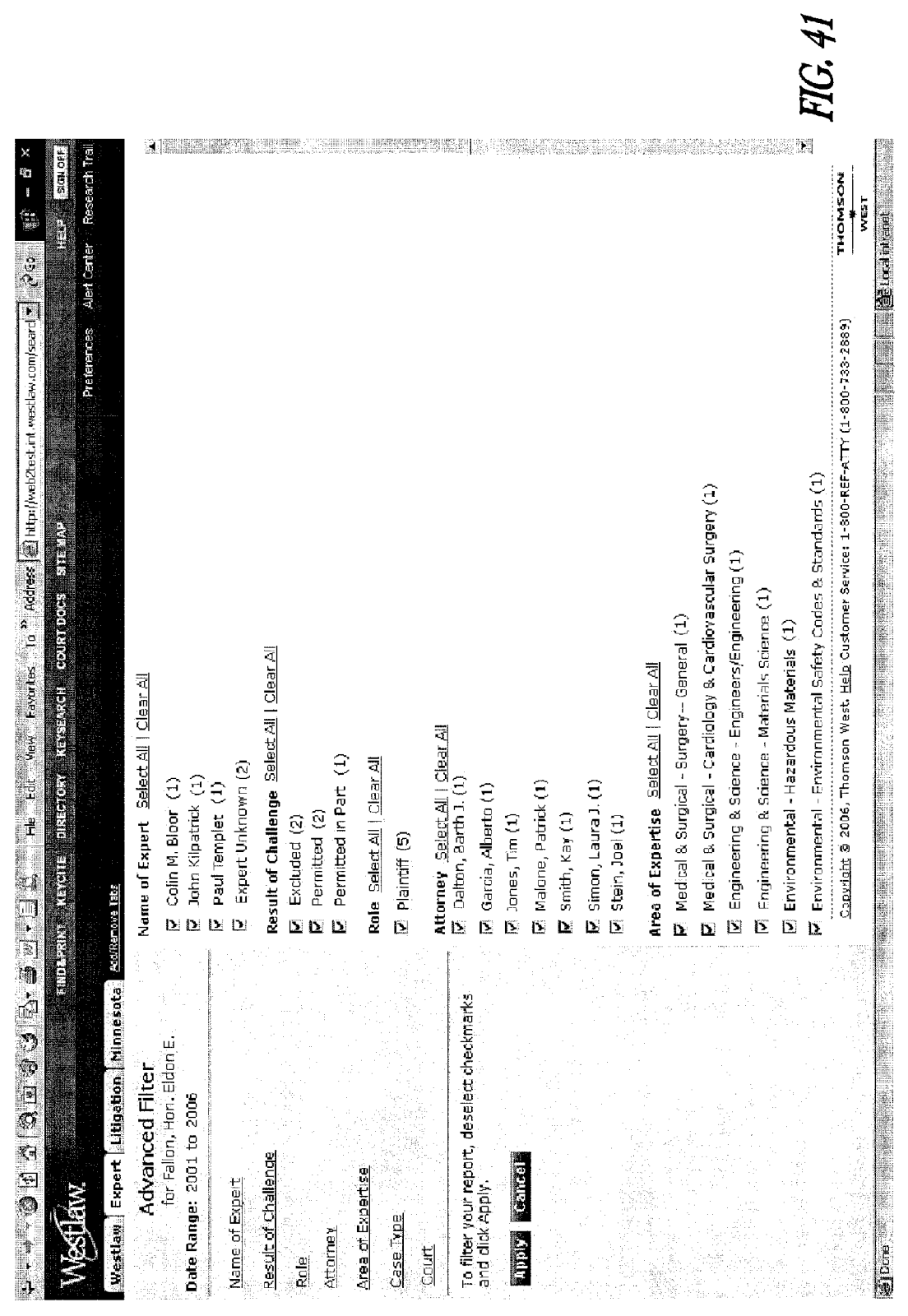
Figure 41A:
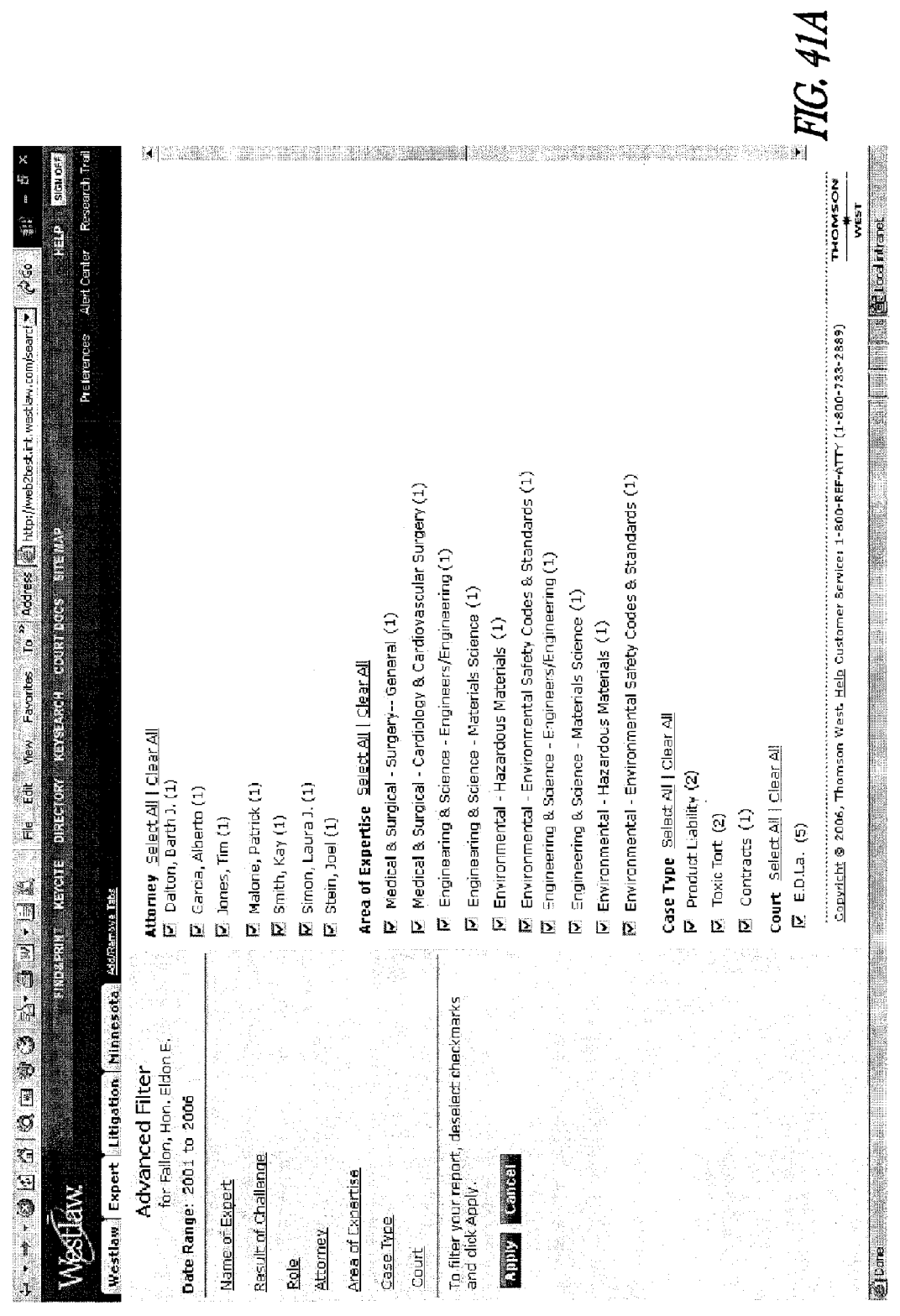

In FIGS. 39 & 40, when a user is viewing a judge's profile in PROFILER, the user may go directly to the Expert Challenge Report for that particular judge by clicking on the Expert Challenge Report link. The Judge's Challenge Report contains the following: Names of the cases in which the judge ruled on the challenged testimony; Years the judge ruled on the challenged testimony; Names of the experts whose testimony was challenged (if multiples, each expert's name appears in a separate line); Judge's rulings on the challenge testimony as well as a link to view a doc list of the challenged testimony; Role of the party that retained the expert; Attorneys associated with the case, on the same side (role) as the expert; Area of Expertise of the expert, from PROFILER. The areas of expertise should be consolidated within the cell for that expert so that specialties within a parent area all appear beneath the parent area of expertise. Thus, if an expert has sub-specialties under Medical & Surgical, those should both appear with Medical & Surgical, separated by commas. Main areas of expertise and related specialties are separated from other areas of expertise by a semi-colon. The areas of expertise are not linked. They do appear in the advanced filter options for a user to filter the entire report based on expert's area of expertise. Primary Case Types; Courts; Citations of the cases in which the judge ruled on the challenged testimony, with KeyCite flags for case opinions located in front of the citations. Expert court documents—case specific but regarding any experts from the case. Referring to FIGS. 41 & 41A, shows the screen shots of when the user selects the advanced filter button. The user may select or unselected various criteria.

ResultsPlus™ Interface Component

Figure 42:
Figure 44:
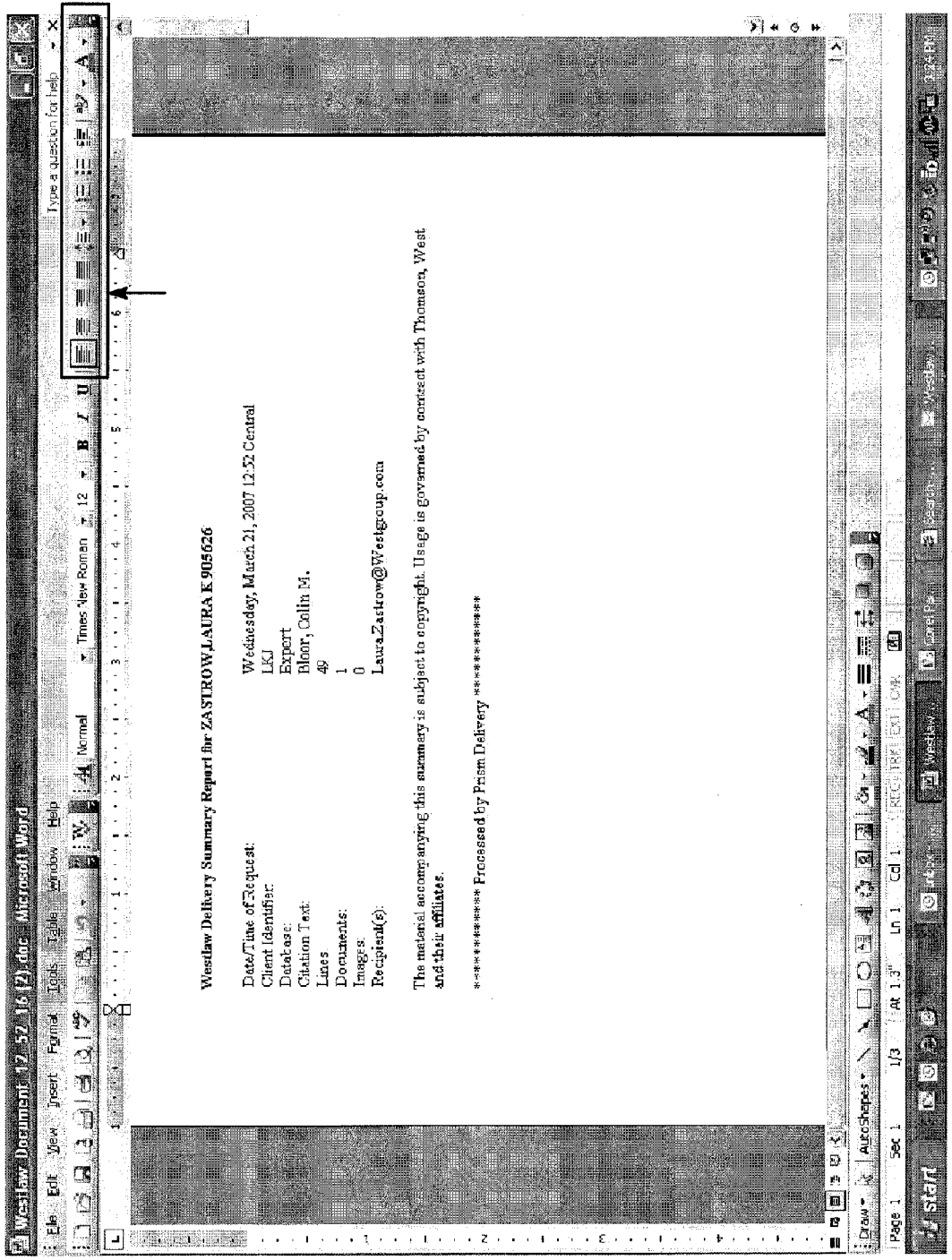

In FIG. 42, an Expert Evaluator Reports ResultsPlus link may appear in a results list any time a user runs a query containing an expert field restriction against the Expert Testimony database, any jury verdict database or applicable Andrews Litigation Reporters databases and no other ResultsPlus link is generated. Examples include:

- where the entire user query contains just an expert field restriction.
- where the entire user query contains an expert field restriction and other field restrictions not currently used by ResultsPlus.
- where the entire user query contains an expert field restriction and other field restrictions not currently used by ResultsPlus, plus some other query string not resulting in any ResultsPlus suggestions.

For users who default to displaying the first document, rather than the result list, following a search, the user's default is overridden in the exemplary embodiment.

Figure 43:
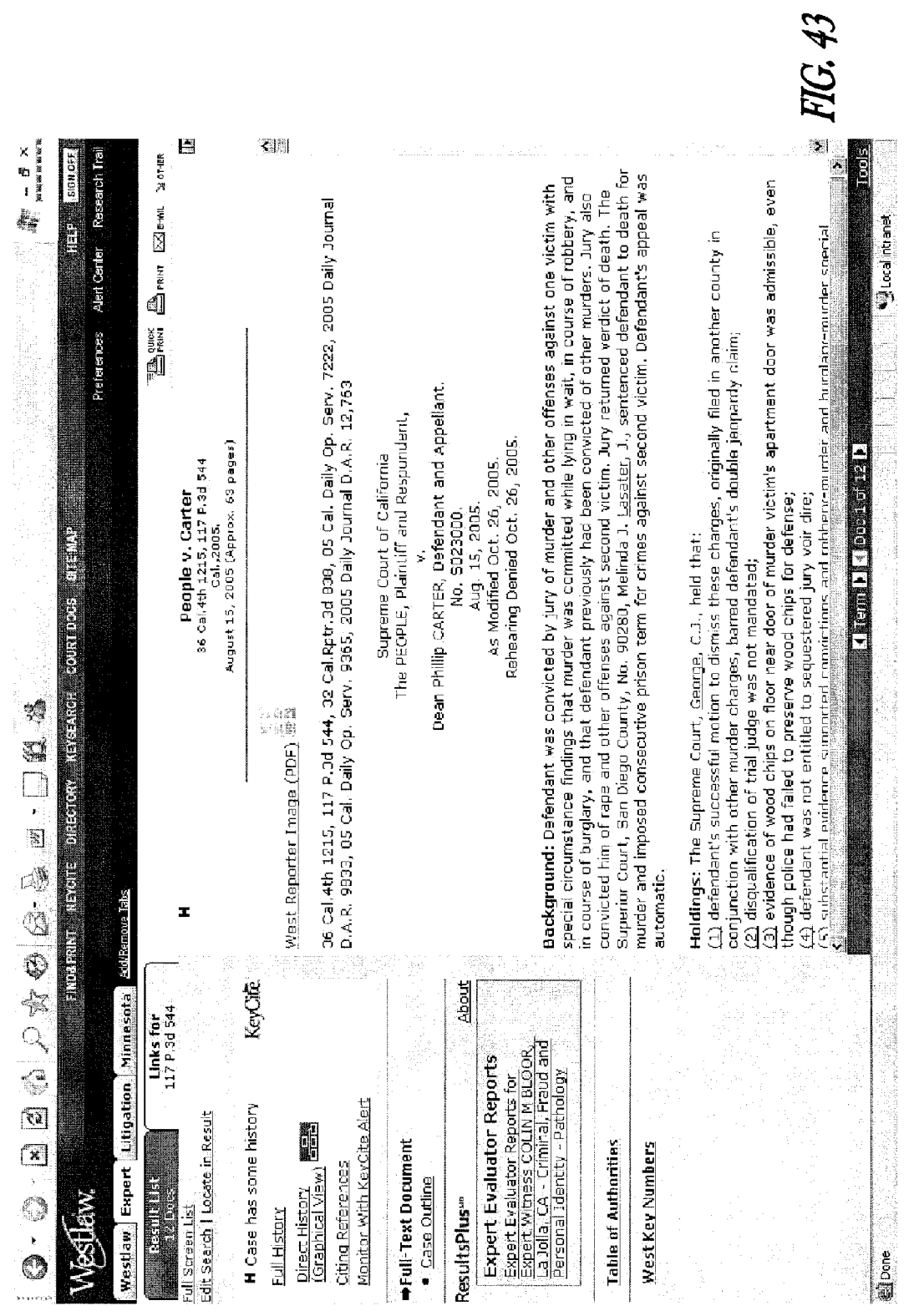

In FIG. 43, after the user selects one of the reports, the Expert Evaluator Reports ResultsPlus link may appear in the left pane for all documents returned by the search.

The Expert Evaluator Reports ResultsPlus link may appear even if the query returns no documents. The Expert Evaluator Reports ResultsPlus link may take a user directly to the Expert Evaluator Reports for the expert queried in the Expert Testimony database, any jury verdict database or any applicable Andrews Litigation Reporters databases. The ResultsPlus box may have the heading "Expert Evaluator Reports." The text of the ResultsPlus link may be "Expert Evaluator Report for [Expert Name], Title, City, State" information displayed in PROFILER. The name may be expressed First—Middle—Last, so "Colin M. Bloor" rather than "Bloor, Colin M." A full example: Expert Evaluator Report for Colin M. Bloor, M.D.; La Jolla, Calif.; U.S.A; Where the queried expert does not have an Expert Evaluator Report, the ResultsPlus link may not appear. Where an expert query identifies only a single expert who has an Expert Evaluator Report, a ResultsPlus link may appear for that expert even if the expert is outside of the jurisdiction of the database and even if there are no Expert Testimony documents, jury verdicts or applicable Andrews Litigation Reporters documents to satisfy the query. Example: User runs the query ew(colin+2 bloor) in the FL-JV (Florida Jury Verdicts) database. Even though the only Colin Bloor with an Expert Evaluator Report is from CA, and even though the query yields no results, a ResultsPlus link to Colin Bloor's Expert Evaluator Report should appear.

Where an expert query identifies more than one, but fewer than four, experts, separate ResultsPlus links should appear for all of the experts. The expert with the highest number of litigation events should appear first and the rest should appear in descending order by number of litigation events. If two or more experts have the same number of litigation events, and there is a jurisdiction available due to the database being searched or a query term, the expert with a jurisdiction that matches the primary jurisdiction should appear first. If both experts have jurisdictions that do not match the primary jurisdictions, then the system determines which expert appears next. Example: User runs the query ew(alan+2 barnes) in the FL-JV database. Three experts named Alan Barnes have Expert Evaluator Reports, one from Florida, one from California and one from Wisconsin. The Alan Barnes from California has 10 litigation events. The Florida Barnes and the Wisconsin Barnes each have eight events. The three ResultsPlus links should appear with the link for Alan Barnes of California appearing first, and the remaining two experts appears in whatever order the system serves them up.

Where an expert query identifies more than three experts, separate ResultsPlus links should appear for the first three individuals in the order described in 10.3.2 and the order carries over when the user clicks the "See More ResultsPlus" link and the list of all identified experts displays.

Example: User runs the query ew(clemente) in the database AZ-JV. More than one expert named Clemente has Expert Litigation History Reports, two from AZ and several from other states (none of which are jurisdictions, so no secondary jurisdiction applies). Three ResultsPlus links should appear in the following order, assuming that nos. 1-3 are the people named Clemente with the most events, #1 had the most and #2 had the second most events, and #3 the least number of events:

1. Jonathan D. Clemente; Clemente, Mueller & Tobia, P. A., Scotsdale, Ariz.; U.S.A. (12 events)
2. Mark A. Clemente; Clemente, Mueller & Tobia, P. A., Morristown; N.J.; U.S.A. (10 events)
3. Clemente L. Vazquez-Bello; Gunster, Yoakley & Stewart, P. A., Miami; Fla.; U.S.A. (7 events)

Example: User clicks on the "See More ResultPlus" link. The new screen that displays shows the Expert Evaluator Reports links for all of the experts identified in the query in the following order and each one has a separate box:

1. Jonathan D. Clemente; Clemente, Mueller & Tobia, P. A., Scotsdale, Ariz.; U.S.A. (12 events)
2. Mark A. Clemente; Clemente, Mueller & Tobia, P. A., Morristown; N.J.; U.S.A. (10 events)
3. Clemente L. Vazquez-Bello; Gunster, Yoakley & Stewart, P. A., Miami; Fla.; U.S.A. (7 events)
4. Robert G. Clemente; Cooney, Scully and Dowling, Hartford; CT; U.S.A. (4 events)
5. Matthew A. Clemente; Sidley Austin L L P, Chicago; IL; U.S.A. (4 events)

FIGS. 44, 45, 46, and 47 show screen shots of exemplary print out of each expert report and a cover sheet.

Conclusion

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. An online legal research system for researching expert witnesses, the system comprising:
   one or more databases containing expert witness data, including area of expertise information;
   a server operatively coupled to the one or more databases and configured to provide one or more client access devices a graphical user interface, the graphical user interface including:
   hierarchical means for receiving a query regarding an area of expertise;
   means for listing two or more experts found in the one or more databases in response to the received query;
   means for selecting two or more of the listed expert witnesses; and
   means, responsive to the selection of the two or more listed experts, for automatically retrieving from the one or more databases, tabulating, and displaying simultaneously side-by-side data regarding the cumulative litigation history of a plurality of the two or more selected experts.

2. The system of claim 1, wherein the data regarding the cumulative litigation history includes a number of litigation appearances for each of the selected experts.

3. The system of claim 1, wherein the graphical user interface further includes user selectable means for filtering the displayed side-by-side data regarding the cumulative litigation history of the selected experts.

4. The system of claim 1, wherein the data regarding cumulative litigation history comprises legal roles, trial documents, testimony, attorneys, parties, courts, judges, case types, and awards.

5. A method of operating an online legal research system for researching expert witnesses, the method comprising:
   outputting, to one or more client access devices, a hierarchical means for generating a query regarding an area of expertise;
   receiving the query from a first one of the one or more client access devices;
   running the query against an expert witness database containing one or more expert witness records, including area of expertise information, to identify a plurality of expert witness records corresponding to the query;
   outputting to one of the one or more client access device a listing of two or more expert witness records corresponding to the query; and
   in response to user selection of the two or more of the listed experts, automatically retrieving, tabulating, and displaying simultaneously side-by-side data from the expert witness database regarding the cumulative litigation history of simultaneously the two or more selected experts.

6. The method of claim 5, wherein the data regarding the cumulative litigation history includes a number of litigation appearances for each of the selected experts.

7. The method of claim 5, further comprising:
   filtering the displayed side-by-side data regarding the cumulative litigation history of the selected experts in response to a user selection.

* * * * *

UNITED STATES PATENT AND TRADEMARK OFFICE
CERTIFICATE OF CORRECTION

PATENT NO.         : 8,713,006 B2                                                Page 1 of 1
APPLICATION NO.    : 13/369854
DATED              : April 29, 2014
INVENTOR(S)        : Christine Fenne et al.

It is certified that error appears in the above-identified patent and that said Letters Patent is hereby corrected as shown below:

In the Specification

At column 1, line 43, the patent should read --...encounter matters about which...--.

At column 6, line 57, the patent should read --...one or more good cases...--.

At column 13, line 18, the patent should read --If user uses the back...--.

Signed and Sealed this
Twelfth Day of August, 2014

Michelle K. Lee
*Deputy Director of the United States Patent and Trademark Office*